(12) United States Patent
Maruo et al.

(10) Patent No.: US 11,657,938 B2
(45) Date of Patent: May 23, 2023

(54) OPTIMIZER, OPTIMIZATION METHOD, AND COMPUTER-READABLE RECORDING MEDIUM RECORDING OPTIMIZATION PROGRAM

(71) Applicant: FUJITSU LIMITED, Kawasaki (JP)

(72) Inventors: Akito Maruo, Atsugi (JP); Hirotaka Oshima, Machida (JP)

(73) Assignee: FUJITSU LIMITED, Kawasaki (JP)

(*) Notice: Subject to any disclaimer, the term of this patent is extended or adjusted under 35 U.S.C. 154(b) by 366 days.

(21) Appl. No.: 17/120,324

(22) Filed: Dec. 14, 2020

(65) Prior Publication Data
US 2021/0287835 A1    Sep. 16, 2021

(30) Foreign Application Priority Data
Mar. 10, 2020   (JP) .............................. JP2020-040689

(51) Int. Cl.
*H01F 5/04*      (2006.01)
*H01F 27/28*      (2006.01)
(Continued)

(52) U.S. Cl.
CPC ............... *H01F 5/04* (2013.01); *G01R 33/00* (2013.01); *G05B 13/021* (2013.01);
(Continued)

(58) Field of Classification Search
CPC .. H01F 5/04; H01F 27/2828; H01F 2005/006; G01R 33/00; G05B 13/021; G06F 2111/06
(Continued)

(56) References Cited

U.S. PATENT DOCUMENTS

| | | | |
|---|---|---|---|
| 7,103,485 B2 * | 9/2006 | Kang | H02H 1/046 |
| | | | 702/65 |
| 2016/0063391 A1 | 3/2016 | Hayashi et al. | |
| 2019/0204794 A1 | 7/2019 | Matsubara et al. | |

FOREIGN PATENT DOCUMENTS

| | | |
|---|---|---|
| CN | 106650007 A | 5/2017 |
| EP | 3220294 A1 | 9/2017 |

(Continued)

OTHER PUBLICATIONS

Extended European Search Report dated May 26, 2021 for corresponding to European Patent Application No. 20212774.2, 5 pages.

*Primary Examiner* — Aditya S Bhat
(74) *Attorney, Agent, or Firm* — Fujitsu Patent Center

(57) ABSTRACT

An optimizer includes a processor configured to: optimize a change amount of a interlinkage magnetic flux in a coil by using an objective function formula that maximizes a sum of $\Delta\varphi_i^{right} x_i$ (i=1 to $N_c$) and $\Delta\varphi_i^{left} y_i$ (i=1 to $N_c$), when it is assumed that a surface of the magnetic device where the coil is arranged be divided into $N_c$ ($N_c$ is integer) coil regions, in an i-th coil region $N_i$, an auxiliary variable of a clockwise coil that may exist in the coil region $N_i$ be $x_i$, and an auxiliary variable of a counterclockwise coil that may exist in the coil region $N_i$ be $y_i$, and a change amount of an interlinkage magnetic flux of the clockwise coil in the coil region $N_i$ be $\Delta\varphi_i^{right}$ and a change amount of an interlinkage magnetic flux of the counterclockwise coil in the coil region $N_i$ be $\Delta\varphi_i^{left}$.

20 Claims, 40 Drawing Sheets

(51) Int. Cl.
  *G01R 33/00*   (2006.01)
  *G05B 13/02*   (2006.01)
  *H01F 5/00*    (2006.01)
  *G06F 111/06*  (2020.01)

(52) U.S. Cl.
  CPC ...... *H01F 27/2828* (2013.01); *G06F 2111/06* (2020.01); *H01F 2005/006* (2013.01)

(58) Field of Classification Search
  USPC .......................................................... 702/57
  See application file for complete search history.

(56) References Cited

FOREIGN PATENT DOCUMENTS

| | | |
|---|---|---|
| EP | 3502932 A1 | 6/2019 |
| JP | 2011-243126 A | 12/2011 |
| JP | 2016-051350 A | 4/2016 |
| JP | 2019-121137 A | 7/2019 |

* cited by examiner

FIG. 13

| STATE VARIABLE $S_{j,k}$ | DIRECTION OF MAGNETIZATION |
|---|---|
| $S_{j,1}$ | POSITIVE DIRECTION IN x-AXIS |
| $S_{j,2}$ | NEGATIVE DIRECTION IN x-AXIS |
| $S_{j,3}$ | POSITIVE DIRECTION IN y-AXIS |
| $S_{j,4}$ | NEGATIVE DIRECTION IN y-AXIS |
| $S_{j,5}$ | POSITIVE DIRECTION IN z-AXIS |
| $S_{j,6}$ | NEGATIVE DIRECTION IN z-AXIS |

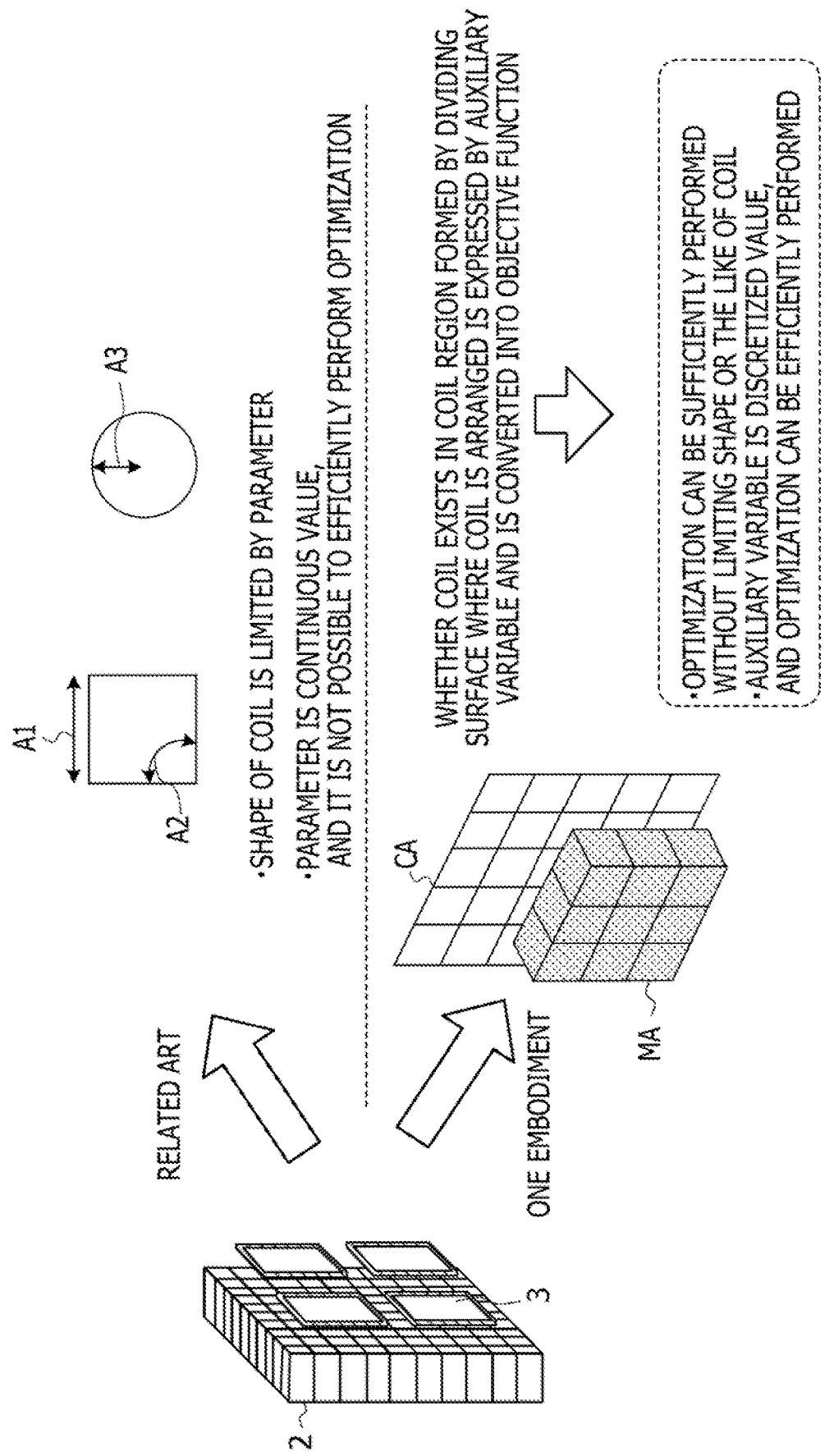

OPTIMIZER, OPTIMIZATION METHOD, AND COMPUTER-READABLE RECORDING MEDIUM RECORDING OPTIMIZATION PROGRAM

CROSS-REFERENCE TO RELATED APPLICATION

This application is based upon and claims the benefit of priority of the prior Japanese Patent Application No. 2020-40689, filed on Mar. 10, 2020, the entire contents of which are incorporated herein by reference.

FIELD

This case discussed herein is related to an optimizer, an optimization method, and an optimization program.

BACKGROUND

Magnetic devices including a coil and a magnet are used in various applications, and for example, are used as a vibration power generation device, a flat motor, a linear motor, a magnetic levitation device, or the like. Because these magnetic devices use a physical phenomenon called electromagnetic induction, in order to improve performance of the magnetic device, for example, there is a case where it is requested to increase a change amount of a magnetic flux interlinking with (passing through) the coil generated from the magnet.

The change amount of the magnetic flux (interlinkage magnetic flux) interlinking with the coil of the magnetic device is affected, for example, by shapes and arrangement of the coil and the magnet in the magnetic device. Therefore, for example, by optimizing the shapes and the arrangement of the coil and the magnet in the magnetic device, the change amount of the interlinkage magnetic flux in the coil of the magnetic device can be maximized.

Japanese Laid-open Patent Publication No. 2011-243126 and Japanese Laid-open Patent Publication No. 2019-121137 are disclosed as related art.

SUMMARY

According to an aspect of the embodiments, an optimizer includes: a memory; and a processor coupled to the memory and configured to: optimize a change amount of an interlinkage magnetic flux in a coil of a magnetic device; and optimize the change amount of the interlinkage magnetic flux in the coil by using an objective function formula that maximizes a sum of $\Delta\varphi\text{right}x_i$ (i=1 to Nc) and $\Delta\varphi\text{left}y_i$ (i=1 to Nc), when it is assumed that a surface of the magnetic device where the coil is arranged be divided into Nc (Nc is integer) coil regions, in an i-th coil region $N_i$, an auxiliary variable of a clockwise coil that may exist in the coil region $N_i$ be $x_i$, and an auxiliary variable of a counterclockwise coil that may exist in the coil region $N_i$ be $y_i$, a case where the clockwise coil exists be $x_i=1$, a case where the clockwise coil does not exist be $x_i=0$, a case where the counterclockwise coil exists be $y_i=1$, a case where the counterclockwise coil does not exist be $y_i=0$, both of the clockwise coil and the counterclockwise coil do not exist when $x_i=1$ and $y_i=1$ are satisfied, and a change amount of an interlinkage magnetic flux of the clockwise coil in the coil region $N_i$ be $\Delta\varphi\text{right}$ and a change amount of an interlinkage magnetic flux of the counterclockwise coil in the coil region $N_i$ be $\Delta\varphi\text{left}$.

The object and advantages of the invention will be realized and attained by means of the elements and combinations particularly pointed out in the claims.

It is to be understood that both the foregoing general description and the following detailed description are exemplary and explanatory and are not restrictive of the invention.

According to one aspect, this case can provide an optimizer or the like that can sufficiently and efficiently optimize a change amount of an interlinkage magnetic flux in a coil of a magnetic device.

BRIEF DESCRIPTION OF DRAWINGS

FIG. 13 is a diagram illustrating an example of correspondence between a state variable $s_{j,k}$ of a magnet and a direction of magnetization in a j-th magnet region $N_j$ represented by the state variable $s_{j,k}$ of the magnet;

FIG. 38 is a diagram illustrating an example of a relationship when a change amount of an interlinkage magnetic flux in a coil of a magnetic device is optimized in one embodiment of the technology disclosed in this case and the related art.

DESCRIPTION OF EMBODIMENTS

Figure 1:
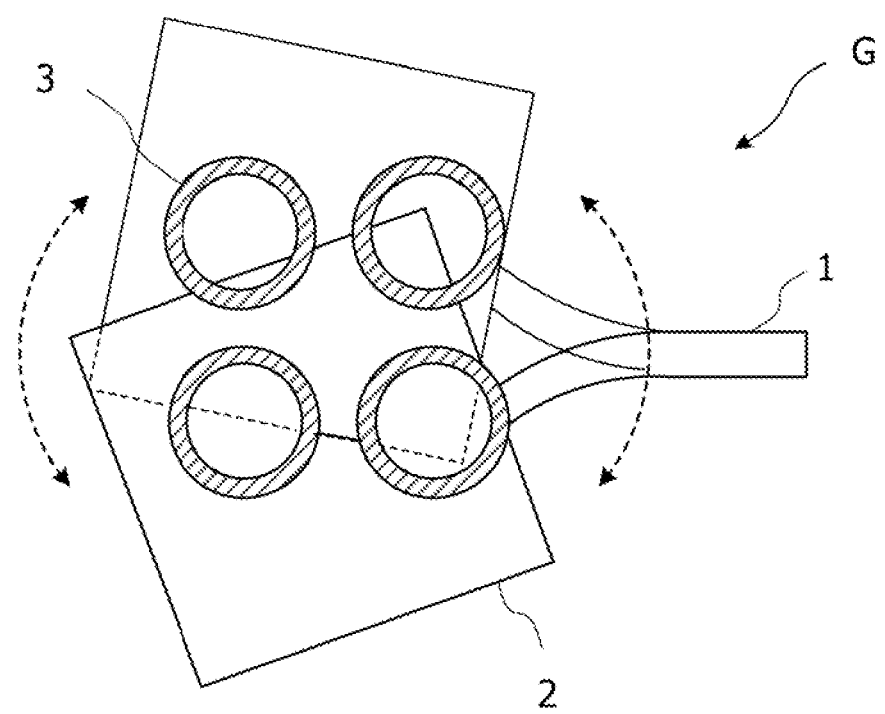
FIG. 1 is a diagram illustrating an example of a vibration power generation device.

As related art that optimizes design of the magnetic device, for example, a technology is proposed that makes a design by optimizing an objective function including a gap radius, a tooth width, the number of stator windings, or the like that are design parameters as variables for electromagnetic devices such as an electric motor or a generator. In such related art, for example, the objective function including the design parameter that is a continuous value that may take a wide range of values is optimized by using mathematical programming.

Here, in such related art, for example, in order to optimize the shape of the coil, in a case where the shape of the coil is expressed by the design parameter, when a radius of a circle is specified as the design parameter, the shape of the coil to be optimized is limited to circles. In this way, in the related art, the shape or the like of the coil is limited depending on the properties of the set design parameter, and there is a case where it is not possible to sufficiently optimize the shape of the coil.

Furthermore, as a technology of optimizing the objective function, for example, a technology is proposed that expresses a combination optimization problem by an objective function represented by a plurality of discretized parameters when solving the combination optimization problem and optimizes the objective function by an annealing method. In such related art, by performing calculation by the annealing method (annealing) by using an annealing machine or the like, it is possible to efficiently optimize the objective function expressing the combination optimization problem in a short time.

Here, in order to efficiently optimize the objective function by using such related art, as described above, for example, it is requested to express the objective function to be optimized by the plurality of discretized parameters. However, in the related art that optimizes the design of the electromagnetic devices described above, the design parameter included in the objective function is the relatively small number of continuous values such as a gap radius that may take a wide range of values.

Therefore, according to the related art that optimizes the design of the electromagnetic device described above, it is not possible to express the objective function in a form of the combination optimization problem, and accordingly, it is not possible to efficiently perform optimization in a case where a degree of freedom of design of the shape or the like of the coil is increased.

In one aspect, an optimizer or the like that can sufficiently and efficiently optimize a change amount of an interlinkage magnetic flux in a coil of a magnetic device may be provided.

(Optimizer)

The technology disclosed in this case is based on the findings of the present inventors that it is not possible to efficiently and sufficiently optimize a change amount of an interlinkage magnetic flux in a coil of a magnetic device according to the related art. Therefore, before the technology disclosed in this case is described in detail, problems of the related art or the like will be described by using a case where the magnetic device is a vibration power generation device as an example.

The vibration power generation device is a device that can convert kinetic energy caused by vibration into electrical energy (electric power) and attracts attention as one of energy harvesting devices. Furthermore, the vibration power generation device that can convert vibration of bridges, buildings, or the like into electric power also attracts attention as private power generation of in-vehicle devices or wearable devices and a device for supplying electric power to Internet of Things (IoT) devices disposed in various places.

The vibration power generation device usually converts vibration into electric power by using a physical phenomenon called electromagnetic induction caused by changing a positional relationship between the coil and magnet (permanent magnet) in the vibration power generation device by vibrating an object placed on the vibration power generation device.

For example, as illustrated in FIG. 1, vibration of a vibration power generation device G vibrates a magnet 2, connected to a leaf spring 1, in an arrow direction so that a positional relationship with a coil 3 fixed to the vibration power generation device G changes. Then, an interlinkage magnetic flux (magnetic flux passing through coil 3) in the coil 3 of the vibration power generation device G changes. Therefore, because an induced current (induced electromotive force) is generated in the coil 3 by the electromagnetic induction, the kinetic energy caused by the vibration can be converted into the electrical energy.

Because the induced current (induced electromotive force generated in coil) generated by the electromagnetic induction increases as the change amount of the interlinkage magnetic flux in the coil increases, an amount of power generation of the vibration power generation device can be increased by increasing the change amount of the interlinkage magnetic flux in the coil.

Because the change amount of the interlinkage magnetic flux in the coil of the vibration power generation device is affected by, for example, shapes and arrangement of the coil and the magnet, when the vibration power generation device is designed, it is preferable to optimize the shapes and the arrangement of the coil and the magnet so as to increase the change amount of the interlinkage magnetic flux in the coil.

Figure 2:
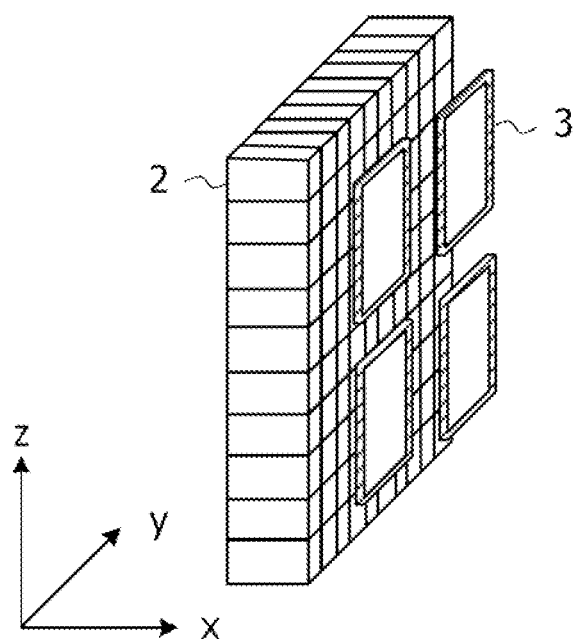
FIG. 2 is a diagram illustrating an example of arrangement of a coil and magnets in a magnetic device.

When the shapes and the arrangement of the coil and the magnet in the magnetic device such as the vibration power generation device are optimized, as illustrated in FIG. 2, for example, the shapes and arrangement of the magnet 2 disposed in a plane and the coil 3 facing the magnet 2 (facing each other) are optimized. Note that, as illustrated in FIG. 2, in the vibration power generation device, there is a case where it is effective to use a large number of small magnets (small magnet) that are arrayed as the magnets 2. Note that FIG. 2 illustrates an example in which the four coils 3 are arranged to be faced to the magnet 2, formed by arranging a large number of small magnets in parallel to a plane (y-z plane) including the y-axis and the z-axis thereon.

Here, for example, when a power generator or the like is generated, performance of the magnetic device is optimized by optimizing an objective function including a design parameter of the magnetic device.

Figure 3:
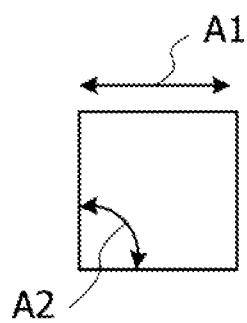
FIG. 3 is a diagram illustrating an example of a design parameter in a case where a shape of the coil is optimized in the related art.
Figure 4:
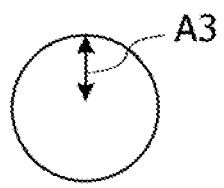
FIG. 4 is a diagram illustrating another example of the design parameter in a case where the shape of the coil is optimized in the related art.

In a case where the magnetic device is a vibration power generation device, a design parameter in a case where the shape of the coil is optimized can be, for example, a length A1 of one side of the coil, an angle A2 between the sides, or the like when the shape of the coil is a quadrangle as illustrated in FIG. 3. Furthermore, the design parameter in a case where the shape of the coil is optimized can be, for example, a radius A3 of the coil when the shape of the coil is a circle as illustrated in FIG. 4.

In the related art described above, for example, by optimizing the objective function including the design parameter designed in this way as a variable, the device is designed. In this way, there is a case where a method of determining a parameter that can uniquely determine a shape of an object and performing optimization by changing the parameter is referred to as "parameter optimization".

Here, in the method using the parameter optimization, the parameter that can uniquely determine the shape of the object is determined and the optimization is performed as described above. Therefore, conditions of the optimization are limited according to properties of the set parameter, and there is a case where it is not possible to sufficiently perform optimization. For example, in a case where a radius of a circle is selected as the design parameter when the shape of the coil is optimized, the shape of the coil is limited to the circle, and a solution is limited without considering shapes other than the circle at the time of optimization. In this case, for example, even when the change amount of the interlinkage magnetic flux in the coil can be maximized by actually using a rectangular coil, the shape of the coil is limited to the circle. Therefore, it is not possible to sufficiently optimize the shape of the coil.

Furthermore, in the method using the parameter optimization described above, the parameter to be changed (design parameter) is a continuous value that may be usually take a wide range of values. Therefore, in the related art using the parameter optimization, when an optimum radius of the coil is obtained in a case where the shape of the coil is set to a circle, for example, the minimum value and the maximum value are set in advance, and the value is continuously changed between the minimum value and the maximum value so as to obtain the optimum radius of the coil.

In the related art described above, in order to optimize the objective function including the design parameter that is such a continuous value, mathematical programming of performing minimization or maximization by adding constraints to the objective function or the like is used.

In order to optimize the change amount of the interlinkage magnetic flux in the coil of the magnetic device such as the vibration power generation device, it is preferable to optimize not only the shape of the coil but also the position, the number, or the like of the coils to be arranged. Therefore, in a case where the change amount of the interlinkage magnetic flux in the coil is optimized by using the related art described above, it is needed to optimize the objective function including the plurality of design parameters that may take a wide range of continuous values.

However, when the objective function is optimized by an algorithm such as mathematical programming, in a case where the number of design parameters included in the objective function is large or in a case where a problem represented by the objective function is an NP hard problem such as a combination optimization problem, there is a case where a calculation time becomes longer.

Here, in the combination optimization problem described above, if the number of factors to be considered increases, the number of combinations of factors enormously increases in terms of an index function. Therefore, in the conventional calculation method of sequentially executing processing, it is particularly difficult to solve the problem in a practical time period if the number of factors to be considered is large.

Therefore, as a technology that can solve the combination optimization problem at high speed, as described above, a technology of performing calculation by an annealing method (annealing) by using an annealing machine or the like has been proposed. As a method of solving the combination optimization problem by the annealing method, for example, a method of using the objective function based on the conditions and constraints of the combination optimization problem has been proposed. Note that there is a case where the objective function is referred to as an energy function, a cost function, a Hamiltonian, or the like.

The objective function (objective function formula) is a function that takes a minimum value when parameters (variable) of the objective function have an optimum combination in the combination optimization problem. Therefore, by searching for a combination of variables that minimizes the objective function (minimizing objective function), the solution of the combination optimization problem can be searched.

Furthermore, in order to efficiently minimize the objective function at high speed by the annealing method (annealing) using the annealing machine or the like, there is a case where it is needed for the objective function to be expressed by a Quadratic Unconstrained Binary Optimization (QUBO: quadratic unconstrained binary optimization) format. Here, the QUBO format means a format in which the objective function to be maximized or minimized with respect to a variable that may be only two values such as zero or one can be expressed up to the second-order term and a range of a variable space is not explicitly limited.

In the annealing method using the annealing machine or the like, for example, the objective function expressed in the QUBO format is converted into a format called the Ising model and the value of the objective function converted into the Ising model is minimized so as to solve the combination optimization problem.

A formula (Ising model formula) obtained by converting the objective function in the QUBO format into the Ising model, for example, can be the Ising model formula in the QUBO format represented by the following formula.

$$E(s) = -\sum_{i,j=0} w_{ij} s_i s_j - \sum_{i=0} b_i s_i + const.$$

However, in the above formula, E (s) is an objective function meaning that minimization solves the combination optimization problem.

The reference $w_{ij}$ represents a coefficient (weight) for weighting between an i-th element (bit) and a j-th element (bit).

The reference $s_i$ is a binary variable that represents that the i-th element (bit) is zero or one, and the reference $s_j$ is a binary variable that represents that the j-th element (bit) is zero or one.

The reference $b_i$ is a numerical value that represents a bias with respect to the i-th element (bit).

The reference const. is a constant.

In the annealing method using the annealing machine or the like, for example, while variously changing each bit (element) in the Ising model formula in the QUBO format described above, the minimum value of the Ising model formula can be efficiently searched in a short time.

Figure 5:
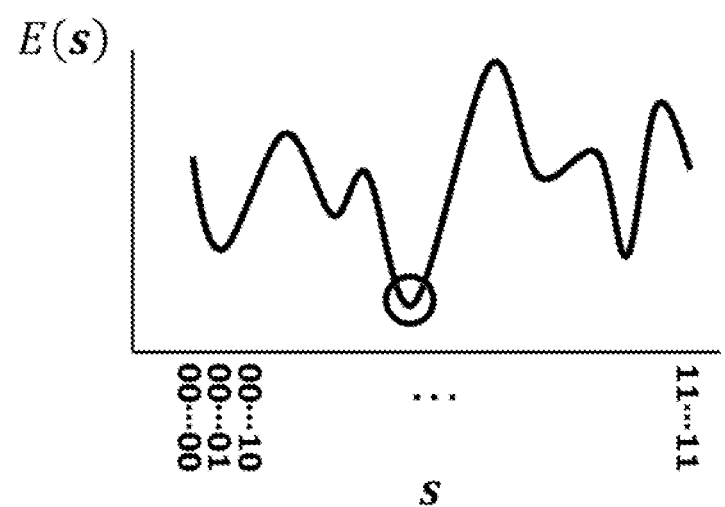
FIG. 5 is a diagram illustrating an example of a state when a combination of bits that give a minimum value to an Ising model formula in a QUBO format is searched.

For example, as illustrated in FIG. 5, by searching a combination of bits (s; zero or one) that give a minimum value to the Ising model formula in the QUBO format (searching for part surrounded by circle) described above, it is possible to specify a state of a bit that can optimize the Ising model formula. Note that, in FIG. 5, the vertical axis is a magnitude of the value of the Ising model formula (E (s)), and the horizontal axis is a combination of bits (s).

Then, in the annealing method using the annealing machine or the like, because it is possible to obtain a parameter that optimizes the objective function on the basis of the specified state of the bit, it is possible to efficiently optimize the objective function in a short time. If the objective function can be expressed in the QUBO format in this way, the objective function can be converted into the Ising model formula in the QUBO format, and the Ising model formula can be efficiently optimized (minimized) by the annealing method in a short time.

Here, as described above, in order to express the objective function in the QUBO format, it is requested that the variable (parameter) included in the objective function to be optimized be a binary variable that may take only two values such as zero or one.

However, as described above, in the related art, for example, the parameter (design parameter) of the objective function used to optimize the shape and the arrangement of the coil is a continuous value that may take a wide range of values. Therefore, in the related art described above, because the design parameter is the continuous value that may take a wide range of values, it is not possible to express the objective function in the QUBO format suitable for the annealing method, and it is not possible to perform efficient optimization by the annealing method by using the annealing machine or the like. Therefore, in the related art, in order to optimize the change amount of the interlinkage magnetic flux in the coil of the magnetic device such as the vibration power generation device, it is not possible to efficiently perform calculation in order to optimize the shape and the arrangement of the coil, and there has been a case where the calculation time becomes longer.

In this way, in the related art, when the change amount of the interlinkage magnetic flux in the coil of the magnetic device such as the vibration power generation device is optimized, there has been a case where the shape of the coil is limited by the parameter or a case where it is not possible to efficiently perform optimization and a long time is needed for optimization. For example, in the related art, there has been a case where it is not possible to sufficiently and efficiently optimize the change amount of the interlinkage magnetic flux in the coil of the magnetic device.

Therefore, the present inventors have intensively studied on a device or the like that can sufficiently and efficiently optimize the change amount of the interlinkage magnetic flux in the coil of the magnetic device and have obtained following knowledge.

For example, the present inventors have found that the following optimizer or the like can sufficiently and efficiently optimize the change amount of the interlinkage magnetic flux in the coil of the magnetic device.

The optimizer as an example of the technology disclosed in this case includes an optimization processing unit that optimizes the change amount of the interlinkage magnetic flux in the coil by using the objective function formula that maximizes the sum of $\Delta\varphi_i^{right} x_i$ (i=1 to $N_c$) and $\Delta\varphi_i^{left} y_i$ (i=1 to $N_c$), when it is assumed that the surface of the magnetic device where the coil is arranged be divided into $N_c$ ($N_c$ is integer) coil regions, in the i-th coil region $N_i$, the auxiliary variable of the clockwise coil that may exist in the coil region $N_i$ be $x_i$, and the auxiliary variable of the counterclockwise coil that may exist in the coil region $N_i$ be $y_i$, a case where the clockwise coil exists be $x_i=1$, a case where the clockwise coil does not exist be $x_i=0$, a case where the counterclockwise coil exists be $y_i=1$, a case where the counterclockwise coil does not exist be $y_i=0$, both of the clockwise coil and the counterclockwise coil do not exist when $x_i=1$ and $y_i=1$ are satisfied, and the change amount of the interlinkage magnetic flux of the clockwise coil in the coil region $N_i$ be $\Delta\varphi_i^{right}$ and the change amount of the interlinkage magnetic flux of the counterclockwise coil in the coil region $N_i$ be $\Delta\varphi_i^{left}$.

Here, in an example of the technology disclosed in this case, a surface of the magnetic device where the coil is arranged is divided into $N_c$ ($N_c$ is integer) coil regions. For example, in an example of the technology disclosed in this case, a surface of the magnetic device where the coil may be arranged is divided into a predetermined number ($N_c$) to form the $N_c$ coil regions.

Furthermore, in the following, there is a case where an i-th coil region of the $N_c$ coil regions is referred to as a coil region $N_i$. Note that, an individual coil region of the $N_c$ coil regions is referred to as a "coil region", and the entire $N_c$ coil regions (set of $N_c$ coil regions) is referred to as a "coil arrangement region".

Then, in an example of the technology disclosed in this case, it is assumed that an auxiliary variable of a clockwise coil that may exist in the i-th coil region $N_i$ be $x_i$ and an auxiliary variable of a counterclockwise coil that may exist in the i-th coil region $N_i$ be $y_i$.

Moreover, in an example of the technology disclosed in this case, regarding the auxiliary variables described above, in a case where the clockwise coil exists, $x_i=1$ is satisfied, in a case where the clockwise coil does not exist, $x_i=0$ is satisfied, in a case where the counterclockwise coil exists, $y_i=1$ is satisfied, and in a case where the counterclockwise does not exist, $y_i=0$ is satisfied. In addition, in an example of the technology disclosed in this case, it is assumed that, when both $x_i=1$ and $y_i=1$ are satisfied, both of the clockwise coil and the counterclockwise coil do not exist.

In an example of the technology disclosed in this case, whether or not the clockwise coil exists in the i-th coil region $N_i$ or whether or not the counterclockwise coil exists is expressed by using the auxiliary variable represented by zero or one in this way. As a result, in an example of the technology disclosed in this case, for each of the $N_c$ coil regions, a case where the clockwise coil exists, a case where the counterclockwise coil exists, and a case where the coils do not exist can be expressed by the auxiliary variable represented by zero or one.

In this way, in an example of the technology disclosed in this case, the coil region is obtained by dividing the surface of the magnetic device where the coil may be arranged, and the auxiliary variable used to express the existence of the clockwise coil and the auxiliary variable used to express the existence of the counterclockwise coil are prepared for each coil region. For example, in an example of the technology disclosed in this case, the surface where the coil is arranged is divided into the coil regions and the state of the coil in each coil region is expressed by the auxiliary variable so that the shape, the position, the number, or the like of the coils in the magnetic device can be expressed as a set of the coil regions.

Therefore, in an example of the technology disclosed in this case, by optimizing the objective function formula including these auxiliary variables as parameters, it is possible to optimize the change amount of the interlinkage magnetic flux in the coil without limiting the shape, the position, the number, or the like of the coils. For example, in an example of the technology disclosed in this case, because the shape or the like of the coil is not limited by the parameter of the objective function formula, the shape of the coil can be sufficiently optimized. Therefore, the change amount of the interlinkage magnetic flux in the coil can be optimized.

Moreover, in an example of the technology disclosed in this case, the auxiliary variable described above is a discretized binary variable represented by zero or one. Therefore, in an example of the technology disclosed in this case, because the discretized binary auxiliary variable represented by zero or one can be set to a variable (parameter) of the objective function formula, the objective function formula can be expressed in the QUBO format (converted into QUBO).

For example, in an example of the technology disclosed in this case, it is assumed that the change amount of the interlinkage magnetic flux of the clockwise coil in the coil region $N_i$ be $\Delta\varphi_i^{right}$ and the change amount of the interlinkage magnetic flux of the counterclockwise coil in the coil region $N_i$ be $\Delta\varphi_i^{left}$. Then, in an example of the technology disclosed in this case, by using the objective function formula that maximizes a sum of $\Delta\varphi_i^{right} x_i$ (i=1 to $N_c$) and $\Delta\varphi_i^{left} y_i$ (i=1 to $N_c$), the change amount of the interlinkage magnetic flux in the coil is optimized.

Here, for example, in a case where the direction and the arrangement of the magnets in the magnetic device are fixed, the change amount $\Delta\varphi_i^{right}$ of the interlinkage magnetic flux of the clockwise coil in the coil region $N_i$ and the change amount $\Delta\varphi_i^{left}$ of the interlinkage magnetic flux of the counterclockwise coil in the coil region $N_i$ can be constant values. Therefore, the objective function formula that maximizes the sum of $\Delta\varphi_i^{right} x_i$ (i=1 to $N_c$) and $\Delta\varphi_i^{left} y_i$ (i=1 to $N_c$) described above is a function formula using the auxiliary variables $x_i$ and $y_i$ as variables (parameter). As described above, because the auxiliary variables $x_i$ and $y_i$ are the discretized binary variables represented by zero or one, the objective function formula using these auxiliary variables as parameters can be expressed in the QUBO format.

For example, in an example of the technology disclosed in this case, by using the objective function formula, which can be converted into the QUBO format, that maximizes the sum of $\Delta\varphi_i^{right} x_i$ (i=1 to $N_c$) and $\Delta\varphi_i^{left} y_i$ (i=1 to $N_c$), the change amount of the interlinkage magnetic flux in the coil is optimized. Therefore, in an example of the technology disclosed in this case, because the objective function formula that can be converted into the Ising model formula in the QUBO format is used, the optimization can be efficiently performed by the annealing method using the annealing machine or the like. For example, in an example of the technology disclosed in this case, because the objective function formula can be expressed in the QUBO format suitable for the annealing method, the objective function formula can be efficiently optimized.

As described above, in the technology disclosed in this case, when the change amount of the interlinkage magnetic flux in the coil of the magnetic device is optimized, the shape of the coil or the like is not limited by the parameter of the objective function formula, and in addition, the objective function formula can be expressed in the QUBO format. Therefore, in the technology disclosed in this case, it is possible to sufficiently and efficiently optimize the change amount of the interlinkage magnetic flux in the coil of the magnetic device.

In the following description, an example of the technology disclosed in this case will be described with reference to the drawings. Note that processing (operation) such as the optimization of the change amount of the interlinkage magnetic flux in the coil of an optimizer as an example of the technology disclosed in this case can be executed by, for example, an optimization processing unit included in the optimizer. Here, the optimizer disclosed in this case may further include other units (devices) as needed.

The optimizer disclosed in this case is a device that optimizes the change amount of the interlinkage magnetic flux in the coil of the magnetic device.

Here, the magnetic device that optimizes the change amount of the interlinkage magnetic flux in the coil by using an example of the technology disclosed in this case is not particularly limited as long as the magnetic device includes the coil and the magnet, and the magnetic device can be appropriately selected according to the purpose. The magnetic device is, for example, a vibration power generation device, a planar motor, a linear motor, a magnetic levitation device, or the like.

In an example of the technology disclosed in this case, the interlinkage magnetic flux in the coil of the magnetic device means a magnetic flux generated from the magnet included in the magnetic device and interlinking with (passing through) the coil. Furthermore, in a case where the magnetic device includes the plurality of coils (in a case where a plurality of groups of coil regions exists), the interlinkage magnetic flux in the coil of the magnetic device can be, for example, the total of the interlinkage magnetic fluxes of the plurality of coils.

The change amount of the interlinkage magnetic flux in the coil of the magnetic device can be, for example, a difference between the interlinkage magnetic fluxes before and after the change when at least one of the coil and the magnet of the magnetic device moves and a relative positional relationship between the coil and the magnet changes.

<Coil Optimization>

First, as an example of the technology disclosed in this case, a case will be described where the change amount of the interlinkage magnetic flux in the coil of the magnetic device is optimized by optimizing the shape and the arrangement of the coil while fixing the direction and the arrangement of the coils in the magnetic device.

«Coil Region»

In an example of the technology disclosed in this case, the optimization processing unit divides the surface of the magnetic device where the coil is arranged into $N_c$ ($N_c$ is integer) coil regions. For example, the optimization processing unit divides the surface of the magnetic device where the coil may be arranged into a predetermined number ($N_c$) to form the $N_c$ coil regions.

Furthermore, "to divide the surface where the coil is arranged" means to virtually divide the surface where the coil may be arranged when the change amount of the interlinkage magnetic flux in the coil of the magnetic device is optimized, for example, when the magnetic device of which the change amount of the interlinkage magnetic flux in the coil is optimized is designed. For example, in an example of the technology disclosed in this case, by dividing the surface where the coil is arranged, the surface is used as the set of the $N_c$ coil regions (coil arrangement region).

Figure 6:
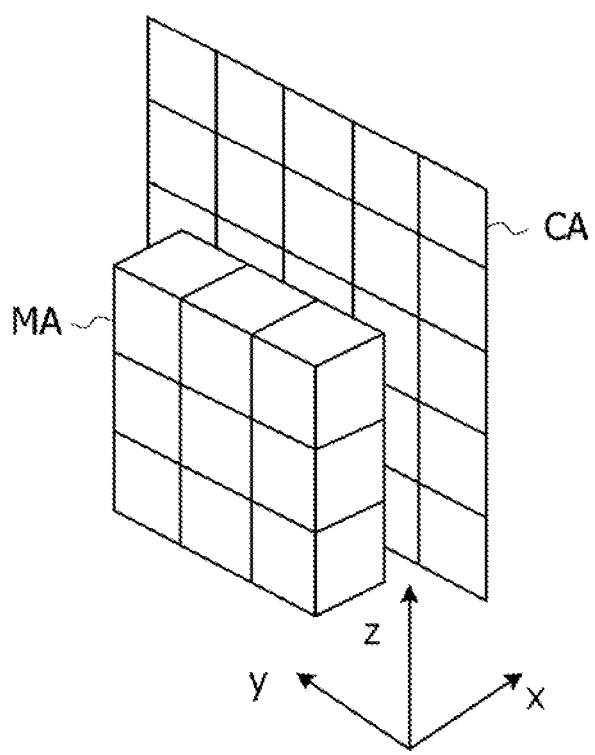
FIG. 6 is a diagram illustrating an example a positional relationship between a coil arrangement region and a magnet arrangement region.

Furthermore, it is preferable that the surface of the magnetic device where the coil is arranged be a surface facing (opposing to) the region of the magnetic device where the magnet is arranged, for example, because the interlinkage magnetic flux in the coil can be increased. For example, in an example of the technology disclosed in this case, it is preferable that the coil arrangement region and the magnet arrangement region face each other. For example, as illustrated in FIG. 6, in a case where a region where the magnets are arranged (magnet arrangement region MA) is set to be parallel to a plane including the y-axis and the z-axis (y-z plane), it is preferable to set the surface where the coils are arranged (coil arrangement region CA) to be parallel to the y-z plane.

A method of dividing the surface where the coil is arranged is not particularly limited as long as the surface where the coil is arranged can be divided into the $N_c$ coil regions and can be appropriately selected according to the purpose. As a method of dividing the surface where the coil is arranged, for example, a method of dividing the surface into each coil region having a rectangular shape (method of dividing surface into grid pattern (grid pattern)), a method of dividing the surface into each coil region having a triangular shape, or the like can be exemplified.

Figure 7:
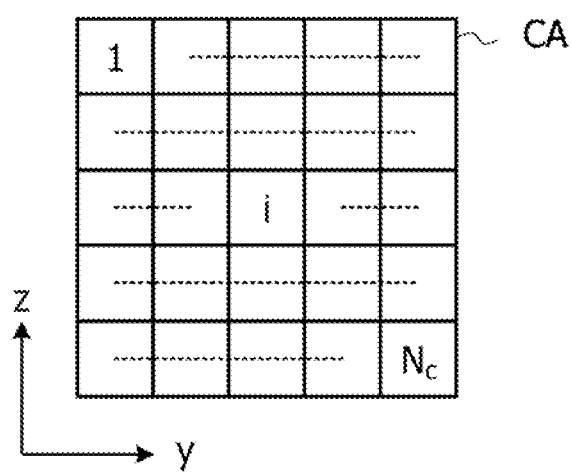
FIG. 7 is a diagram illustrating an example of the coil arrangement region.

For example, as illustrated in FIG. 7, when the surface where the coil is arranged (coil arrangement region CA) is divided into $N_c$ coil regions each having a shape of a square that is an example of a rectangular shape, the surface where the coil is arranged becomes a set of the $N_c$ square coil regions. Furthermore, as illustrated in FIG. 7, there is a case where the i-th coil region of the $N_c$ coil regions is referred to as a coil region $N_i$ by using i that is an integer between one to $N_c$.

Here, the number of divisions of the surface where the coil is arranged (the number of coil regions) "$N_c$" is not particularly limited as long as the number is an integer equal to or more than two and can be appropriately selected according to the purpose.

For example, "$N_c$" can be appropriately selected, for example, according to the number of bits that can be used by a computer (for example, annealing machine) used to optimize the objective function formula, requested calculation accuracy, a size of the coil that can be actually manufactured, or the like.

«Auxillary Variable»

In an example of the technology disclosed in this case, the optimization processing unit sets the auxiliary variable of the clockwise coil that may exist in the i-th coil region $N_i$ to be $x_i$ and the auxiliary variable of the counterclockwise coil that may exist in the i-th coil region $N_i$ to be $y_i$. Moreover, in an example of the technology disclosed in this case, the optimization processing unit sets $x_i=1$ in a case where the clockwise coil exists, sets $x_i=0$ in a case where the clockwise coil does not exist, sets $y_i=1$ in a case where the counterclockwise coil exists, and sets $y_i=0$ in a case where the counterclockwise coil does not exist.

For example, in an example of the technology disclosed in this case, for each coil region, the auxiliary variable used to express the existence of the clockwise coil and the auxiliary variable represented by zero or one used to express the existence of the counterclockwise coil are prepared. Then, in an example of the technology disclosed in this case, the clockwise coil and the counterclockwise coil are distinguished from each other, and the auxiliary variable is set to one in a case where the coil exists in the i-th coil region $N_i$, and the auxiliary variable is set to zero in a case where the coil does not exist in the i-th coil region $N_i$.

In addition, in an example of the technology disclosed in this case, the optimization processing unit assumes that both of the clockwise coil and the counterclockwise coil do not exist in the i-th coil region $N_i$ when both $x_i=1$ and $y_i=1$ are satisfied. Furthermore, similarly, in an example of the technology disclosed in this case, the optimization processing unit assumes that both of the clockwise coil and the counterclockwise coil do not exist in the i-th coil region $N_i$ when both $x_i=0$ and $y_i=0$ are satisfied.

In an example of the technology disclosed in this case, regarding each coil region, a case where the clockwise coil exists, a case where the counterclockwise coil exists, and a case where the coil does not exist can be uniquely and consistently expressed by using the auxiliary variable $x_i$ of the clockwise coil and the auxiliary variable $y_i$ of the counterclockwise coil.

In this way, in an example of the technology disclosed in this case, because the state of the coil in each coil region can be uniquely and consistently expressed by using the auxiliary variables, the shape, the position, and the number of coils in the magnetic device can be expressed as a set of the coil regions by the combination of the values of the auxiliary variables. Therefore, in an example of the technology disclosed in this case, by optimizing the objective function formula using these auxiliary variables as parameters, the shape, the possible, and the number of coils are optimized, and the change amount of the interlinkage magnetic flux in the coil can be sufficiently optimized.

Here, in an example of the technology disclosed in this case, the clockwise coil and the counterclockwise coil mean coils of which winding directions of conducting wires are different from each other. In an example of the technology disclosed in this case, for example, when viewed from a side, of the surface where the coil is arranged, opposite to a side where the region where the magnets are arranged (magnet arrangement region) is positioned, a clockwise coil can be used as the clockwise coil, and a counterclockwise coil can be used as the counterclockwise coil.

Furthermore, in an example of the technology disclosed in this case, in a case where the coil existing in the i-th coil region $N_i$ is the same kind as a coil existing in a coil region adjacent to the coil region $N_i$, it is preferable to combine these coil regions into a single coil region. For example, in an example of the technology disclosed in this case, in a case where the clockwise coil or the counterclockwise coil exists in the coil region $N_i$, when a coil in a direction same as that of the coil in the coil region $N_i$ exists in the coil region adjacent to the coil region $N_i$, these coil regions are combined. For example, in a case where the clockwise coil exists in the i-th coil region $N_i$, when the clockwise coil also exists in an i+1-th coil region $N_{i+1}$ adjacent to the coil region $N_i$, these coil regions can be combined into a single coil region. Furthermore, the coil region adjacent to the coil region $N_i$ may be, for example, a coil adjacent to the i-th coil region $N_i$ in FIG. 7 in the y-axis direction or may be a coil region adjacent to the i-th coil region $N_i$ in FIG. 7 in the z-axis direction.

In an example of the technology disclosed in this case, by combining the same kind of adjacent coil regions into the single coil region, it is possible to obtain the shape, the number, the position, or the like of the coils optimum for the magnetic device as a form that can more easily used for actual design of the magnetic device.

Figure 8:
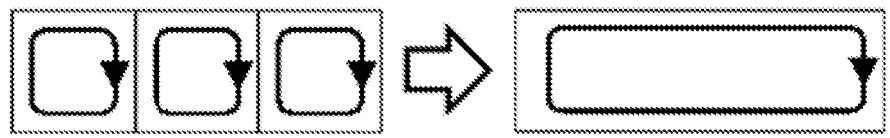
FIG. 8 is a diagram illustrating an example of processing when the same kind of adjacent coil regions are combined into a single coil region.
Figure 9:
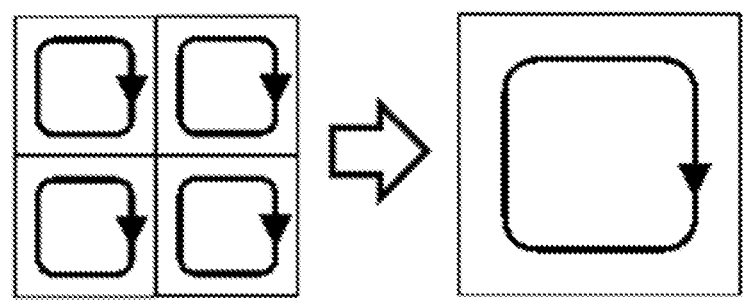
FIG. 9 is a diagram illustrating another example of the processing when the same kind of adjacent coil regions are combined into a single coil region.

For example, as illustrated in FIG. 8, in an example of the technology disclosed in this case, in a case where three clockwise coils are adjacent to each other in three adjacent coil regions in the y-axis direction, these three coil regions are combined into a single coil region to form a single rectangular clockwise coil. Furthermore, as illustrated in FIG. 9, in an example of the technology disclosed in this case, in a case where four clockwise coils are adjacent to each other in four adjacent coil regions in the y-axis and the z-axis directions, these four coil regions are combined into a single coil region to form a single square clockwise coil.

In an example of the technology disclosed in this case, in a case where the same kind of adjacent coil regions are combined into the single coil region, it is preferable to combine the same kind of adjacent coil regions for each coil region in the coil arrangement region. For example, in an example of the technology disclosed in this case, for each coil region in the coil arrangement region, it is preferable to execute processing of combining the coils in the entire coil arrangement region by repeatedly combining the same kind of adjacent coil regions into a single coil region.

In this way, in an example of the technology disclosed in this case, it is possible to obtain the shape, the number, the position, or the like of the coil optimum for the magnetic device in the entire surface where the coil is arranged (coil arrangement region) as a form that can be more easily used for the actual design of the magnetic device.

Furthermore, in an example of the technology disclosed in this case, in a case where the coil existing in the i-th coil region $N_i$ is not the same kind as the coil existing in the coil region adjacent to the coil region $N_i$ (different kinds), the each coil regions are assumed as different coil regions. For example, in an example of the technology disclosed in this case, in a case where the clockwise coil or the counterclockwise coil exists in the coil region $N_i$, when a coil in a direction different from that in the coil region $N_i$ exists in the coil region adjacent to the coil region $N_i$, these coil regions are used as different coil regions.

Figure 10:
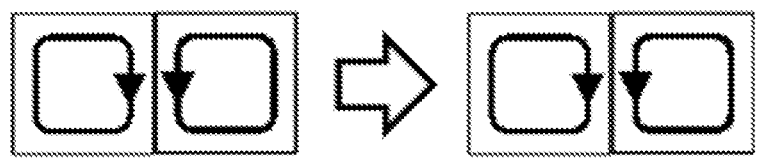
FIG. 10 is a diagram illustrating an example of processing on various kinds of adjacent coil regions.

For example, as illustrated in FIG. 10, in an example of the technology disclosed in this case, in a case where the directions of the coils are different from each other in two coil regions adjacent in the y-axis direction, these two coil regions are used as different coil regions.

In addition, in an example of the technology disclosed in this case, as described above, when both $x_i=1$ and $y_i=1$ are satisfied in the i-th coil region $N_i$, it is assumed that the clockwise coil and the counterclockwise coil do not exist. For example, in an example of the technology disclosed in this case, under a condition in which the coils in different directions are arranged in the single coil region, it is assumed that the coils do not exist in the coil region.

Figure 11:
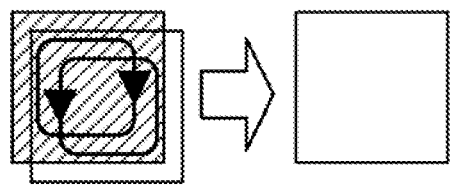
FIG. 11 is a diagram illustrating an example of processing in a case where coils in different directions exist in the same coil region.

For example, as illustrated in FIG. 11, in an example of the technology disclosed in this case, in a case of the condition where the coils in the different directions (clockwise coil and counterclockwise coil) exist in the same coil region, it is assumed that the coils do not exist in this coil region.

«Objective Function Formula»

In an example of the technology disclosed in this case, the optimization processing unit sets the change amount of the interlinkage magnetic flux of the clockwise coil in the coil region $N_i$ to be $\Delta\varphi_i^{right}$ and the change amount of the interlinkage magnetic flux of the counterclockwise coil in the coil region $N_i$ to be $\Delta\varphi_i^{left}$. Then, in an example of the technology disclosed in this case, by using the objective function formula that maximizes a sum of $\Delta\varphi_i^{right} x_i$ (i=1 to $N_c$) and $\Delta\varphi_i^{left} y_i$ (i=1 to $N_c$), the change amount of the interlinkage magnetic flux in the coil is optimized.

Here, in a case where the directions and the arrangement of the magnets in the magnetic device are fixed as described above, the change amount $\Delta\varphi_i^{right}$ of the interlinkage magnetic flux of the clockwise coil in the coil region $N_i$ and the change amount $\Delta\varphi_i^{left}$ of the interlinkage magnetic flux of the counterclockwise coil in the coil region $N_i$ can be constant values. For example, in a case where the directions and the arrangement of the magnets in the magnetic device are fixed, the change amount $\Delta\varphi_i^{right}$ of the interlinkage magnetic flux of the clockwise coil in the coil region $N_i$ and the change amount $\Delta\varphi_i^{left}$ of the interlinkage magnetic flux of the counterclockwise coil in the coil region $N_i$ can be constants that can define the coil region $N_i$.

The objective function formula that maximizes the sum of $\Delta\varphi_i^{right} x_i$ (i=1 to $N_c$) and $\Delta\varphi_i^{left} y_i$ (i=1 to $N_c$) is not particularly limited as long as the objective function formula is a function using the auxiliary variable $x_i$ and the auxiliary variable $y_i$ as variables (parameters) and can be appropriately selected according to the purpose.

Here, because the auxiliary variable $x_i$ of the clockwise coil and the auxiliary variable $y_i$ of the counterclockwise coil are the discretized binary variables represented by zero or one, the objective function formula using these auxiliary variables as parameters can be expressed in the QUBO format. For example, in an example of the technology disclosed in this case, because the objective function formula can be expressed in the QUBO format suitable for the annealing method, the objective function formula can be efficiently optimized.

Here, a specific example of the objective function formula in a case where the shape or the like of the coil is optimized used in an example of the technology disclosed in this case will be described.

For example, the objective function formula that optimizes (maximize) the change amount of the interlinkage magnetic flux in the coil of the magnetic device can be expressed by the following formula when the change amount of the interlinkage magnetic flux in the entire coil of the magnetic device is set to be $\Delta\varphi$.

$$\mathcal{H} = \Delta\phi \to \max. \qquad \text{[Expression 2]}$$

However, in the above formula, the reference H is an objective function formula optimized by maximizing the value.

The reference $\Delta\varphi$ is the change amount of the interlinkage magnetic flux in the entire coil of the magnetic device.

Note that "→max" is a symbol that means to maximize the objective function formula.

Here, the change amount $\Delta\varphi$ of the interlinkage magnetic flux in the entire coil of the magnetic device in the above formula can be considered as a total obtained by adding the change amount $\Delta\varphi_i^{right}$ of the interlinkage magnetic flux of the clockwise coil in the coil region $N_i$ obtained by dividing the surface where the coil is arranged (coil arrangement region) and the change amount $\Delta\varphi_i^{left}$ of the interlinkage magnetic flux of the counterclockwise coil in the coil region $N_i$ in the coil arrangement region.

Furthermore, according to the Faraday's law of induction, depending on whether the clockwise coil exists or the counterclockwise coil exists in the i-th coil region $N_i$, a positive or negative sign of the change amount of the interlinkage magnetic flux in the i-th coil region $N_i$ differs. For example, the change amount of the interlinkage magnetic flux in a case where the clockwise coil exists in the i-th coil region $N_i$ and the change amount of the interlinkage magnetic flux in a case where the counterclockwise coil exists in the i-th coil region $N_i$ have the same values and different signs.

For example, when it is assumed that the change amount of the interlinkage magnetic flux of the clockwise coil in the coil region $N_i$ be $\Delta\varphi_i^{right}$ and the change amount of the interlinkage magnetic flux of the counterclockwise coil in the coil region $N_i$ be $\Delta\varphi_i^{left}$, a relationship in the following formula is satisfied.

$$\Delta\phi_i^{right} = -\Delta\phi_i^{left} \qquad \text{[Expression 3]}$$

Therefore, the objective function formula expressed by the change amount $\Delta\varphi$ of the interlinkage magnetic flux in the entire coil can be expressed as the following formula by using the change amount $\Delta\varphi_i^{right}$ of the interlinkage magnetic flux of the clockwise coil, the change amount $\Delta\varphi_i^{left}$ of the interlinkage magnetic flux of the counterclockwise coil, the auxiliary variable $x_i$, and the auxiliary variable $y_i$.

$$\mathcal{H} = \sum_{i=1}^{N_c} \Delta\phi_i^{right} x_i + \sum_{i=1}^{N_c} \Delta\phi_i^{left} y_i \to \max.$$

However, in the above formula, the reference H is an objective function formula optimized by maximizing the value.

The reference $N_c$ is an integer that represents the number of coil regions.

The reference $\Delta\varphi_i^{right}$ is a numerical value that represents the change amount of the interlinkage magnetic flux of the clockwise coil in the i-th coil region $N_i$.

The $\Delta\varphi_i^{left}$ is a numerical value that represents the change amount of the interlinkage magnetic flux of the counterclockwise coil in the i-th coil region $N_i$.

The reference $x_i$ is an auxiliary variable of the clockwise coil that may exist in the coil region $N_i$.

The reference $y_i$ is an auxiliary variable of the counterclockwise coil that may exist in the coil region $N_i$.

Note that "→max" is a symbol that means to maximize the objective function formula.

Because the total of the change amounts of the interlinkage magnetic fluxes in the coils that may exist in the $N_c$ coil regions can be maximized by maximizing the objective function formula (H), the change amount of the interlinkage magnetic flux in the entire coil of the magnetic device can be maximized. Therefore, by maximizing the objective function formula (H), the change amount of the interlinkage magnetic flux in the coil of the magnetic device can be optimized.

Furthermore, in a case where the objective function formula is optimized by the annealing method (annealing) using the annealing machine described above, there is a case where a format in which the objective function is optimized when the objective function formula is minimized is requested. Therefore, when the objective function formula described above is deformed to be optimized when being minimized, the objective function formula can be expressed as the following formula.

$$E = -\mathcal{H} = -\sum_{i=1}^{N_c} \Delta\phi_i^{right} x_i - \sum_{i=1}^{N_c} \Delta\phi_i^{left} y_i \to \min.$$

This formula is obtained by deforming the objective function formula to be optimized when being minimized by multiplying both sides of the objective function formula described above by "minus (−)".

However, the reference E is an objective function formula that is optimized by minimizing the value.

Note that "→min" is a symbol that means to minimize the objective function formula.

For example, in an example of the technology disclosed in this case, it is preferable that the optimization processing unit perform optimization, for example, on the basis of the objective function formula represented by the following formula (1).

$$E = -\sum_{i=1}^{N_c} \Delta\phi_i^{right} x_i - \sum_{i=1}^{N_c} \Delta\phi_i^{left} y_i \qquad \text{Formula (1)}$$

However, in formula (1),
the reference E is an objective function formula.
The reference $N_c$ is an integer that represents the number of coil regions.
The reference $\Delta\phi_i^{right}$ is a numerical value that represents the change amount of the interlinkage magnetic flux of the clockwise coil in the i-th coil region $N_i$.
The $\Delta\phi_i^{left}$ is a numerical value that represents the change amount of the interlinkage magnetic flux of the counterclockwise coil in the i-th coil region $N_i$.
The reference $x_i$ is an auxiliary variable of the clockwise coil that may exist in the coil region $N_i$.
The reference $y_i$ is an auxiliary variable of the counterclockwise coil that may exist in the coil region $N_i$.

The above formula (1) is a formula that is optimized by minimizing the objective function formula (E), that is, a formula that can optimize the change amount of the interlinkage magnetic flux of the magnetic device by minimizing the objective function formula (E). Therefore, the above formula (1) can be preferably used when the objective function formula is optimized by the annealing method (annealing) using the annealing machine. Note that the above formula (1) is an objective function formula using the discretized binary auxiliary variables $x_i$ and $y_i$ represented by zero or one as variables and is an objective function formula in the QUBO format.

Here, as a method of optimizing the objective function formula, for example, a method is preferable of converting the objective function formula into the Ising model formula in the QUBO format and minimizing the value of the objective function formula converted into the Ising model formula.

As the objective function formula converted into the Ising model formula, for example, it is preferable to use a formula represented by the following formula (3). For example, in an example of the technology disclosed in this case, it is preferable that the optimization processing unit perform optimization on the basis of the objective function formula converted into the Ising model formula represented by the following formula (3).

$$E = -\sum_{i,j=0} w_{ij} s_i s_j - \sum_{i=0} b_i s_i \qquad \text{Formula (3)}$$

However, in the above formula (3),
the reference E is an objective function formula converted into the Ising model formula,
the reference $w_{ij}$ is a numerical value that represents an interaction between an i-th bit and a j-th bit,
the reference $b_i$ is a numerical value that represents a bias with respect to the i-th bit,
the reference $s_i$ is a binary variable that represents that the i-th bit is zero or one, and
the reference $s_j$ is a binary variable that represents that the j-th bit is zero or one.

Here, $w_{ij}$ in the above formula (3) can be obtained, for example, by extracting the numerical value or the like of each parameter in the objective function formula before being converted into the Ising model formula for each combination of $s_i$ and $s_j$ and is usually a matrix.

One term on the right side of the above formula (3) is obtained by integrating products of states (state) and weight values (weight) of two circuits without omission and duplication for all the combinations of two circuits that can be selected from all the circuits.

Furthermore, two items on the right side in the above formula (3) is obtained by integrating products of values and states of each biases of all the circuits.

For example, by extracting the parameters of the objective function formula before being converted into the Ising model formula and obtaining $w_{ij}$ and $b_i$, the objective function formula can be converted into the Ising model formula represented by the above formula (3).

The objective function formula converted into the Ising model formula as described above can be optimized (minimized) in a short time, for example, by performing the annealing method (annealing) using the annealing machine or the like. For example, in an example of the technology disclosed in this case, it is preferable that the optimization processing unit optimize the objective function formula by the annealing method.

The annealing machine used to optimize the objective function formula is, for example, a quantum annealing machine, a semiconductor annealing machine using the semiconductor technology, a machine of performing Simulated Annealing (Simulated Annealing) executed by software by using a Central Processing Unit (CPU) or a Graphics Processing Unit (GPU), or the like. Furthermore, for example, Digital Annealer (registered trademark) may be used as the annealing machine.

Note that details of the annealing method using the annealing machine will be described later.

<Optimization of Coil and Magnet>

From here, as an example of the technology disclosed in this case, a case where not only the shape or the like of the coil but also the directions, the arrangement, or the like of the magnets are optimized without fixing the directions and the arrangement of the magnets in the magnetic device will be described. Note that there is a case where description of a part that can be optimized similarly to the optimization of the shape or the like of the coil described above is omitted.

Here, as described above, in the related art, when the change in the interlinkage magnetic flux in the coil of the magnetic device is to be optimized, there has been a case where the shape of the coil is limited by the parameter or a case where it is not possible to efficiently perform optimization and a long time is needed for optimization. Therefore, when arrangement or the like of both of the coil and the magnet of the magnetic device is to be optimized by using such related art, in particular, the optimization of the coil becomes insufficient and inefficient, and there is a case where it is not possible to sufficiently and efficiently optimize the performance of the magnetic device.

When the arrangement or the like of both the coil and the magnet of the magnetic device is optimized, a case is considered where the magnet is optimized by the annealing method, for example, by using the technology using the parameter optimization described above to optimize the coil. Note that, as the technology of optimizing the arrangement of the magnets of the magnetic device, for example, a technology is proposed that formulates optimization of directions of small magnets each being arranged as a combination optimization problem when the magnet is formed by a large number of small magnets and performs optimization by the annealing machine. As such a technology, for example, a technology proposed in "A. Maruo, H. Igarashi, H. Oshima and S. Shimokawa, "Optimization of Planar Magnet Array Using Digital Annealer," in IEEE Transactions on Magnetics. doi:10.1109/TMAG.2019.2957805." can be used. Note that the technology disclosed in the above document can be used for the optimization of the directions and the arrangement of the magnets to be described below.

For example, when alternately optimizing the shape or the like of the coil by optimizing the parameters and optimizing the arrangement or the like of magnets by the annealing method, the calculation result depends on an initial value of the optimization, there is a case where an optimum solution is not reached (fall into local solution), and there is a case where it is not possible to sufficiently perform the optimization. Furthermore, in a case where the optimization of the shape or the like of the coil by the parameter optimization and the optimization of the arrangement or the like of the magnets by the annealing method are alternately performed, the calculation for optimization becomes repeated calculation for these twice of optimization. Therefore, the calculation time increases, and there is a case where it is not possible to efficiently perform optimization.

In this way, in the method using the related art, there has been a case where it is not possible to sufficiently and efficiently optimize the change amount of the interlinkage magnetic flux in the coil of the magnetic device by optimizing the arrangement or the like of both the coil and the magnets of the magnetic device.

In an example of the technology disclosed in this case, for example, not only the shape or the like of the coil but also the directions, the arrangement, or the like of the magnets can be optimized by setting as described below. For example, in an example of the technology disclosed in this case, when it is assumed that the region of the magnetic device where the magnet is arranged be divided into $N_m$ ($N_m$ is integer) magnet regions, and in the j-th magnet region $N_j$, a case where the direction of the magnetization in the magnet region $N_j$ is a positive direction in the x-axis be $s_{j,1}$, a case where the direction is a negative direction in the x-axis be $s_{j,2}$, a case where the direction is a positive direction in the y-axis be $s_{j,3}$, a case where the direction is a negative direction in the y-axis be $s_{j,4}$, a case where the direction is a positive direction in the z-axis be $s_{j,5}$, and a case where the direction is a negative direction in the z-axis be $s_{j,6}$, under the constraint that any one of $s_{j,k}$ (k=1, 2, 3, 4, 5, 6) is "one" or all of them are "zero", when it is assumed that the change amount of the interlinkage magnetic flux of the clockwise coil in the coil region $N_i$ generated from the magnet region $N_j$ in the coil region facing the magnet region be $\Delta\varphi'^{right}_i$ and the change amount of the counterclockwise coil in the coil region $N_i$ be $\Delta\varphi'^{left}_i$, the optimization processing unit optimizes the change amount of the interlinkage magnetic flux in the coil by using the objective function formula that maximizes the sum of $\Delta\varphi'^{right}_i x_i$ (i=1 to $N_c$) and $\Delta\varphi'^{left}_i y_i$ (i=1 to $N_c$).

«Magnet Region»

In an example of the technology disclosed in this case, the optimization processing unit divides the region of the magnetic device where the magnets are arranged into $N_m$ ($N_m$ is integer) magnet regions. For example, in an example of the technology disclosed in this case, the optimization processing unit divides a region, on which the magnets may be arranged, in the magnetic device into a predetermined number ($N_m$) to form the $N_m$ magnet regions.

Furthermore, in the following description, there is a case where a j-th magnet region of the $N_m$ magnet regions is referred to as a magnet region $N_j$. Note that an individual magnet region of the $N_m$ magnet regions is referred to as a "magnet region", and an entire $N_m$ magnet regions (set of $N_m$ magnet regions) is referred to as a "magnet arrangement region".

Furthermore, "to divide the region where the magnets are arranged" means to virtually divide the region where the magnets may be arranged when the change amount of the interlinkage magnetic flux in the coil of the magnetic device is optimized, for example, when the magnetic device of which the change amount of the interlinkage magnetic flux in the coil is optimized is designed. For example, in an example of the technology disclosed in this case, by dividing the region where the magnets are arranged, the region is used as the set of the $N_m$ magnet regions (magnet arrangement region).

For example, when the magnetic device is actually manufactured or the like, a small magnet is arranged in each magnet region, and a magnet having an optional direction of magnetization can be used for each magnet region.

The method of dividing the region where the magnets are arranged is not particularly limited as long as the region where the magnets are arranged can be divided into the $N_m$ magnet regions and can be appropriately selected according to the purpose. For example, a method of dividing the region so that each magnet region has a rectangular parallelepiped shape or the like can be exemplified. Furthermore, when the region is divided so that each magnet region is a rectangular parallelepiped, it is preferable to perform division so that each magnet region has a cubic shape.

Figure 12:
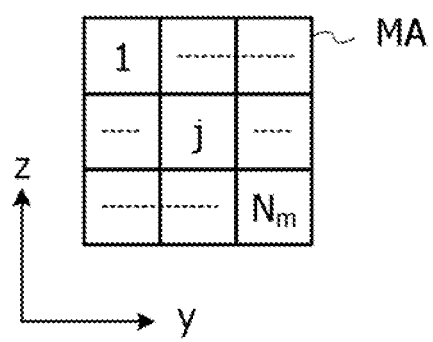
FIG. 12 is a diagram illustrating an example of the magnet arrangement region.

For example, as illustrated in FIG. 12, when the region where the magnets are arranged (magnet arrangement region MA) is divided into $N_m$ magnet regions so that each magnet region has a cubic shape, the region where the magnets are arranged (magnet arrangement region MA) is a set of $N_m$ rectangular parallelepiped magnet regions. Note that FIG. 12 illustrates an example of a case where the magnet arrangement region MA is viewed from the x-axis direction in a plan view.

Furthermore, as illustrated in FIG. 12, there is a case where the j-th magnet region of the $N_m$ magnet regions is referred to as a magnet region $N_j$ by using j that is an integer between one to $N_m$.

Here, the number of divisions of the region where the magnets are arranged (the number of magnet regions) "$N_m$" is not particularly limited as long as the number is an integer equal to or more than two and can be appropriately selected according to the purpose.

For example, "$N_m$" can be appropriately selected, for example, according to the number of bits that can be used by a computer (for example, annealing machine) used to optimize the objective function formula, requested calculation accuracy, the number of magnets (small magnet) that are actually arranged, or the like.

«Direction of Magnetization in Magnet Region»

In an example of the technology disclosed in this case, for example, in the j-th magnet region $N_j$, the optimization processing unit sets a case where the direction of the magnetization in the magnet region $N_j$ is a positive direction in the x-axis to be $s_{j,1}$, sets a case where the direction is a negative direction in the x-axis to be $s_{j,2}$, sets a case where the direction is a positive direction in the y-axis to be $s_{j,3}$, sets a case where the direction is a negative direction in the y-axis to be $s_{j,4}$, sets a case where the direction is a positive direction in the z-axis to be $s_{j,5}$, and sets a case where the direction is a negative direction in the z-axis to be $s_{j,6}$.

Moreover, in an example of the technology disclosed in this case, for example, the optimization processing unit imposes the constraint that any one of $s_{j,k}$ (k=1, 2, 3, 4, 5, 6) is "one" or all of them are "zero" on the objective function formula to be described later.

Here, a state variable $s_{j,k}$ of the magnet that represents the direction of the magnetization in the magnet region $N_j$ will be described. As described above, the state variable $s_{j,k}$ of the magnet is a variable that represents the direction of the magnetization in the j-th magnet region $N_j$ by using a state number k (k=1, 2, 3, 4, 5, 6) that represents a direction of magnetization of a magnet.

FIG. 13 is a diagram illustrating an example of correspondence between the state variable $s_{j,k}$ of the magnet and the direction of the magnetization in the j-th magnet region $N_j$ represented by the state variable $s_{j,k}$ of the magnet. As illustrated in FIG. 13, the state variable $s_{j,k}$ of the magnet can express the direction of the magnetization that is different for each state number k (k=1, 2, 3, 4, 5, 6).

Furthermore, the state variable $s_{j,k}$ of the magnet can be a discretized binary variable represented by zero or one. Therefore, in a case where the state variable $s_{j,k}$ of the magnet is "one" for any one of the state number k (k=1, 2, 3, 4, 5, 6), the direction of the magnetization in the j-th magnet region $N_j$ can be uniquely represented. That is, in an example of the technology disclosed in this case, in the j-th magnet region $N_j$, the magnetization in the direction corresponding to the state number k having the state variable $s_{j,k}$ of the magnet of "one" exists (magnet whose N pole corresponds to state number k exists).

Similarly, in an example of the technology disclosed in this case, in a case where all the state variables $s_{j,k}$ (k=1, 2, 3, 4, 5, 6) of the magnet are "zero" in the j-th magnet region $N_j$, it is assumed that no magnetization (magnet) exists in the j-th magnet region $N_j$.

Therefore, by imposing the constraint that any one of $s_{j,k}$ is "one" or all of them are "zero" on the objective function formula, whether or not the magnetization (magnet) exists in the j-th magnet region $N_j$ and the direction of the magnetization (direction of magnet) in a case where the magnetization exists can be uniquely and consistently expressed.

«Objective Function Formula»

In an example of the technology disclosed in this case, the optimization processing unit sets the change amount of the interlinkage magnetic flux of the clockwise coil in the coil region $N_i$ generated from the magnet region $N_j$ to be $\Delta\varphi'^{right}_i$ and sets the change amount of the interlinkage magnetic flux of the counterclockwise coil in the coil region $N_i$ to be $\Delta\varphi'^{left}_i$, for example, in the coil region facing the magnet region. Moreover, in an example of the technology disclosed in this case, for example, under the constraint that any one of the state variables $s_{j,k}$ of the magnet is "one" or all the state variables are "zero", the optimization processing unit optimizes the change amount of the interlinkage magnetic flux in the coil by using the objective function formula that maximizes the sum of $\Delta\varphi'^{right}_i x_i$ (i=1 to $N_c$) and $\Delta\varphi'^{left}_i y_i$ (i=1 to $N_c$).

The objective function formula that maximizes the sum of $\Delta\varphi'^{right}_i x_i$ (i=1 to $N_c$) and $\Delta\varphi'^{left}_i y_i$ (i=1 to $N_c$) is not particularly limited as long as the objective function formula is a function that can consider the constraint of the state variable $s_{j,k}$ and uses the auxiliary variables $x_i$ and $y_i$ as variables and can be appropriately selected according to the purpose.

Here, because the auxiliary variable $x_i$ of the clockwise coil and the auxiliary variable $y_i$ of the counterclockwise coil are the discretized binary variables represented by zero or one, the objective function formula using these auxiliary variables as parameters can be expressed in the QUBO format. Moreover, because the state variable $s_{j,k}$ of the magnet is a discretized binary variable represented by zero or one, for example, even in a case where the objective function formula includes the constraint term using the state variable $s_{j,k}$ of the magnet as a parameter, the objective function formula can be expressed in the QUBO format.

Therefore, in an example of the technology disclosed in this case, because the objective function formula can be expressed in the QUBO format suitable for the annealing method, the objective function formula can be efficiently optimized.

In an example of the technology disclosed in this case, the objective function formula that maximizes the sum of $\Delta\varphi'^{right}_i x_i$ (i=1 to N) and $\Delta\varphi'^{left}_i y_i$ (i=1 to $N_c$) is used under the constraint such that any one of the state variables $s_{j,k}$ of the magnet is "one" or all the state variables are "zero" as described above. Accordingly, in an example of the technology disclosed in this case, the direction, the arrangement, or the like of the magnet can be optimized, in addition to the shape or the like of the coil. Therefore, it is possible to more effectively optimize the change amount of the interlinkage magnetic flux in the coil of the magnetic device in consideration of the direction and the arrangement of the magnets.

For example, by arranging small magnets in the magnet region according to the optimized direction and arrangement of the magnets, it is possible to manufacture (design) the magnetic device of which the direction, the arrangement, or the like of the magnets are optimized.

Figure 14:
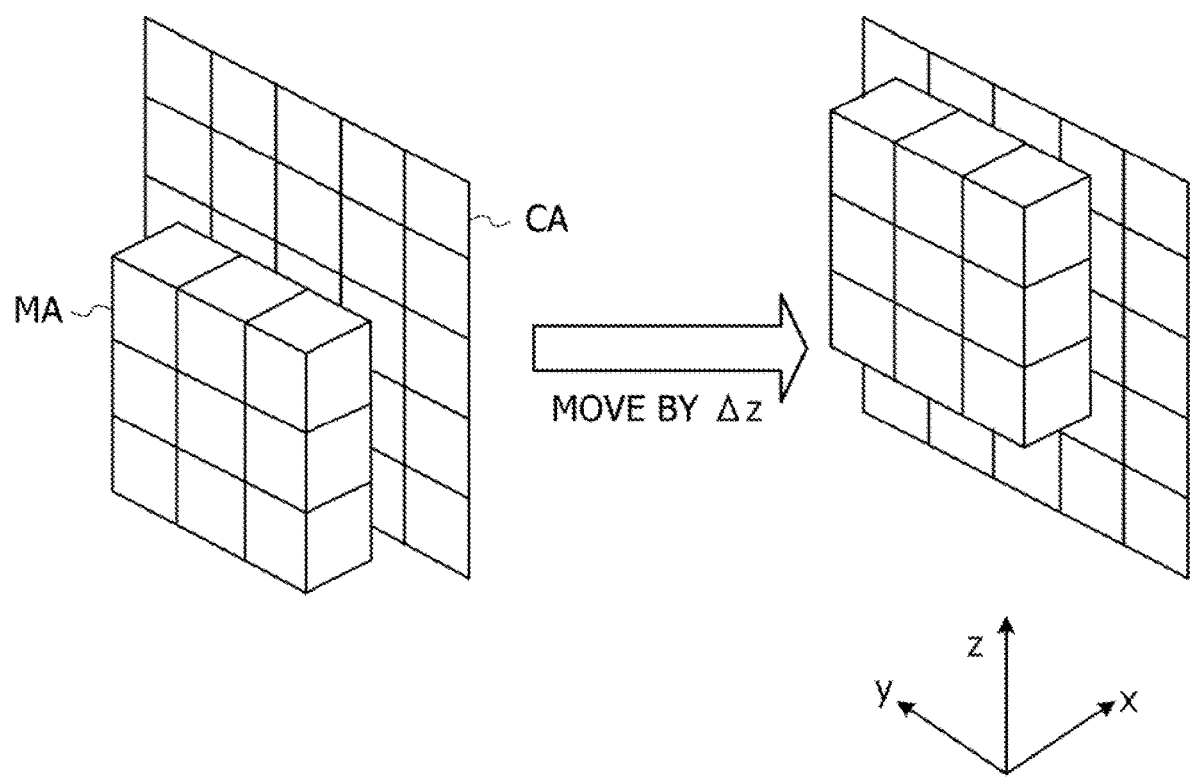
FIG. 14 is a diagram illustrating an example of a state when the magnet arrangement region is moved in a z-axis direction.

Subsequently, a specific example of an objective function formula in a case where the direction, the arrangement, or the like of the magnets are optimized in addition to the shape or the like of the coil will be described. Here, as illustrated in FIG. 14, a case where the magnet arrangement region MA is moved to the z-axis direction by $\Delta z$ (move magnet by $\Delta z$) with respect to the coil arrangement region CA will be described as an example.

First, the change amount $\Delta\varphi'_{i,j,k}$ of the interlinkage magnetic flux in the coil region $N_i$ generated by the magnetization (magnet) in the direction represented by the state number k in the magnet region $N_j$ can be expressed, for example, by the following formula.

$$\Delta\varphi'_{i,j,k} = B^x_{i,j,k}(z)A - B^x_{i,j,k}(z+\Delta z)A \qquad \text{[Expression 8]}$$

However, in the above formula, the reference $\Delta\varphi'_{i,j,k}$ is the change amount of the interlinkage magnetic flux in the coil region $N_i$ that is generated by the magnetization (magnet) in the direction represented by the state number k, in the magnet region $N_j$.

The reference $B^x_{i,j,k}(z)$ means a magnetic flux density in the x-axis direction before the change that is generated from the magnetization (magnet) in the direction represented by the state number k in the magnet region $N_j$, at a center point of the i-th coil region $N_i$.

The reference $B^x_{i,j,k}(z+\Delta z)$ means a magnetic flux density in the x-axis direction, after the magnet arrangement region MA is moved in the z-axis direction by $\Delta z$, generated from the magnetization (magnet) in the direction represented by the state number k in the magnet region $N_j$, at the center point of the i-th coil region $N_i$.

The reference A is an area of the coil region (cross-sectional area of coil).

Note that, in the above formula, an example has been described in which the change amount of the interlinkage magnetic flux is calculated by subtracting the interlinkage magnetic flux after the change (after being moved) from the interlinkage magnetic flux before the change (before being moved). However, for example, the change amount of the interlinkage magnetic flux may be calculated by subtracting the interlinkage magnetic flux before the change from the interlinkage magnetic flux after the change.

Here, $B^x_{i,j,k}(z)$ in the above formula will be further described in detail.

When the Biot-Savart law that is the physical law of electromagnetics is used, a magnetic flux density B (B is vector amount) generated at an observation point P from a magnet of magnetization M can be expressed by the following formula.

$$B = -\frac{1}{4\pi}\nabla\left(\int_V M \cdot \nabla\left(\frac{1}{r}\right)dV\right)$$

However, in the above formula, the reference r is a distance from a source point (for example, center point of magnet region) to the observation point P.

When the above formula is used, a magnetic flux density $B_{i,j,k}$ ($B_{i,j,k}$ is vector amount) generated from the magnetization (magnet) in the direction represented by the state number k in the magnet region $N_j$ at the center point of the i-th coil region $N_i$ can be expressed by the following formula.

$$B_{i,j,k} = -\frac{1}{4\pi}\nabla\left(\int_V M_{j,k} \cdot \nabla\left(\frac{1}{r_i}\right)dV\right) = (B^x_{i,j,k}, B^y_{i,j,k}, B^z_{i,j,k})$$

However, in the above formula, the reference $r_i$ is a distance from a source point (for example, center point of magnet region) to the i-th coil region $N_i$.

The reference $M_{j,k}$ is magnetization in the direction represented by the state number k of the magnet region $N_j$.

Here, in an example illustrated in FIG. 14, because a component of the magnetic flux density in the x-axis direction is a component interlinking with the coil, $B^x_{i,j,k}$ that is a x component of $B_{i,j,k}$ in the above formula is a magnetic flux density interlinking with the coil. Therefore, the change amount $\Delta\varphi'_{i,j,k}$ of the interlinkage magnetic flux in the coil region $N_i$ can be expressed by using $B^x_{i,j,k}$.

Furthermore, as it is obvious from fact that the above formula includes a distance r from the source point to the i-th coil region $N_i$, $B^x_{i,j,k}$ changes according to the distance between the coil region $N_i$ and the magnet region $N_j$. Therefore, by obtaining the change amount $\Delta\varphi'_{i,j,k}$ of the interlinkage magnetic flux in the coil region $N_i$ on the basis of the above formula, it is possible to optimize the change amount of the interlinkage magnetic flux in the coil in consideration of the distance between the coil region $N_i$ and the magnet region $N_j$.

Then, by using $\Delta\varphi'_{i,j,k}$ obtained as described above, the change amount of the interlinkage magnetic flux in the coil region $N_i$ generated from the magnet region $N_j$ of the state variable $s_{j,k}$ can be expressed by the following formula.

$$\Delta\phi_i'^{right} = -\Delta\phi_i'^{left} = \sum_{j=1}^{N_m}\sum_{k=1}^{6}\Delta\phi'_{i,j,k}S_{j,k}$$

However, in the above formula, the reference $\Delta\varphi'^{right}_i$ is a numerical value that represents the change amount of the interlinkage magnetic flux of the clockwise coil in the i-th coil region $N_i$, generated from the magnet region $N_j$.

The reference $\Delta\varphi'^{left}_i$ is a numerical value that represents the change amount of the interlinkage magnetic flux of the counterclockwise coil in the i-th coil region $N_i$, generated from the magnet region $N_j$.

The reference $\Delta\varphi'_{i,j,k}$ is the change amount of the interlinkage magnetic flux in the coil region $N_i$ that is generated by the magnetization (magnet) in the direction represented by the state number k, in the magnet region $N_j$.

The reference $s_{j,k}$ is a state variable of the magnet that represents the direction of the magnetization in the magnet region $N_j$.

The reference $N_m$ is an integer that represents the number of magnet regions.

In the above formula, it is possible to calculate the change amount of the magnetic flux in the i-th coil region $N_i$ in consideration of the magnitude and the direction of the magnetization generated from each magnet region in the magnet arrangement region. Furthermore, as described above, because the change amount of the interlinkage magnetic flux in a case where the clockwise coil exists in the i-th coil region $N_i$ and the change amount of the interlinkage magnetic flux in a case where the counterclockwise coil exists have the same values and different signs, $\Delta\varphi'^{right}_i$ is equal to $-\Delta\varphi'^{left}_i$.

When $\Delta\varphi'^{right}_i$ and $\Delta\varphi'^{left}_i$ obtained as described above are used, the objective function formula that can optimize both of the coil and the magnet in the magnetic device can be expressed by the following formula.

$$\mathcal{H}' = \sum_{i=1}^{N_c}\Delta\phi_i'^{right}x_i + \sum_{i=1}^{N_c}\Delta\phi_i'^{left}y_i - \alpha\sum_{j=1}^{N_m}\sum_{n=1}^{6}\sum_{u=1(u\neq n)}^{6}s_{j,n}s_{j,u} \to \max.$$

However, in the above formula, the reference H' is an objective function formula.

The reference $N_c$ is an integer that represents the number of coil regions.

The reference $N_m$ is an integer that represents the number of magnet regions.

The reference $\Delta\varphi'^{right}_i$ is a numerical value that represents the change amount of the interlinkage magnetic flux of the clockwise coil in the i-th coil region $N_i$, generated from the magnet region $N_j$.

The reference $\Delta\varphi'^{left}_i$ is a numerical value that represents the change amount of the interlinkage magnetic flux of the counterclockwise coil in the i-th coil region $N_i$, generated from the magnet region $N_j$.

The reference $x_i$ is an auxiliary variable of the clockwise coil that may exist in the i-th coil region $N_i$.

The reference $y_i$ is an auxiliary variable of the counterclockwise coil that may exist in the i-th coil region $N_i$.

The reference $\alpha$ is a positive number.

The reference $s_{j,n}$ is a binary variable of zero or one that represents a direction of magnetization at the time of a state number n (n=1, 2, 3, 4, 5, 6) in the j-th magnet region $N_j$.

The reference $s_{j,u}$ is a binary variable of zero or one that represents a direction of magnetization at the time when a state number u (u=1, 2, 3, 4, 5, 6) in the j-th magnet region $N_j$.

Note that "→max" is a symbol that means to maximize the objective function formula.

Because the total of the change amounts of the interlinkage magnetic fluxes in the coils that may exist in the $N_c$ coil regions can be maximized in consideration of the direction and the arrangement of the magnets by maximizing the objective function formula (H'), the change amount of the interlinkage magnetic flux in the entire coil of the magnetic device can be maximized. Therefore, because the direction, the arrangement, or the like of the magnets (small magnet) can be optimized in addition to the shape, the position, the number, or the like of the coils by maximizing the objective function formula (H'), it is possible to more effectively optimize the change amount of the interlinkage magnetic flux in the coil of the magnetic device.

Furthermore, in a case where the objective function formula is optimized by the annealing method (annealing) using the annealing machine described above, there is a case where a format in which the objective function is optimized when the objective function formula is minimized is requested. Therefore, when the objective function formula described above is deformed to be optimized when being minimized, the objective function formula can be expressed as the following formula.

$$E' = -\mathcal{H}' = -\sum_{i=1}^{N_c}\Delta\phi'^{right}_i x_i - \sum_{i=1}^{N_c}\Delta\phi'^{left}_i y_i + \alpha\sum_{j=1}^{N_m}\sum_{n=1}^{6}\sum_{u=1(u\neq n)}^{6} s_{j,n}s_{j,u} \to \min.$$

This formula is obtained by deforming the objective function formula to be optimized when being minimized by multiplying both sides of the objective function formula described above by "minus (−)".

However, E' is an objective function formula that is optimized by minimizing the value.

Note that "→min" is a symbol that means to minimize the objective function formula.

For example, in an example of the technology disclosed in this case, it is preferable that the optimization processing unit perform optimization, for example, on the basis of the objective function formula represented by the following formula (2).

$$E' = -\sum_{i=1}^{N_c}\Delta\phi'^{right}_i x_i - \sum_{i=1}^{N_c}\Delta\phi'^{left}_i y_i + \alpha\sum_{j=1}^{N_m}\sum_{n=1}^{6}\sum_{u=1(u\neq n)}^{6} s_{j,n}s_{j,u} \quad \text{Formula (2)}$$

However, in formula (2),
the reference E' is an objective function formula.
The reference $N_c$ is an integer that represents the number of coil regions.
The reference $N_m$ is an integer that represents the number of magnet regions.

The reference $\Delta\varphi'^{right}_i$ is a numerical value that represents the change amount of the interlinkage magnetic flux of the clockwise coil in the i-th coil region $N_i$, generated from the magnet region $N_j$.

The reference $\Delta\varphi'^{left}_i$ is a numerical value that represents the change amount of the interlinkage magnetic flux of the counterclockwise coil in the i-th coil region $N_i$, generated from the magnet region $N_j$.

The reference $x_i$ is an auxiliary variable of the clockwise coil that may exist in the i-th coil region $N_i$.

The reference $y_i$ is an auxiliary variable of the counterclockwise coil that may exist in the i-th coil region $N_i$.

The reference $\alpha$ is a positive number.

The reference $s_{j,n}$ is a binary variable of zero or one that represents a direction of magnetization at the time of a state number n (n=1, 2, 3, 4, 5, 6) in the j-th magnet region $N_j$.

The reference $s_{j,u}$ is a binary variable of zero or one that represents a direction of magnetization at the time when a state number u (u=1, 2, 3, 4, 5, 6) in the j-th magnet region $N_j$.

Here, three terms on the right side in the above formula (2) are constraint terms that mean the constraint that any one of $s_{j,k}$ (k=1, 2, 3, 4, 5, 6) is "one" or all of them are "zero". For example, three terms on the right side in the above formula (2) are penalty terms that increases the value of the objective function formula in a case where $s_{j,k}$ (k=1, 2, 3, 4, 5, 6) with a plurality of state numbers k is "one", that is, some of $s_{j,k}$ are "one". For example, in the above formula (2), in a case where some of $s_{j,k}$ are "one", three terms on the right side take positive values, and this increases the value of the objective function formula. Therefore, in a case where some of $s_{j,k}$ are "one", the objective function formula is not optimized. For example, by setting $\alpha$ in the above formula (2) to be a large value, a case where some of $s_{j,k}$ are set to "one" is certainly excluded, and the optimization can be performed.

Furthermore, by further adding another constraint term to the above formula (2), the obtained formula may be used as the objective function formula used to optimize the change amount of the interlinkage magnetic flux in the coil of the magnetic device.

As the other constraint term to be added to the above formula (2), for example, a constraint term that constrains a cross-sectional area of the coil in the magnetic device to be a predetermined area, a constraint term that constrains the number of magnets (small magnet) used for the magnetic device to be a predetermined number, or the like can be exemplified.

As a constraint term that constrains the cross-sectional area of the coil of the magnetic device to be the predetermined area, for example, a term represented by the following formula can be used.

$$+\beta\left(\sum_{i=1}^{N_c}(x_i + y_i) - N_{coil}\right)^2$$

However, in the above term,
The reference $\beta$ is a positive number.
The reference $N_c$ is an integer that represents the number of coil regions.
The reference $N_c$ is an auxiliary variable of the clockwise coil that may exist in the coil region $N_i$.
The reference $y_i$ is an auxiliary variable of the counterclockwise coil that may exist in the coil region $N_i$.
The reference $N_{coil}$ is an integer that specifies a total number of clockwise and counterclockwise coils arranged in the coil arrangement region.

For example, in a case where a total of the number of coil regions where the clockwise coil exists and the number of coil regions where the counterclockwise coil exists is equal to $N_{coil}$ in the coil arrangement region that is a set of the $N_c$ coil regions, the value of the above term is "zero". On the other hand, in a case where the total of the number of coil regions where the clockwise coil exists and the number of coil regions where the counterclockwise coil exists is different from $N_{coil}$, the above term takes a positive value, and accordingly, the value of the objective function formula increases. For example, in a case where the total of the number of coil regions where the clockwise coil exists and the number of coil regions where the counterclockwise coil exists is different from $N_{coil}$, the above term increases the value of the objective function formula. Therefore, the objective function formula does not take the minimum value in this case.

Therefore, the above term is a penalty term that increases the value of the objective function formula in a case where the total of the number of coil regions where the clockwise coil exists and the number of coil regions where the counterclockwise coil exists is different from $N_{coil}$, that is, in a case where the cross-sectional area of the coil is not a predetermined area.

Furthermore, as the constraint term that constrains the number of magnets (small magnet) used for the magnetic device, for example, a term represented by the following formula can be used.

$$+\gamma \left( \sum_{j=1}^{N_m} \sum_{k=1}^{6} s_{j,k} - N_{mag} \right)^2$$

However, in the above term, the reference $\gamma$ is a positive number.

The reference $N_m$ is an integer that represents the number of magnet regions.

The reference $s_{j,k}$ is a binary variable of zero or one that represents the direction of the magnetization at the time of the state number k (k=1, 2, 3, 4, 5, 6) in the j-th magnet region $N_j$.

The reference $N_{mag}$ is an integer that specifies the total number of magnets arranged in the magnet arrangement region.

For example, in a case where the number of magnet regions where the magnets are arranged (direction of magnetization is not "zero") is equal to $N_{mag}$ in the magnet arrangement region that is a set of $N_m$ magnet regions, the value of the above term is "zero". On the other hand, in a case where the number of magnet regions where the magnets are arranged (direction of magnetization is not "zero") is different from $N_{mag}$, the above term takes a positive value, and accordingly, the value of the objective function formula increases. For example, in a case where the number of magnet regions where the magnets are arranged is different from $N_{mag}$, the above term increases the value of the objective function formula. Therefore, the objective function formula is not the minimum value in this case.

Therefore, the above term is a penalty term that increases the value of the objective function formula in a case where the number of magnet regions where the magnets are arranged is different from $N_{mag}$.

Here, the above formula (2) is a formula that is optimized by minimizing the objective function formula (E'), that is, a formula that can optimize the change amount of the inter-linkage magnetic flux of the magnetic device by minimizing the objective function formula (E'). Therefore, the above formula (2) can be preferably used when the objective function formula is optimized by the annealing method (annealing) using the annealing machine. Note that the above formula (2) is an objective function formula using the discretized binary auxiliary variables $x_i$, $y_i$, and $s_{j,k}$ represented by zero or one as variables and is an objective function formula in the QUBO format.

A method of optimizing the objective function formula in a case where not only the shape or the like of the coil but also the direction, the arrangement, or the like of the magnet are optimized can be similar to that in a case where the objective function formula that optimizes the shape or the like of the coil is optimized. For example, as the method of optimizing the objective function formula that optimizes the coil and the magnet, a method is preferable of converting the objective function formula into the Ising model formula in the QUBO format and minimizing the value of the objective function formula converted into the Ising model formula.

As the Ising model formula obtained by converting the objective function formula that optimizes the coil and the magnet, as in a case where the shape or the like of the coil is optimized, it is preferable to use a formula represented by the following formula (3). For example, in an example of the technology disclosed in this case, it is preferable that the optimization processing unit perform optimization on the basis of the objective function formula converted into the Ising model formula represented by the following formula (3).

$$E = -\sum_{i,j=0} w_{ij} s_i s_j - \sum_{i=0} b_i s_i \qquad \text{Formula (3)}$$

However, in the above formula (3), the reference E is an objective function formula converted into the Ising model formula.

The reference $w_{ij}$ is a numerical value that represents an interaction between the i-th bit and the j-th bit.

The reference $b_i$ is a numerical value that represents a bias with respect to the i-th bit.

The reference $s_i$ is a binary variable that represents that the i-th bit is zero or one.

The reference $s_j$ is a binary variable that represents that the j-th bit is zero or one.

The objective function formula converted into the Ising model formula as described above can be optimized (minimized) in a short time, for example, by performing the annealing method (annealing) using the annealing machine or the like.

Hereinafter, an example of the technology disclosed in this case will be further described in detail with reference to the exemplary configuration of the device, the flowchart, or the like.

Figure 15:
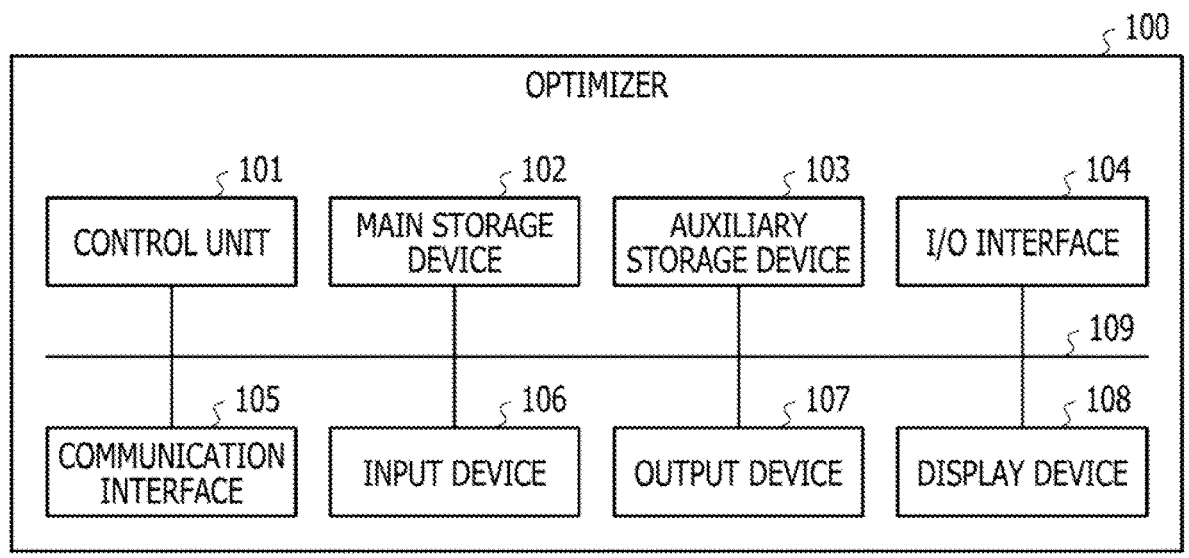
FIG. 15 is a diagram illustrating an example of a hardware configuration of an optimizer disclosed in this case.

FIG. 15 illustrates an example of a hardware configuration of the optimizer disclosed in this case.

In an optimizer 100, for example, a control unit 101, a main storage device 102, an auxiliary storage device 103, an I/O interface 104, a communication interface 105, an input device 106, an output device 107, and a display device 108 are connected to each other via a system bus 109.

The control unit 101 performs arithmetic operations (for example, four arithmetic operations, comparison operations, and arithmetic operations for the annealing method), hardware and software operation control, and the like. The control unit 101 may be, for example, a Central Processing Unit (CPU), a part of the annealing machine used for the annealing method, or a combination thereof.

The control unit 101 realizes various functions, for example, by executing a program (for example, optimization program disclosed in this case or the like) read in the main storage device 102.

Processing executed by the optimization processing unit in the optimizer disclosed in this case can be executed, for example, by the control unit 101.

The main storage device 102 stores various programs and data or the like needed for executing various programs. As the main storage device 102, for example, a device having at least one of a Read Only Memory (ROM) and a Random Access Memory (RAM) can be used.

The ROM stores various programs, for example, a Basic Input/Output System (BIOS) or the like. Furthermore, the ROM is not particularly limited and can be appropriately selected according to the purpose. For example, a mask ROM, a Programmable ROM (PROM), or the like can be exemplified.

The RAM functions, for example, as a work range expanded when various programs stored in the ROM, the auxiliary storage device 103, or the like are executed by the control unit 101. The RAM is not particularly limited and can be appropriately selected according to the purpose. For example, a Dynamic Random Access Memory (DRAM), a Static Random Access Memory (SRAM), or the like can be exemplified.

The auxiliary storage device 103 is not particularly limited as long as the device can store various information and can be appropriately selected according to the purpose. For example, a solid state drive (SSD), a hard disk drive (HDD), or the like can be exemplified. Furthermore, the auxiliary storage device 103 may be a portable storage device such as a CD drive, a DVD drive, or a Blu-ray (registered trademark) Disc (BD) drive.

Furthermore, the optimization program disclosed in this case is, for example, stored in the auxiliary storage device 103, loaded into the RAM (main memory) of the main storage device 102, and executed by the control unit 101.

The I/O interface 104 is an interface used to connect various external devices. The I/O interface 104 can input/output data to/from, for example, a Compact Disc ROM (CD-ROM), a Digital Versatile Disk ROM (DVD-ROM), a Magneto-Optical disk (MO disk), a Universal Serial Bus (USB) memory (USB flash device), or the like.

The communication interface 105 is not particularly limited, and a known communication interface can be appropriately used. For example, a communication device using wireless or wired communication or the like can be exemplified.

The input device 106 is not particularly limited as long as the device can receive input of various requests and information with respect to the optimizer 100, a known device can be appropriately used. For example, a keyboard, a mouse, a touch panel, a microphone, or the like can be exemplified. Furthermore, in a case where the input device 106 is a touch panel (touch display), the input device 106 can also serve as the display device 108.

The output device 107 is not particularly limited, and a known device can be appropriately used. For example, a printer or the like can be exemplified.

The display device 108 is not particularly limited, and a known device can be appropriately used. For example, a liquid crystal display, an organic EL display, or the like can be exemplified.

Figure 16:
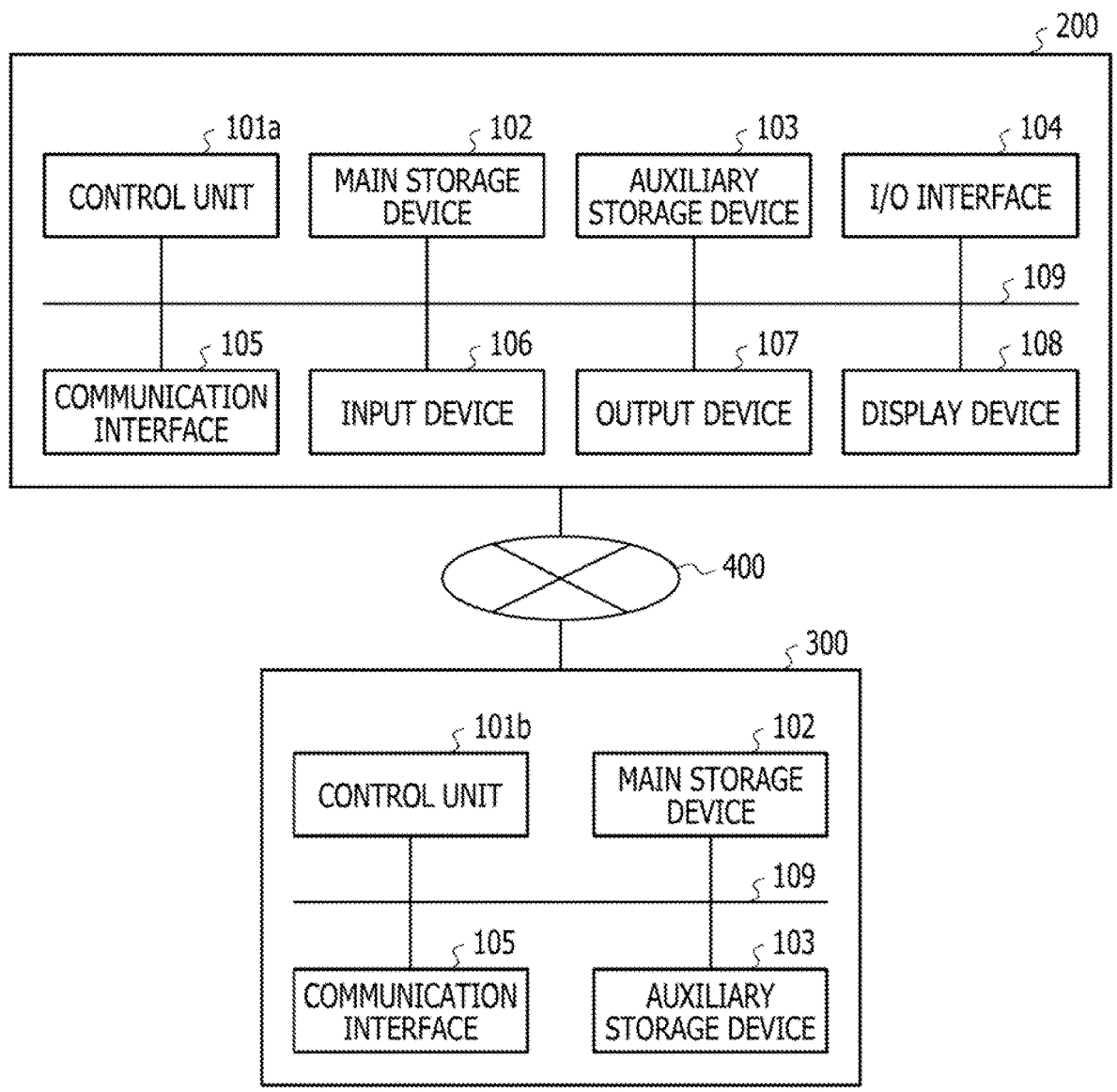
FIG. 16 is a diagram illustrating another example of the hardware configuration of the optimizer disclosed in this case.

FIG. 16 illustrates another example of the hardware configuration of the optimizer disclosed in this case.

In the example illustrated in FIG. 16, the optimizer 100 is divided into a computer 200 that executes processing of defining an objective function formula and processing of converting the objective function formula into the Ising model formula and an annealing machine 300 that optimizes the Ising model formula. Furthermore, in the example illustrated in FIG. 16, the computer 200 and the annealing machine 300 in the optimizer 100 are connected via a network 400.

In the example illustrated in FIG. 16, for example, as a control unit 101a of the computer 200, a CPU or the like can be used, and as a control unit 101b of the annealing machine 300, a device specialized in the annealing method (annealing) can be used.

In the example illustrated in FIG. 16, for example, the computer 200 sets various settings for defining an objective function formula, defines the objective function formula, and converts the defined objective function formula into an Ising model formula. Then, information regarding values of a weight ($w_{ij}$) and a bias ($b_i$) in the Ising model formula is transmitted from the computer 200 to the annealing machine 300 via the network 400.

Next, the annealing machine 300 optimizes (minimize) the Ising model formula on the basis of the received information regarding the values of the weight ($w_{ij}$) and the bias ($b_i$) and obtains a minimum value of the Ising model formula and a state (state) of a bit that gives the minimum value. Then, the obtained minimum value of the Ising model formula and the obtained state (state) of the bit that gives the minimum value are transmitted from the annealing machine 300 to the computer 200 via the network 400.

Subsequently, the computer 200 obtains the shape or the like of the coil and the arrangement or the like of the magnets that can optimize the interlinkage magnetic flux in the coil of the magnetic device on the basis of the state (state) of the bit that gives a minimum value to the received Ising model formula.

Figure 17:
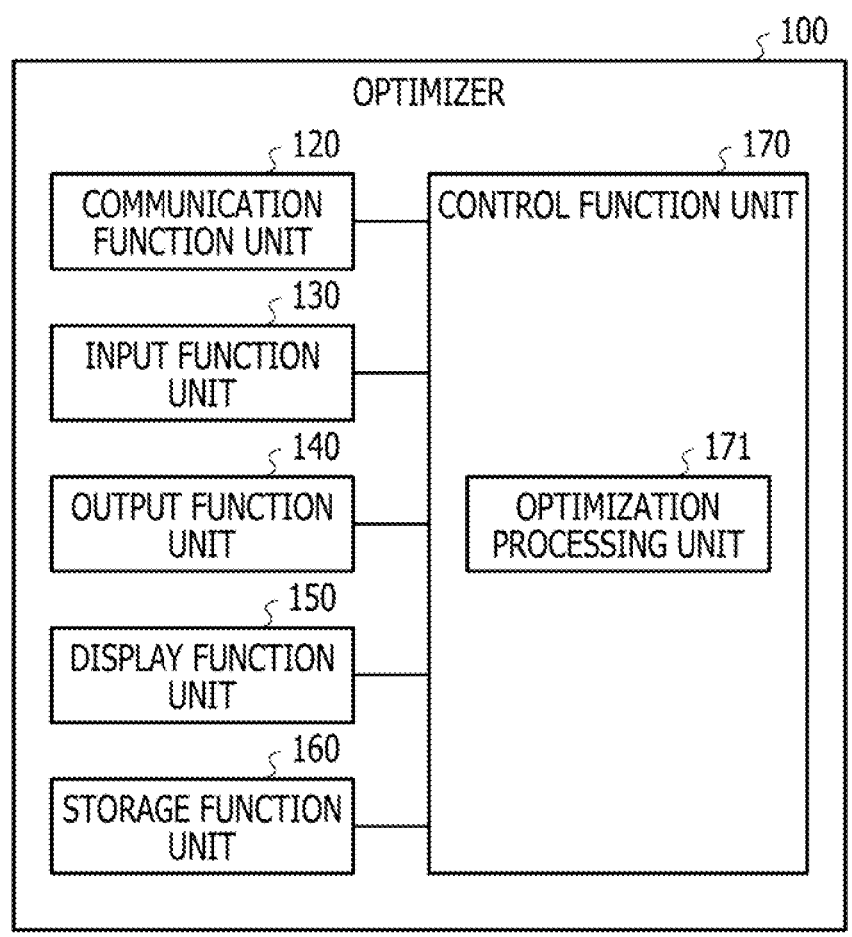
FIG. 17 is a diagram illustrating an example of a functional configuration of the optimizer disclosed in this case.

FIG. 17 illustrates an example of a functional configuration of the optimizer disclosed in this case.

As illustrated in FIG. 17, the optimizer 100 includes a communication function unit 120, an input function unit 130, an output function unit 140, a display function unit 150, a storage function unit 160, and a control function unit 170.

The communication function unit 120, for example, transmits and receives various data to and from an external device. The communication function unit 120 may receive data regarding a bias and a weight in an objective function formula converted into an Ising model formula from the external device, for example.

The input function unit 130, for example, receives various instructions to the optimizer 100. Furthermore, the input function unit 130 may, for example, receive an input of data regarding the bias and the weight in the objective function formula converted into the Ising model formula.

The output function unit 140, for example, prints and outputs information regarding the shapes, the arrangements, the directions, or the like of the coils and the magnets in the magnetic device that optimizes the change amount of the interlinkage magnetic flux in the coil.

The display function unit 150, for example, displays the information regarding the shapes, the arrangements, the directions, or the like of the coils and the magnets in the magnetic device that optimizes the change amount of the interlinkage magnetic flux in the coil on a display.

The storage function unit 160 stores, for example, various programs, the information regarding the shapes, the arrangements, and the directions of the coils and the magnets in the optimized magnetic device, or the like.

The control function unit 170 includes an optimization processing unit 171. The control function unit 170, for example, executes various programs stored in the storage function unit 160 and controls an operation of the entire optimizer 100.

The optimization processing unit 171, for example, executes processing of optimizing the change amount of the interlinkage magnetic flux in the coil by using the objective function formula that maximizes the sum of $\Delta\varphi_i^{right} x_i$ (i=1 to $N_c$) and $\Delta\varphi_i^{left} y_i$ (i=1 to $N_c$).

Here, with reference to FIG. 18, an example of a flow when the change amount of the interlinkage magnetic flux in the coil is optimized by optimizing the shape, the arrangement, the number of coils of the magnetic device will be described by using an example of the technology disclosed in this case.

First, the optimization processing unit 171 divides the surface of the magnetic device where the coil is arranged into $N_c$ ($N_c$ is integer) coil regions (S101). For example, in S101, the optimization processing unit 171 divides the surface of the magnetic device where the coil may be arranged (coil arrangement region) into a predetermined number ($N_c$) to obtain the $N_c$ coil regions.

Next, the optimization processing unit 171 fixes the direction and the arrangement of the magnets in the magnetic device and calculates a change amount $\Delta\varphi$ of an interlinkage magnetic flux in each coil region (S102). For example, in S102, under a condition in which the direction and the arrangement of the magnets are fixed, the optimization processing unit 171 obtains a change amount $\Delta\varphi_i^{right}$ of the interlinkage magnetic flux of the clockwise coil in the coil region $N_i$ and the change amount $\Delta\varphi_i^{left}$ of the interlinkage magnetic flux of the counterclockwise coil in the coil region $N_i$, for each coil region $N_i$.

Subsequently, the optimization processing unit 171 allocates the auxiliary variable $x_i$ of the clockwise coil and the auxiliary variable $y_i$ of the counterclockwise coil to each coil region $N_i$ (S103). For example, in S103, the optimization processing unit 171 allocates the auxiliary variable that sets $x_i=1$ in a case where the clockwise coil exists, sets $x_i=0$ in a case where the clockwise coil does not exist, sets $y_i=1$ in a case where the counterclockwise coil exists, and sets $y_i=0$ in a case where the counterclockwise coil does not exist.

Next, the optimization processing unit 171 defines the objective function formula that maximizes the sum of $\Delta\varphi_i^{right} x_i$ (i=1 to $N_c$) and $\Delta\varphi_i^{left} y_i$ (i=1 to $N_c$) by using the change amount $\Delta\varphi_i^{right}$ of the interlinkage magnetic flux of the clockwise coil in the coil region $N_i$, the change amount $\Delta\varphi_i^{left}$ of the interlinkage magnetic flux of the counterclockwise coil in the coil region $N_i$, the auxiliary variable $x_i$, and the auxiliary variable $y_i$ (S104). For example, in S104, the optimization processing unit 171 defines the objective function formula that can be expressed in the QUBO format using the auxiliary variable that is a discretized binary variable represented by zero or one as a parameter.

Then, the optimization processing unit 171 converts the defined objective function formula into the Ising model formula expressed by the following formula (3)(S105). For example, in S105, the optimization processing unit 171 converts the objective function formula into the Ising model formula expressed by the following formula (3) by extracting the parameter in the defined objective function formula and obtaining $b_i$ (bias) and $w_{ij}$ (weight) in the following formula (3).

$$E = -\sum_{i,j=0} w_{ij} s_i s_j - \sum_{i=0} b_i s_i \qquad \text{Formula (3)}$$

However, in the above formula (3),
the reference E is an objective function formula converted into the Ising model formula,
the reference $w_{ij}$ is a numerical value that represents an interaction between an i-th bit and a j-th bit,
the reference $b_i$ is a numerical value that represents a bias with respect to the i-th bit,
the reference $s_i$ is a binary variable that represents that the i-th bit is zero or one, and
the reference $s_j$ is a binary variable that represents that the j-th bit is zero or one.

Next, the optimization processing unit 171 minimizes the above formula (3) by using the annealing machine (S106). For example, in S106, the optimization processing unit 171 executes ground state search (optimization calculation) using the annealing method regarding the above formula (3) so as to calculate the minimum value of the above formula (3). Accordingly, the optimization processing unit 171 specifies the state of the bit that gives the minimum value to the objective function formula.

Subsequently, the optimization processing unit 171 specifies the auxiliary variable $x_i$ of the clockwise coil in each coil region and the auxiliary variable $y_i$ of the counterclockwise coil in each coil region on the basis of the state (state) of the bit that gives the minimum value to the above formula (3) (S107).

Next, the optimization processing unit 171 allocates the clockwise coil or counterclockwise coil to each coil region on the basis of the specified auxiliary variable $x_i$ of the clockwise coil and the specified auxiliary variable $y_i$ of the counterclockwise coil in each coil region (S108). For example, in S108, the optimization processing unit 171 allocates the clockwise coil to the coil region of $x_i=1$, allocates the counterclockwise coil to the coil region of $y_i=1$, and assumes that the coil does not exist when both $x_i=1$ and $y_i=1$ are satisfied or both $x_i=0$ and $y_i=0$ are satisfied.

Then, the optimization processing unit 171 combines the same kind of adjacent coil regions into a single coil region for each coil region in the coil arrangement region and converts the coil regions into a format that can be easily used as an actual coil shape (S109). Note that details of the processing executed by the optimization processing unit 171 in S109 will be described later.

Figure 19A:
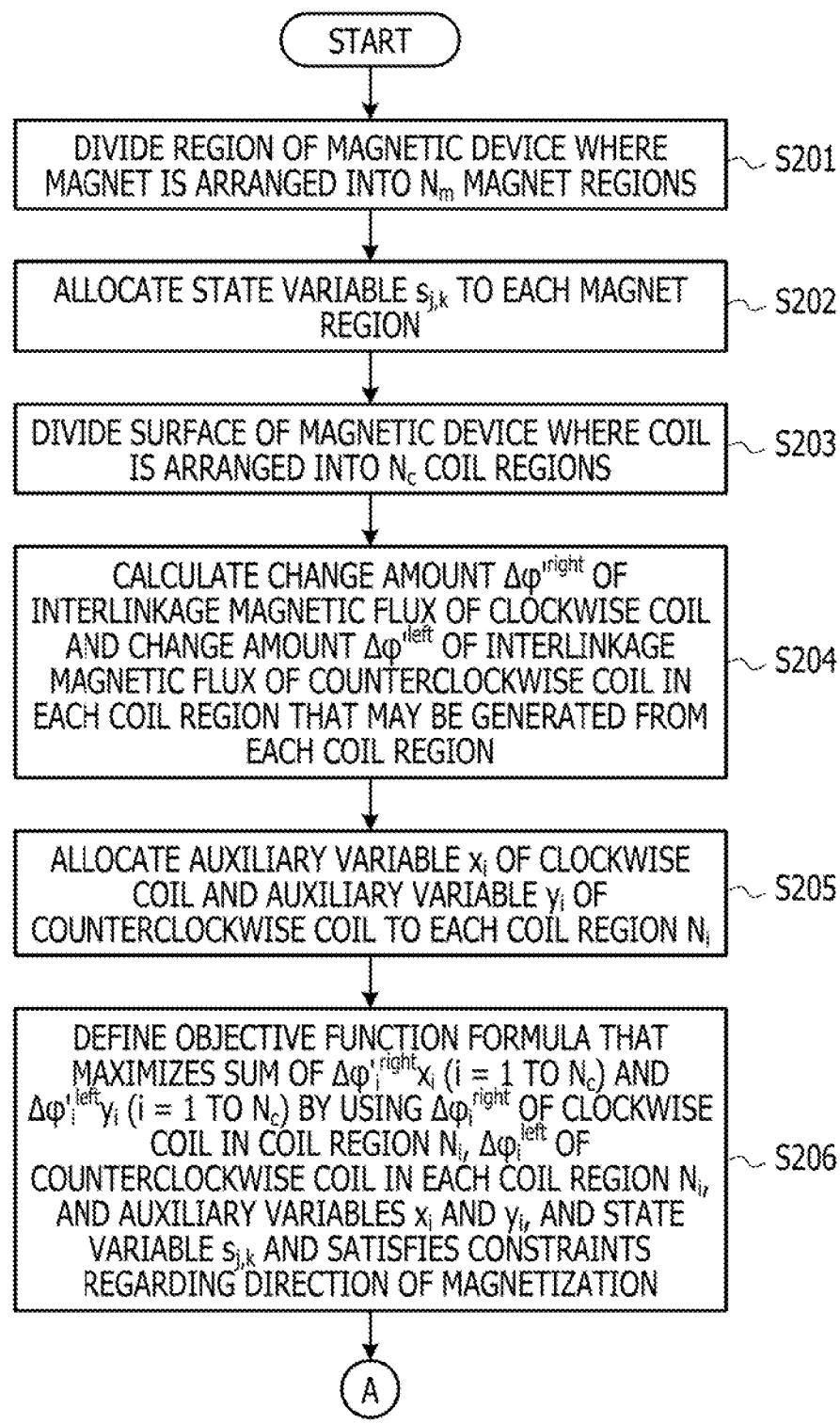
FIGS. 19A and 19B are a flowchart illustrating an example of a flow when the change amount of the interlinkage magnetic flux in the coil is optimizing by optimizing the shape, the arrangement, and the number of the coils of the magnetic device and a direction and arrangement of the magnet by using an example of the technology disclosed in this case.
Figure 19B:
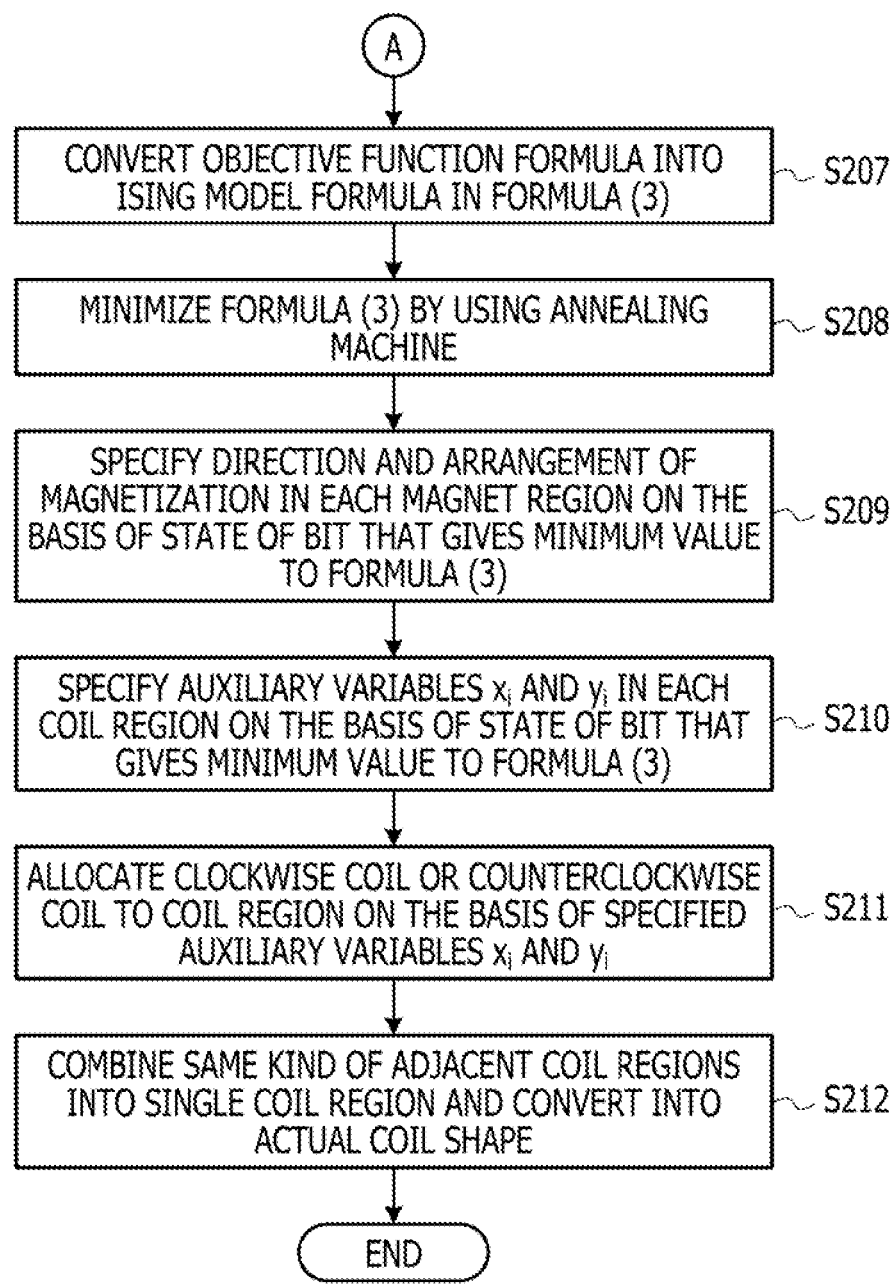

Subsequently, with reference to FIGS. 19A and 19B, an example of a flow when the change amount of the interlinkage magnetic flux in the coil is optimized by optimizing the shape, the arrangement, and the number of coils of the magnetic device and the direction and the arrangement of the magnets will be described by using an example of the technology disclosed in this case.

First, the optimization processing unit 171 divides the region of the magnetic device where the magnets are arranged into $N_m$ ($N_m$ is integer) magnet regions (S201). For example, in S201, the optimization processing unit 171 divides the region of the magnetic device where the magnet may be arranged (magnet arrangement region) into a predetermined number ($N_m$) to form the $N_m$ magnet regions.

Next, the optimization processing unit 171 allocates the state variable $s_{j,k}$ of the magnet that represents the direction of the magnetization in the magnet region $N_j$ for each magnet region $N_j$ (S202). For example, in S202, the optimization processing unit 171 allocates the state variable $s_{j,k}$ of the magnet that is a discretized binary variable represented by zero or one that can express the direction of the magnetization in the magnet region $N_j$ by the state number k (k=1, 2, 3, 4, 5, 6).

Subsequently, the optimization processing unit 171 divides the surface of the magnetic device where the coil is arranged into $N_c$ ($N_c$ is integer) coil regions (S203). Note that S203 can be processing similar to S101 described above.

Next, the optimization processing unit 171 calculates the change amount $\Delta\varphi'$ of the interlinkage magnetic flux in each coil region that may be generated from each coil region (S204). For example, in S204, the optimization processing unit 171 obtains the change amount $\Delta\varphi'_i{}^{right}$ of the interlinkage magnetic flux of the clockwise coil in the coil region $N_i$ and the change amount $\Delta\varphi'_i{}^{left}$ of the interlinkage magnetic flux of the counterclockwise coil, for each coil region $N_i$ on the basis of the change amount of the magnetic flux density when the magnet arrangement region is moved by a predetermined distance, according to the Biot-Savart law.

Then, the optimization processing unit 171 allocates the auxiliary variable $x_i$ of the clockwise coil and the auxiliary variable $y_i$ of the counterclockwise coil to each coil region $N_i$ (S205). Note that S205 can be processing similar to S103 described above.

Next, the optimization processing unit 171 maximizes the sum of $\Delta\varphi'_i{}^{right}x_i$ (i=1 to $N_c$) and $\Delta\varphi'_i{}^{left}y_i$ (i=1 to $N_c$) by using the change amount $\Delta\varphi'_i{}^{right}$ of the interlinkage magnetic flux of the clockwise coil, the change amount $\Delta\varphi'_i{}^{left}$ of the interlinkage magnetic flux of the counterclockwise coil, the auxiliary variable $x_i$, the auxiliary variable $y_i$, and the state variable $s_{j,k}$ and defines the objective function formula that satisfies the constraints regarding the direction of the magnetization (S206). For example, in S206, the optimization processing unit 171 defines the objective function formula that can be expressed in the QUBO format using the auxiliary variables $x_i$ and $y_i$ and the state variable $s_{j,k}$ that are discretized binary variables represented by zero or one as parameters. Furthermore, in S206, by defining the objective function formula to include a constraint term that represents the constraint such that any one of $s_{j,k}$ (k=1, 2, 3, 4, 5, 6) is "one" or all of them are "zero", the constraint regarding the direction of the magnetization is imposed on the objective function formula.

Subsequently, the optimization processing unit 171 converts the defined objective function formula into the Ising model formula represented by the following formula (3) (S207). Note that S207 can be processing similar to S105 described above.

Next, the optimization processing unit 171 minimizes the above formula (3) by using the annealing machine (S208). Note that S208 can be processing similar to S106 described above.

Then, the optimization processing unit 171 specifies the direction and the arrangement of the magnetization (magnet) in each magnet region on the basis of the state (state) of the bit that gives the minimum value to the above formula (3) (S209). For example, in S209, the optimization processing unit 171 specifies a value of the state variable $s_{j,k}$ and specifies whether magnetization (magnet) in one direction exists (any one of $s_{j,k}$ is "one") and whether the magnetization does not exist (all of $s_{j,k}$ are "zero") for each magnet region $N_j$. For example, in S209, the direction and the arrangement of the magnets in the magnetic device can be specified.

Next, the optimization processing unit 171 specifies the auxiliary variable $x_i$ of the clockwise coil in each coil region and the auxiliary variable $y_i$ of the counterclockwise coil in each coil region on the basis of the state (state) of the bit that gives the minimum value to the above formula (3) (S210). Note that S210 can be processing similar to S107 described above.

Subsequently, the optimization processing unit 171 allocates the clockwise coil or counterclockwise coil to each coil region on the basis of the auxiliary variable $x_i$ of the clockwise coil and the auxiliary variable $y_i$ of the counterclockwise coil in each specified coil region (S211). Note that S211 can be processing similar to S108 described above.

Then, the optimization processing unit 171 combines the same kind of adjacent coil regions into a single coil region for each coil region in the coil arrangement region and converts the coil regions into a format that can be easily used as an actual coil shape (S212). Note that S212 can be processing similar to S109 described above.

Next, with reference to FIGS. 20A and 20B, an example of a flow when the same kind of adjacent coil regions are combined into a single coil region will be described by using an example of the technology disclosed in this case. For example, details of the processing described above regarding S109 and S212 will be described.

Figure 21:
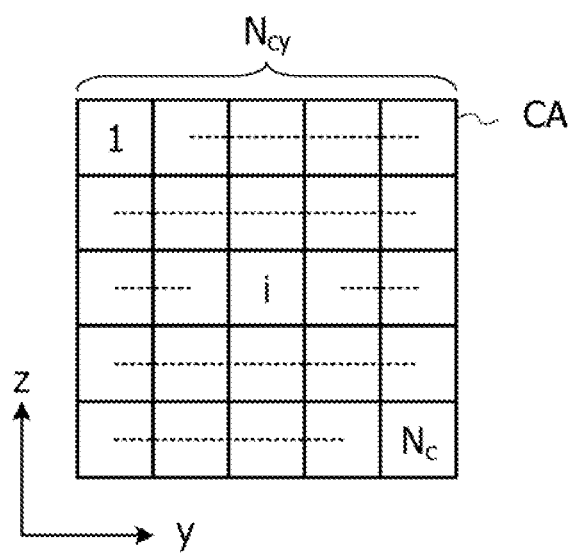
FIG. 21 is a diagram illustrating an example of the number of divisions $N_{cy}$ in a y-axis direction in a coil arrangement region CA.

Furthermore, when the example of the flow when the same kind of adjacent coil regions are combined into the single coil region is described, as illustrated in FIG. 21, it is assumed that the number of divisions in the y-axis direction in the coil arrangement region CA be $N_{cy}$.

First, the optimization processing unit 171 determines whether or not the auxiliary variable $x_i$ of the clockwise coil and the auxiliary variable $y_i$ of the counterclockwise coil in the coil region $N_i$ satisfy "$x_i=1$ and $y_i=1$" or "$x_i=0$ and $y_i=0$" (S301). In a case where it is determined in S301 that "$x_i=1$ and $y_i=1$" or "$x_i=0$ and $y_i=0$" is satisfied, the optimization processing unit 171 proceeds the processing to S302, and in a case where it is determined that "$x_i=1$ and $y_i=1$" or "$x_i=0$ and $y_i=0$" is not satisfied, the optimization processing unit 171 proceeds the processing to S303.

Then, the optimization processing unit 171 ends the processing when determining that the coil does not exist in the i-th coil region $N_i$ (S302). For example, in S302, the optimization processing unit 171 ends the processing as assuming that both of the clockwise coil and the counterclockwise coil do not exist in the i-th coil region $N_i$.

Next, the optimization processing unit 171 determines whether or not the auxiliary variable $x_i$ of the clockwise coil in the coil region $N_i$ is "$x_i=1$" (S303). In a case where it is determined in S303 that "$x_i=1$" is satisfied, the optimization processing unit 171 proceeds the processing to S304, and in a case where it is determined that "$x_i=1$" is not satisfied, the optimization processing unit 171 proceeds the processing to S308.

Subsequently, the optimization processing unit 171 determines whether or not "$x_i=1$" and "remainder obtained by dividing i by $N_{cy}$ is number other than zero" are satisfied in the coil region $N_i$ (S304). For example, in S304, in the example illustrated in FIG. 21, the optimization processing unit 171 determines whether or not the coil region exists on the right side of the coil region $N_i$ and the auxiliary variable $x_i$ of the coil region on the right side is one.

In a case where it is determined in S304 that both "$x_i=1$" and "remainder obtained by dividing i by $N_{cy}$ is number other than zero" are satisfied, the optimization processing unit 171 proceeds the processing to S305, and in a case where it is determined that "$x_i=1$" and "remainder obtained by dividing i by $N_{cy}$ is number other than zero" are not satisfied, the optimization processing unit 171 proceeds the processing to S306.

Next, the optimization processing unit 171 combines the i-th coil region $N_i$ and the i+1 coil region $N_{i+1}$ into a single coil (S305). For example, in S305, in a case where the coil region where the clockwise coil exists is arranged on the right side of the coil region where the clockwise coil exists, the optimization processing unit 171 combines these coil regions into a single coil region where the clockwise coil exists.

Subsequently, the optimization processing unit 171 determines whether or not "$x_{i+Ncy}=1$" and "$N_c-N_{cy}$ is equal to or more than i" are satisfied in the coil region $N_i$ (S306). For example, in S306, in the example illustrated in FIG. 21, the optimization processing unit 171 determines whether or not the coil region exists on the lower side of the coil region $N_i$ and the auxiliary variable $x_i$ of the coil region on the lower side is one.

In a case where it is determined in S304 that both "$x_{i+Ncy}=1$" and "$N_c-N_{cy}$ is equal to or more than i" are satisfied, the optimization processing unit 171 proceeds the processing to S307, and in a case where it is determined that "$x_{i+Ncy}=1$" and "$N_c-N_{cy}$ is equal to or more than i" are not satisfied, the optimization processing unit 171 proceeds the processing to S308.

Then, the optimization processing unit 171 combines the i-th coil region $N_i$ and the i+$N_{cy}$-th coil region $N_{i+Ncy}$ into a single coil (S307). For example, in S307, in a case where the coil region where the clockwise coil exists is arranged on the lower side of the coil region where the clockwise coil exists, the optimization processing unit 171 combines these coil regions into a single coil region where the clockwise coil exists.

Then, from S308 to S312, the processing described regarding S303 to S307 is similarly executed on the auxiliary variable $y_i$ of the counterclockwise coil, and the processing ends. Accordingly, it is possible to combine the same kind of adjacent coil regions into a single coil region without exception for each of the clockwise coil and the counterclockwise coil.

Figure 20A:
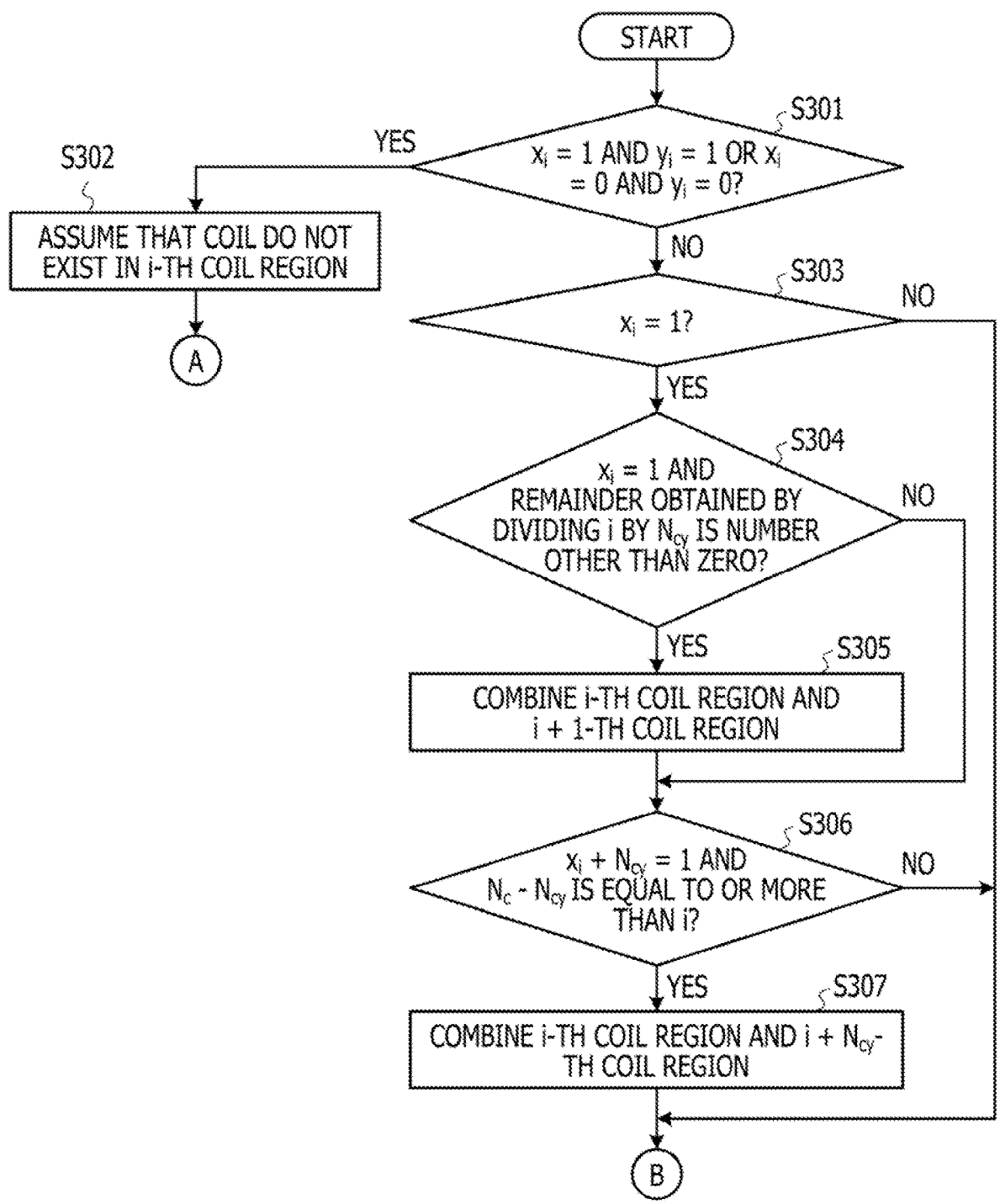
FIGS. 20A and 20B are a flowchart illustrating an example of a flow when the same kind of adjacent coil regions are combined into the single coil region by using an example of the technology disclosed in this case.
Figure 20B:
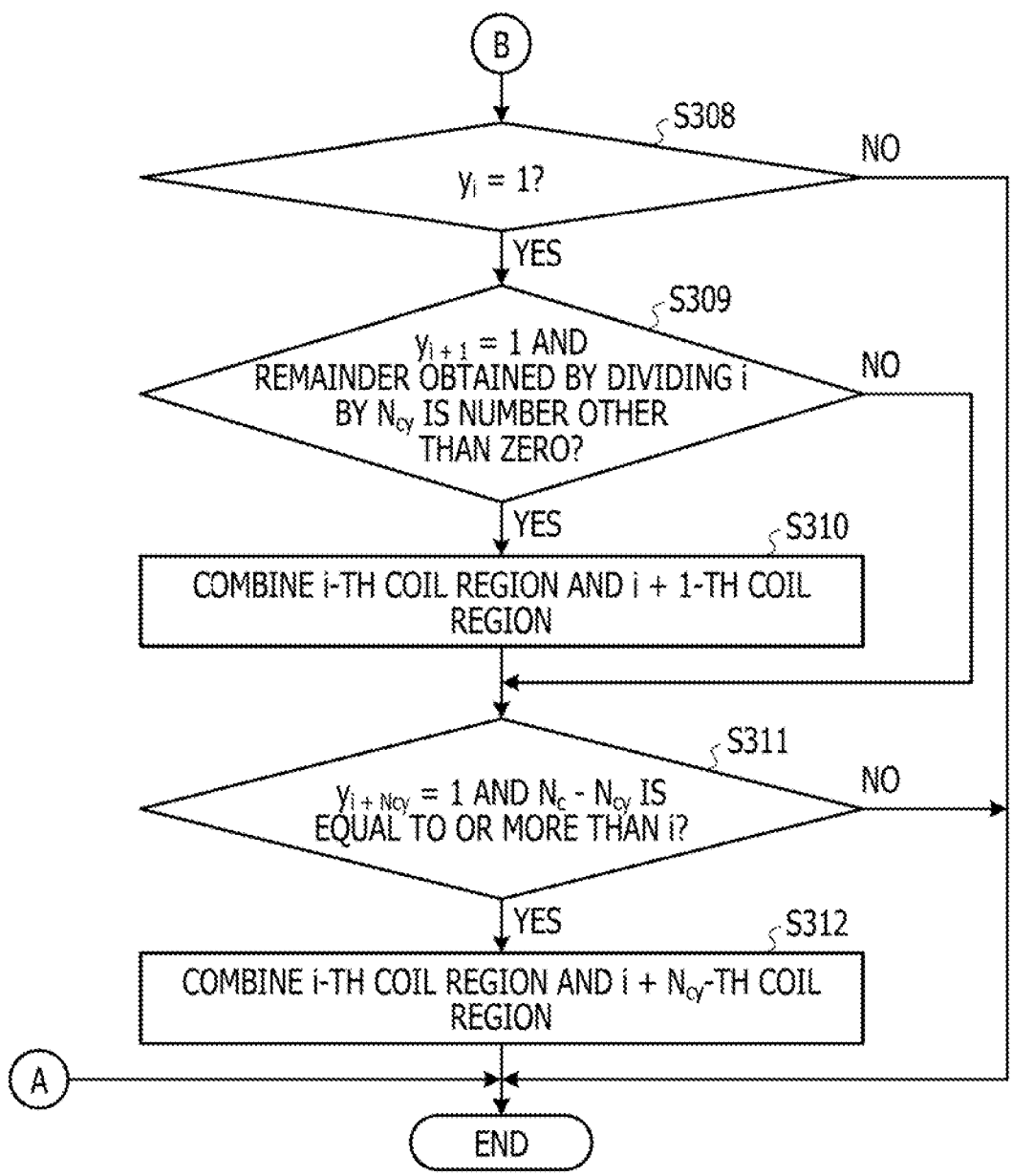

In an example of the technology disclosed in this case, for example, the processing illustrated in FIGS. 20A and 20B is executed on each coil region (i-th to $N_c$-th coil regions), and processing of combining the coils is executed on the entire coil arrangement region. Accordingly, it is possible to obtain the shape, the number, the position, or the like of the coils optimum for the magnetic device in the entire surface where the coil is arranged (coil arrangement region) as a form that can be more easily used for the actual design of the magnetic device.

Figure 18:
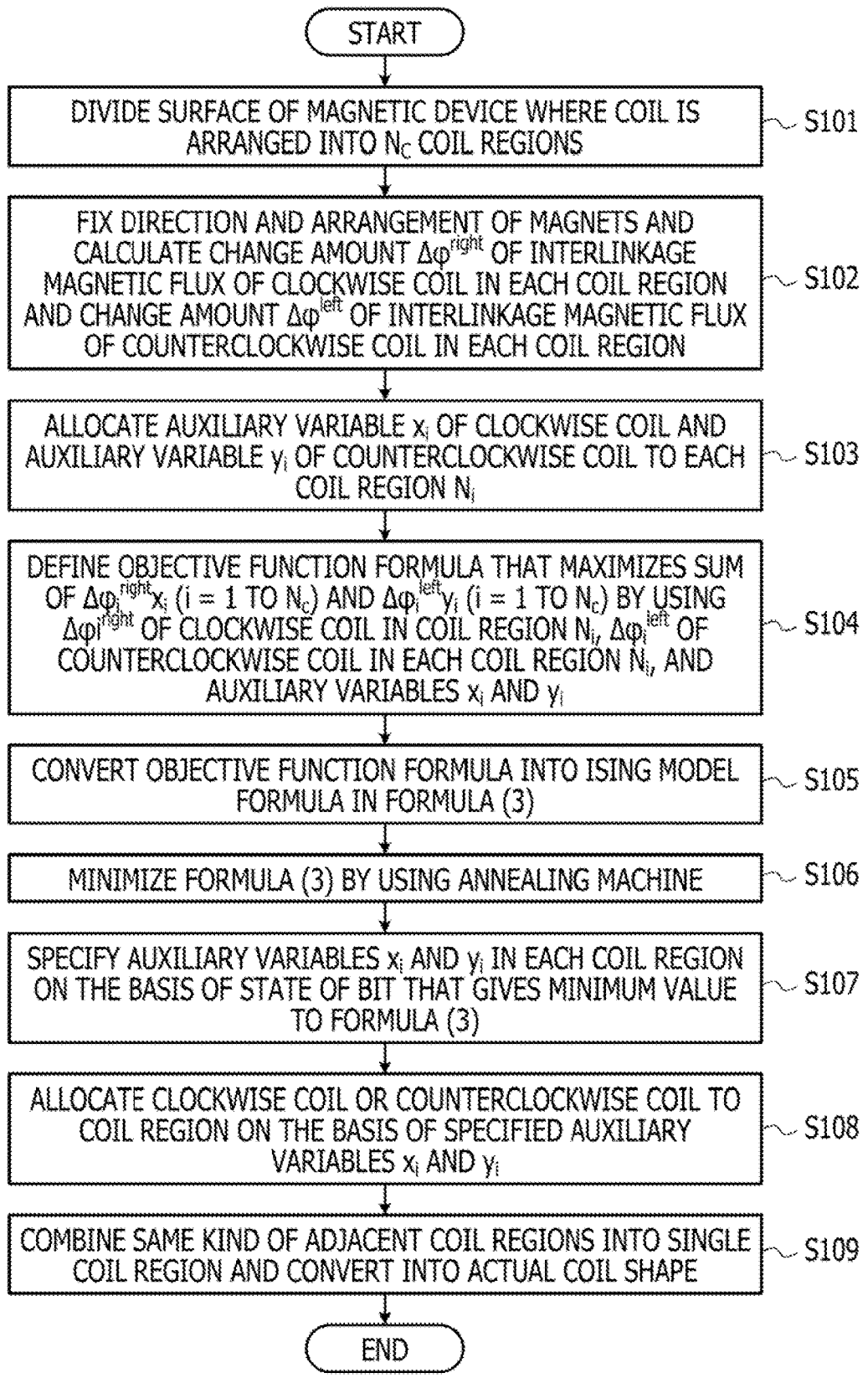
FIG. 18 is a flowchart illustrating an example of a flow when a change amount of an interlinkage magnetic flux in the coil is optimized by optimizing the shape, arrangement, and the number of the coils of the magnetic device by using an example of the technology disclosed in this case.

Furthermore, in FIGS. 18 to 20, the flow of the processing in an example of the technology disclosed in this case has been described according to a specific order. However, in the technology disclosed in this case, it is possible to appropriately switch an order of each steps in a technically possible range. Furthermore, in the technology disclosed in this case, a plurality of steps may be collectively performed in a technically possible range.

Examples of the annealing method and the annealing machine will be described below.

The annealing method is a method of probabilistically obtaining a solution using superposition of random number values and quantum bits. The following describes a problem of minimizing a value of an evaluation function to be optimized as an example. The value of the evaluation function is referred to as energy. Furthermore, in a case where the value of the evaluation function is maximized, the sign of the evaluation function only needs to be changed.

First, a process is started from an initial state in which one of discrete values is assigned to each variable. With respect to a current state (combination of variable values), a state close to the current state (for example, a state in which only one variable is changed) is selected, and a state transition therebetween is considered. An energy change with respect to the state transition is calculated. Depending on the value, it is probabilistically determined whether to adopt the state transition to change the state or not to adopt the state transition to keep the original state. In a case where an adoption probability when the energy goes down is selected to be larger than that when the energy goes up, it can be expected that a state change will occur in a direction that the energy goes down on average, and that a state transition will occur to a more appropriate state over time. Therefore, there is a possibility that an optimum solution or an approximate solution that gives energy close to the optimum value can be obtained finally.

If this is adopted when the energy goes down deterministically and is not adopted when the energy goes up, the energy change decreases monotonically in a broad sense with respect to time, but no further change occurs when reaching a local solution. As described above, since there are a very large number of local solutions in the discrete optimization problem, a state is almost certainly caught in a local solution that is not so close to an optimum value. Therefore, when the discrete optimization problem is solved, it is important to determine probabilistically whether to adopt the state.

In the annealing method, it has been proved that by determining an adoption (permissible) probability of a state transition as follows, a state reaches an optimum solution in the limit of infinite time (iteration count).

In the following, a method of obtaining an optimum solution using the annealing method will be described step by step.

(1) For an energy change (energy reduction) value ($-\Delta E$) due to a state transition, a permissible probability p of the state transition is determined by any one of the following functions f ( ).

[Expression 19]

$$p(\Delta E, T) = f(-\Delta E/T) \qquad \text{Formula (1-1)}$$

[Expression 20]

$$f_{metro}(x) = \min(1, e^x) \qquad \text{(Metropolis method) Formula (1-2)}$$

$$f_{Gibbs}(x) = \frac{1}{1+e^{-x}} \text{(Gibbs method)} \qquad \text{Formula (1-3)}$$

Here, the reference T is a parameter called a temperature value and can be changed as follows, for example.

(2) The temperature value T is logarithmically reduced with respect to an iteration count t as represented by the following formula.

$$T = \frac{T_0 \log(c)}{\log(t+c)} \quad \text{Formula (2)}$$

Here, $T_0$ is an initial temperature value, and is desirably a sufficiently large value depending on a problem.

In a case where the permissible probability represented by the formula in (1) is used, if a steady state is reached after sufficient iterations, an occupation probability of each state follows a Boltzmann distribution for a thermal equilibrium state in the thermodynamics.

Then, when the temperature is gradually lowered from a high temperature, an occupation probability of a low energy state increases. Therefore, it is considered that the low energy state is obtained when the temperature is sufficiently lowered. Since this state is very similar to a state change caused when a material is annealed, this method is referred to as the annealing method (or pseudo-annealing method). Note that probabilistic occurrence of a state transition that increases energy corresponds to thermal excitation in the physics.

Figure 22:
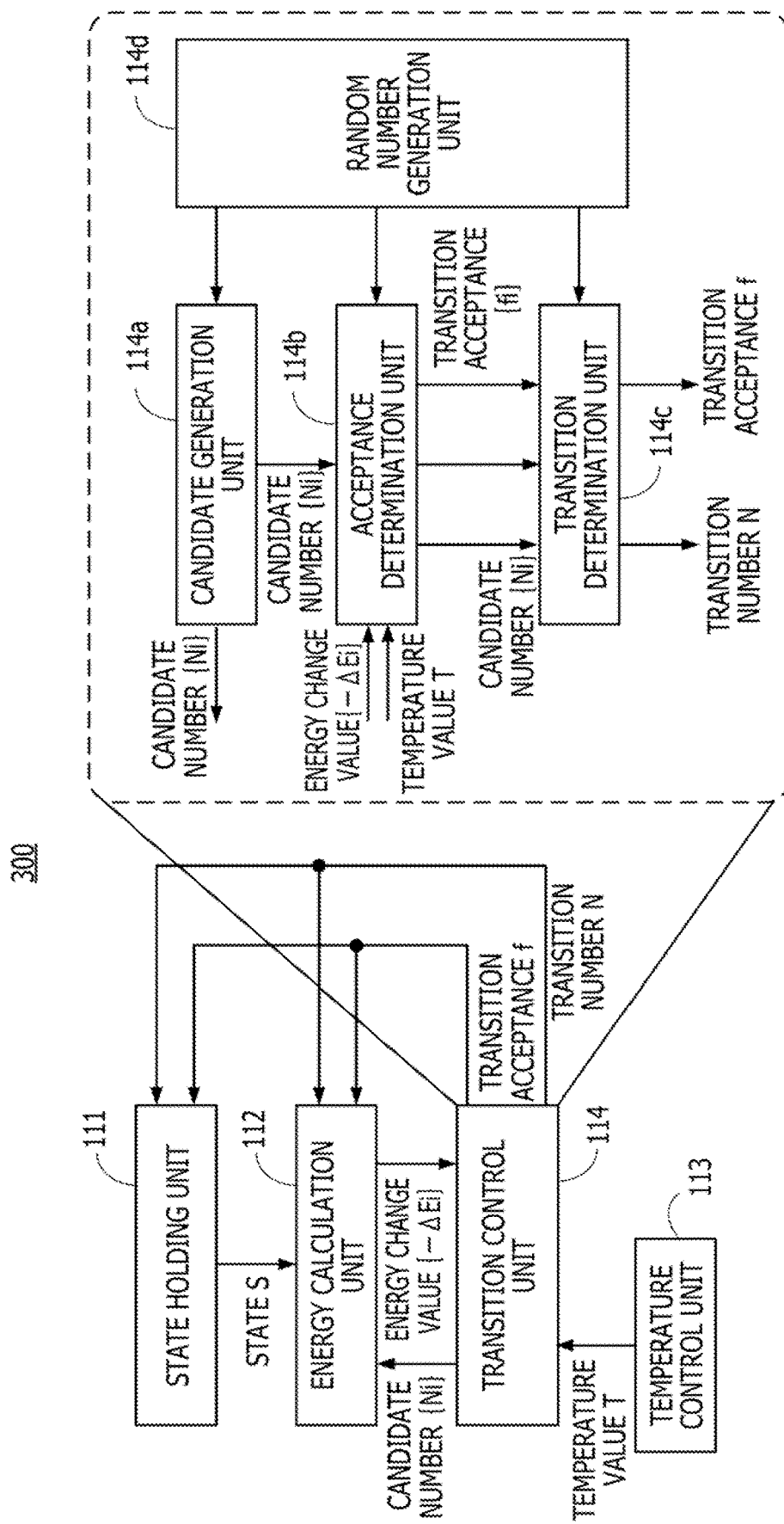
FIG. 22 is a diagram illustrating an example of a functional configuration of an annealing machine used for an annealing method.

FIG. 22 illustrates an example of a functional configuration of an annealing machine that performs the annealing method. However, in the following description, a case of generating a plurality of state transition candidates is also described. However, a basic annealing method generates one transition candidate at a time.

The annealing machine 300 includes a state holding unit 111 that holds a current state S (a plurality of state variable values). Furthermore, the annealing machine 300 includes an energy calculation unit 112 that calculates an energy change value $\{-\Delta Ei\}$ of each state transition when a state transition from the current state S occurs due to a change in any one of the plurality of state variable values. Moreover, the annealing machine 300 includes a temperature control unit 113 that controls the temperature value T and a transition control unit 114 that controls a state change. Note that the annealing machine 300 can be a part of the optimizer 100 described above.

The transition control unit 114 probabilistically determines whether to accept or not any one of the plurality of state transitions according to a relative relationship between the energy change value $\{-\Delta Ei\}$ and thermal excitation energy, based on the temperature value T, the energy change value $\{-\Delta Ei\}$, and a random number value.

Here, the transition control unit 114 includes a candidate generation unit 114a that generates a state transition candidate, and a propriety determination unit 114b that probabilistically determines whether or not to permit a state transition for each candidate on the basis of the energy change value $\{-\Delta Ei\}$ and the temperature value T. Moreover, the transition control unit 114 includes a transition determination unit 114c that determines a candidate to be adopted from the candidates that have been permitted, and a random number generation unit 114d that generates a random variable.

The operation of the annealing machine 300 in one iteration is as follows.

First, the candidate generation unit 114a generates one or more state transition candidates (candidate number $\{N_i\}$) from the current state S held in the state holding unit 111 to a next state. Next, the energy calculation unit 112 calculates the energy change value $\{-\Delta Ei\}$ for each state transition listed as a candidate using the current state S and the state transition candidates. The propriety determination unit 114b permits a state transition with a permissible probability of the above formula in (1) according to the energy change value $\{-\Delta Ei\}$ of each state transition using the temperature value T generated by the temperature control unit 113 and the random variable (random number value) generated by the random number generation unit 114d.

Then, the propriety determination unit 114b outputs propriety $\{fi\}$ of each state transition. In a case where there is a plurality of permitted state transitions, the transition determination unit 114c randomly selects one of the permitted state transitions using a random number value. Then, the transition determination unit 114c outputs a transition number N and transition propriety f of the selected state transition. In a case where there is a permitted state transition, a state variable value stored in the state holding unit 111 is updated according to the adopted state transition.

Starting from an initial state, the above-described iteration is repeated while the temperature value is lowered by the temperature control unit 113. When a completion determination condition such as reaching a certain iteration count or energy falling below a certain value is satisfied, the operation is completed. An answer output by the annealing machine 300 is a state when the operation is completed.

The annealing machine 300 illustrated in FIG. 22 may be implemented by using, for example, a semiconductor integrated circuit. For example, the transition control unit 114 may include a random number generation circuit that functions as the random number generation unit 114d, a comparison circuit that functions as at least a part of the propriety determination unit 114b, a noise table to be described later, or the like.

Regarding the transition control unit 114 illustrated in FIG. 22, details of a mechanism that permits a state transition at a permissible probability represented in the formula (1) will be further described.

A circuit that outputs one at the permissible probability p and outputs zero at a permissible probability (1−p) can be achieved by inputting the permissible probability p for input A and a uniform random number that takes a value of a section [0, 1) for input B in a comparator that has the two inputs A and B, outputs one when A>B is satisfied and outputs zero when A<B is satisfied. Therefore, if the value of the permissible probability p calculated on the basis of the energy change value and the temperature value T using the formula in (1) is input to input A of this comparator, the above-described function can be achieved.

For example, with a circuit that outputs one when $f(\Delta E/T)$ is larger than u, in which f is a function used in the formula in (1), and u is a uniform random number that takes a value of the section [0, 1), the above-described function can be achieved.

Furthermore, the same function as the above-described function can also be achieved by making the following modification.

Applying the same monotonically increasing function to two numbers does not change a magnitude relationship. Therefore, an output is not changed even if the same monotonically increasing function is applied to two inputs of the comparator. If an inverse function $f^{-1}$ of f is adopted as this monotonically increasing function, it can be seen that a circuit that outputs one when $-\Delta E/T$ is larger than $f^{-1}(u)$ can be given. Moreover, since the temperature value T is positive, it can be seen that a circuit that outputs one when $-\Delta E$ is larger than $Tf^{-1}(u)$ may be sufficient.

The transition control unit 114 in FIG. 22 is a conversion table that realizes the inverse function $f^{-1}(u)$ and may include a noise table that outputs a value of a next function with respect to an input that is a discretized section [0, 1).

[Expression 23]

$$f_{metro}^{-1}(u) = \log(u) \quad \text{Formula (3-1)}$$

$$f_{Gibbs}^{-1}(u) = \log\left(\frac{u}{1-u}\right) \quad \text{Formula (3-2)}$$

Figure 23:
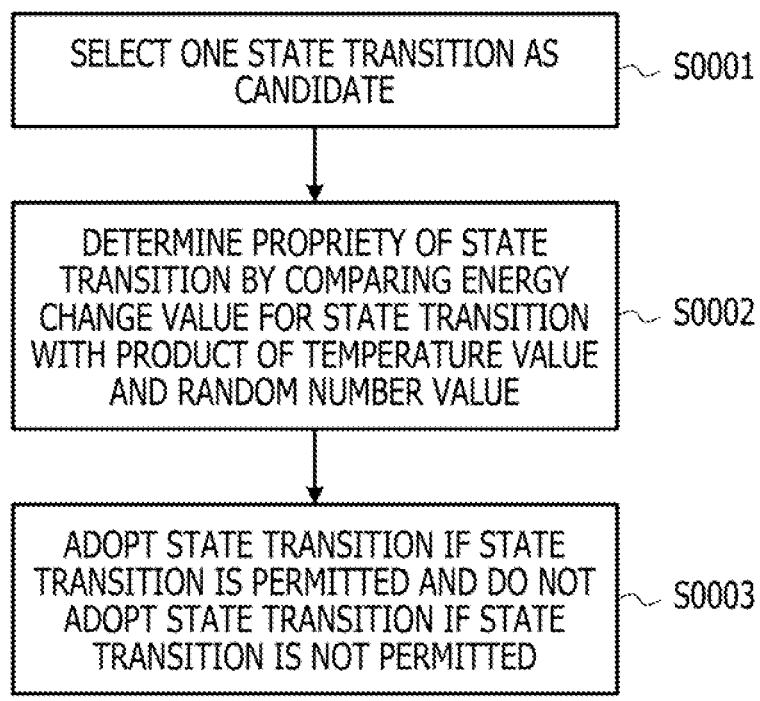
FIG. 23 is a diagram illustrating an example of an operation flow of a transition control unit.

FIG. 23 is a diagram illustrating an exemplary operation flow of the transition control unit 114. The operation flow illustrated in FIG. 23 includes a step of selecting one state transition as a candidate (S0001), a step of determining propriety of the state transition by comparing an energy change value for the state transition with a product of a temperature value and a random number value (S0002), and a step of adopting the state transition if the state transition is permitted, and not adopting the state transition if the state transition is not permitted (S0003).

(Optimization Method)

The optimization method disclosed in this case is an optimization method that optimizes the change amount of the interlinkage magnetic flux in the coil of the magnetic device, and the optimization method includes an optimization processing of optimizing the change amount of the interlinkage magnetic flux in the coil by using the objective function formula that maximizes the sum of $\Delta\varphi_i^{right} x_i$ (i=1 to $N_c$) and $\Delta\varphi_i^{left} y_i$ (i=1 to $N_c$), when it is assumed that the surface of the magnetic device where the coil is arranged be divided into $N_c$ ($N_c$ is integer) coil regions, in the i-th coil region $N_i$, the auxiliary variable of the clockwise coil that may exist in the coil region $N_i$ be $x_i$, and the auxiliary variable of the counterclockwise coil that may exist in the coil region $N_i$ be $y_i$, a case where the clockwise coil exists be $x_i=1$, a case where the clockwise coil does not exist be $x_i=0$, a case where the counterclockwise coil exists be $y_i=1$, a case where the counterclockwise coil does not exist be $y_i=0$, both of the clockwise coil and the counterclockwise coil do not exist when $x_i=1$ and $y_i=1$ are satisfied, and the change amount of the interlinkage magnetic flux of the clockwise coil in the coil region $N_i$ be $\Delta\varphi_i^{right}$ and the change amount of the interlinkage magnetic flux of the counterclockwise coil in the coil region $N_i$ i be $\Delta\varphi_i^{left}$.

The optimization method disclosed in this case can be performed, for example, by the optimizer disclosed in this case. Furthermore, a suitable mode of the optimization method disclosed in this case can be made to be similar to the suitable mode of the optimizer disclosed in this case, for example.

(Optimization Program)

The optimization program disclosed in this case is an optimization program that optimizes the change amount of the interlinkage magnetic flux in the coil of the magnetic device, and the optimization program causes a computer to execute processing of optimizing the change amount of the interlinkage magnetic flux in the coil by using the objective function formula that maximizes the sum of $\Delta\varphi_i^{right} x_i$ (i=1 to $N_c$) and $\Delta\varphi_i^{left} y_i$ (i=1 to $N_c$), when it is assumed that the surface of the magnetic device where the coil is arranged be divided into $N_c$ ($N_c$ is integer) coil regions, in the i-th coil region $N_i$, the auxiliary variable of the clockwise coil that may exist in the coil region $N_i$ be $x_i$, and the auxiliary variable of the counterclockwise coil that may exist in the coil region $N_i$ be $y_i$, a case where the clockwise coil exists be $x_i=1$, a case where the clockwise coil does not exist be $x_i=0$, a case where the counterclockwise coil exists be $y_i=1$, a case where the counterclockwise coil does not exist be $y_i=0$, both of the clockwise coil and the counterclockwise coil do not exist when $x_i=1$ and $y_i=1$ are satisfied, and the change amount of the interlinkage magnetic flux of the clockwise coil in the coil region $N_i$ e $\Delta\varphi_i^{right}$ and the change amount of the interlinkage magnetic flux of the counterclockwise coil in the coil region $N_i$ be $\Delta\varphi_i^{left}$.

The optimization program disclosed in this case can be configured as, for example, a program that causes a computer to execute the optimization method disclosed in this case. Furthermore, a suitable mode of the optimization program disclosed in this case can be made to be similar to the suitable mode of the optimizer disclosed in this case, for example.

The optimization program disclosed in this case can be created using various known programming languages according to the configuration of a computer system to be used, the type and version of the operating system, and the like.

The optimization program disclosed in this case may be recorded in a recording medium such as an internal hard disk or an external hard disk, or may be recorded in a recording medium such as a CD-ROM, DVD-ROM, MO disk, or USB memory.

Moreover, in a case where the optimization program disclosed in this case is recorded in a recording medium as described above, the program can be directly used, or can be installed into a hard disk and then used through a recording medium reader included in the computer system, as needed. Furthermore, the optimization program disclosed in this case may be recorded in an external storage region (another computer or the like) accessible from the computer system through an information communication network. In this case, the optimization program disclosed in this case, which is recorded in the external storage region, can be used directly, or can be installed in a hard disk and then used from the external storage region through the information communication network, as needed.

Note that the optimization program disclosed in this case may be divided for each of any pieces of processing, and recorded in a plurality of recording media.

(Computer-Readable Recording Medium)

A computer-readable recording medium disclosed in this case records the optimization program disclosed in this case.

The computer-readable recording medium disclosed in this case is not particularly limited, and may be appropriately selected according to the purpose. For example, the computer-readable recording medium may be an internal hard disk, an external hard disk, a CD-ROM, a DVD-ROM, an MO disk, a USB memory, or the like.

Furthermore, the computer-readable recording medium disclosed in this case may include a plurality of recording media in which the optimization program disclosed in this case is recorded after being divided for each of any pieces of processing.

EMBODIMENTS

An embodiment of the technology disclosed in this case will be described. However, the technology disclosed in this case is not limited to the embodiments.

First Embodiment

By using an example of an optimizer disclosed in this case as a first embodiment, an interlinkage magnetic flux in a coil of a magnetic device is optimized, and optimum arrangement or the like of the coils and magnets in the magnetic device is obtained. In the first embodiment, by using the optimizer having the hardware configuration as illustrated in FIG. 16, the interlinkage magnetic flux in the coil of the magnetic device is optimized according to a flow illustrated in the flowchart in FIGS. 19A and 19B. Furthermore, to minimize an objective function formula (minimize Ising model formula in formula (3)), the Digital Annealer (registered trademark) is used.

Figure 24:
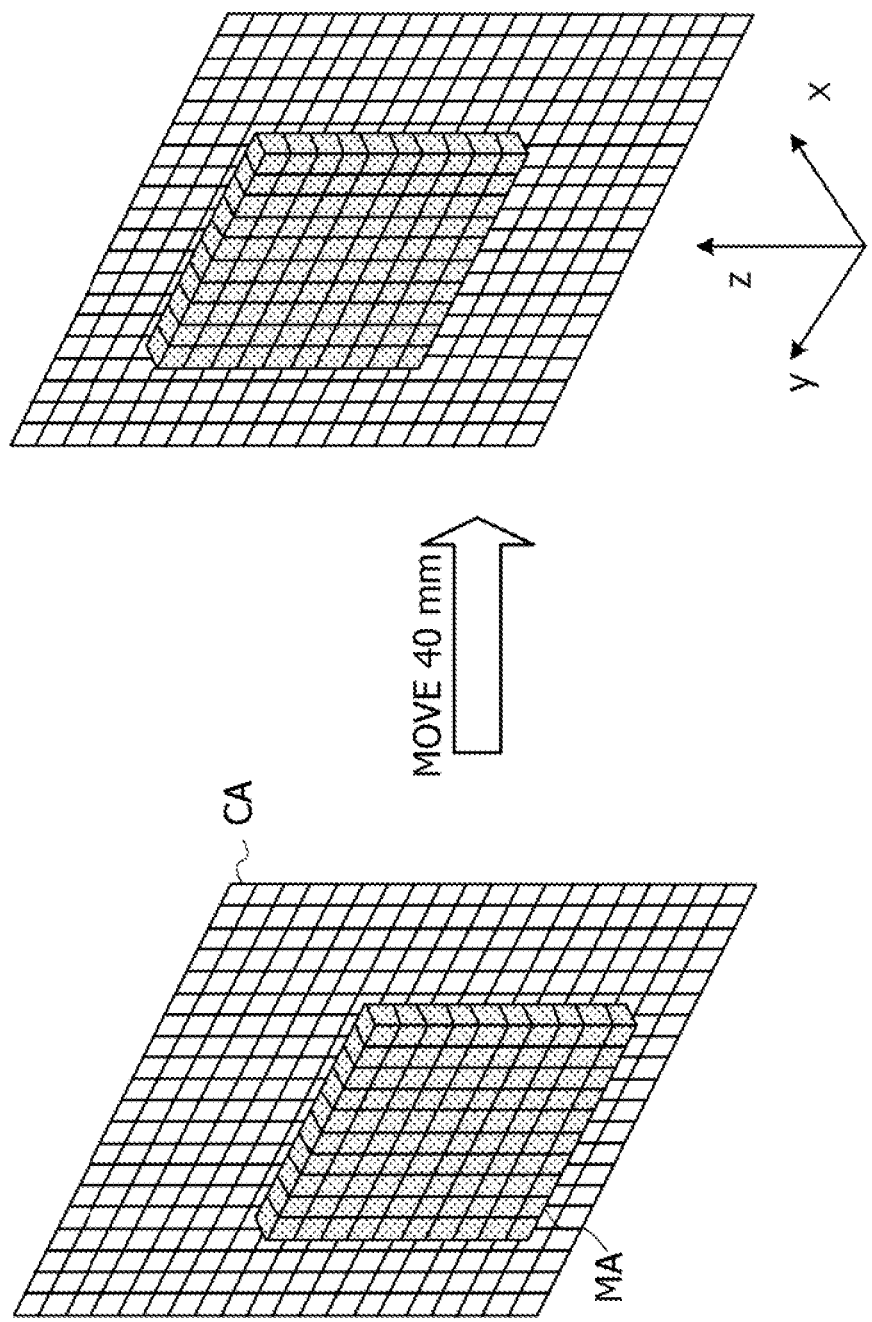
FIG. 24 is a diagram illustrating an example of a change in a positional relationship between a coil arrangement region and a magnet arrangement region in a first embodiment.
Figure 25:
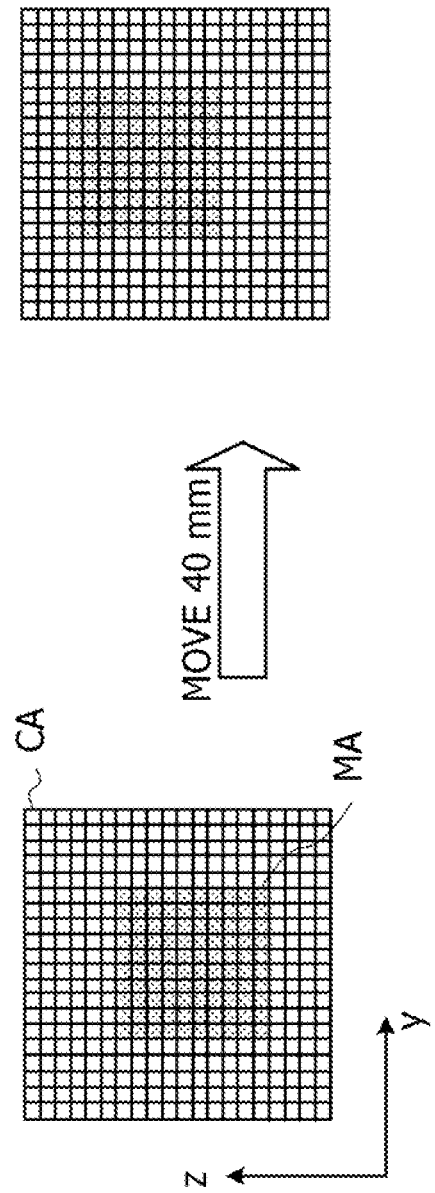
FIG. 25 is a diagram illustrating an example of the change in the positional relationship between the coil arrangement region and the magnet arrangement region in the first embodiment.

In the first embodiment, as illustrated in FIGS. 24 and 25, a surface where the coils are arranged (coil arrangement region CA) is divided into a grid pattern so that the number of divisions in the vertical direction and the horizontal direction is 20, and a square coil region satisfying $N_c=400$ is formed. Note that one side of the single coil region is set to 10 mm.

Furthermore, in the first embodiment, as illustrated in FIGS. 24 and 25, a region where the magnets are arranged (magnet arrangement region MA) is divided into a grid pattern so that the number of divisions in the vertical direction and the horizontal direction is 10, and a cubic magnet region satisfying $N_m=100$ is formed. Note that one side of the single magnet region is set to 10 mm.

The coil arrangement region CA and the magnet arrangement region MA described above are set by the Digital Annealer (registered trademark) by using about 1400 bits.

In the first embodiment, by using the coil region and the magnet region set as described above, an objective function formula in a QUBO format represented by the following formula, in which a constraint term for constraining a cross-sectional area of the coil to be a predetermined area is added to the above formula (2), is defined.

$$E' = -\sum_{i=1}^{N_c} \Delta \phi'^{right}_i x_i - \sum_{i=1}^{N_c} \Delta \phi'^{left}_i y_i +$$

$$\alpha \sum_{j=1}^{N_c} \sum_{n=1}^{6} \sum_{u=1(u \neq n)}^{6} s_{j,s} s_{j,u} + \beta \left( \sum_{i=1}^{N_c} (x_i + y_i) - N_{coil} \right)^2$$

However, in the above formula,
the reference E' is an objective function formula.
The reference $N_c$ is an integer that represents the number of coil regions.
The reference $N_m$ is an integer that represents the number of magnet regions.
The reference $\Delta\phi'^{right}_i$ is a numerical value that represents the change amount of the interlinkage magnetic flux of the clockwise coil in the i-th coil region $N_i$, generated from the magnet region $N_j$.
The reference $\Delta\phi'^{left}_i$ is a numerical value that represents the change amount of the interlinkage magnetic flux of the counterclockwise coil in the i-th coil region $N_i$, generated from the magnet region $N_j$.

The reference $x_i$ is an auxiliary variable of the clockwise coil that may exist in the i-th coil region $N_i$.
The reference $y_i$ is an auxiliary variable of the counterclockwise coil that may exist in the i-th coil region $N_i$.
The reference $\alpha$ is a positive number.
The reference $s_{j,n}$ is a binary variable of zero or one that represents a direction of magnetization at the time of a state number n (n=1, 2, 3, 4, 5, 6) in the j-th magnet region $N_j$.
The reference $s_{j,u}$ is a binary variable of zero or one that represents a direction of magnetization at the time when a state number u (u=1, 2, 3, 4, 5, 6) in the j-th magnet region $N_j$.
The reference $\beta$ is a positive number.
The reference $N_{coil}$ is an integer that specifies a total number of clockwise and counterclockwise coils arranged in the coil arrangement region.

In the above formula, while it is assumed that $N_{coil}=24$, a constraint is imposed such that the number of coil regions where the coils are arranged (cross-sectional area of coil) is 24. Note that no constraint is imposed on the number of magnet regions where the magnets are arranged (the number of small magnets).

Furthermore, the change amount $\Delta\phi'_{i,j,k}$ of the interlinkage magnetic flux in the coil region $N_i$ that is used to calculate $\Delta\phi'^{right}_i$ and $\Delta\phi'^{left}_i$ in the above formula and is generated by magnetization (magnet) in a direction represented by a state number k, in the magnet region $N_j$.

$$\Delta\phi'_{i,j,k} = B_{i,j,k}^x(z)A - B_{i,j,k}^x(z+\Delta z)A \qquad \text{[Expression 26]}$$

However, in the above formula,
the reference $\Delta\phi'_{i,j,k}$ is the change amount of the interlinkage magnetic flux in the coil region $N_i$ that is generated by the magnetization (magnet) in the direction represented by the state number k, in the magnet region $N_j$.
The reference $B^x_{i,j,k}(z)$ means a magnetic flux density in the x-axis direction before the change that is generated from the magnetization (magnet) in the direction represented by the state number k in the magnet region $N_j$, at a center point of the i-th coil region $N_i$.
The reference $B^x_{i,j,k}(z+\Delta z)$ means a magnetic flux density in the x-axis direction, after the magnet arrangement region MA is moved in the z-axis direction by $\Delta z$, generated from the magnetization (magnet) in the direction represented by the state number k in the magnet region $N_j$, at the center point of the i-th coil region $N_i$.
The reference A is an area of the coil region (cross-sectional area of coil).
Furthermore, the above $B^x_{i,j,k}$ is calculated by the following formula.

$$B_{i,j,k} = -\frac{1}{4\pi} \nabla \left( \int_V M_{j,k} \cdot \nabla \left( \frac{1}{r_i} \right) dV \right) = \left( B^x_{i,j,k}, B^y_{i,j,k}, B^z_{i,j,k} \right)$$

However, in the above formula,
the reference $r_i$ is a distance from a source point (for example, center point of magnet region) to the i-th coil region $N_i$.
The reference $M_{j,k}$ is magnetization in the direction represented by the state number k of the magnet region $N_j$.

Here, in the first embodiment, a distance between the coil arrangement region CA and the magnet arrangement region MA is set to 1 mm. Because the distance between the coil arrangement region CA and the magnet arrangement region MA is reflected to "$r_i$" in the above formula, when the distance between the coil arrangement region CA and the magnet arrangement region MA changes, $B^x_{i,j,k}$ also changes. Therefore, when the distance between the coil arrangement region CA and the magnet arrangement region MA changes, $\Delta \varphi'_{i,j,k}$ also changes. As a result, $\Delta \varphi'^{right}_i$ and $\Delta \varphi'^{left}_i$ in the objective function formula change.

Therefore, in an example of the technology disclosed in this case, by appropriately considering the distance between the coil arrangement region CA and the magnet arrangement region MA, the change amount of the interlinkage magnetic flux in the coil can be optimized.

In the first embodiment, the distance (gap width) between the coil arrangement region CA and the magnet arrangement region MA is set to 1 mm.

Then, in the first embodiment, the objective function formula described above is converted into the Ising model formula represented by the following formula (3), and the converted Ising model formula is minimized by using the annealing method (annealing) by the Digital Annealer (registered trademark).

$$E = -\sum_{i,j=0} w_{ij} s_i s_j - \sum_{i=0} b_i s_i \quad \text{Formula (3)}$$

However, in the above formula (3), the reference E is an objective function formula converted into the Ising model formula, the reference $w_{ij}$ is a numerical value that represents an interaction between an i-th bit and a j-th bit, the reference $b_i$ is a numerical value that represents a bias with respect to the i-th bit, the reference $s_i$ is a binary variable that represents that the i-th bit is zero or one, and the reference $s_j$ is a binary variable that represents that the j-th bit is zero or one.

In the first embodiment, on the basis of a state of the bit when the Ising model formula is minimized, the shape, the position, and the number of coils and the direction and the arrangement of the magnets at the time when the change amount of the interlinkage magnetic flux in the coil is optimized are specified.

Furthermore, in the first embodiment, according to the flow of the flowchart illustrated in FIGS. 20A and 20B, in each coil region in the coil arrangement region CA, the same kind of adjacent coil regions are combined into a single coil region.

Figure 26:
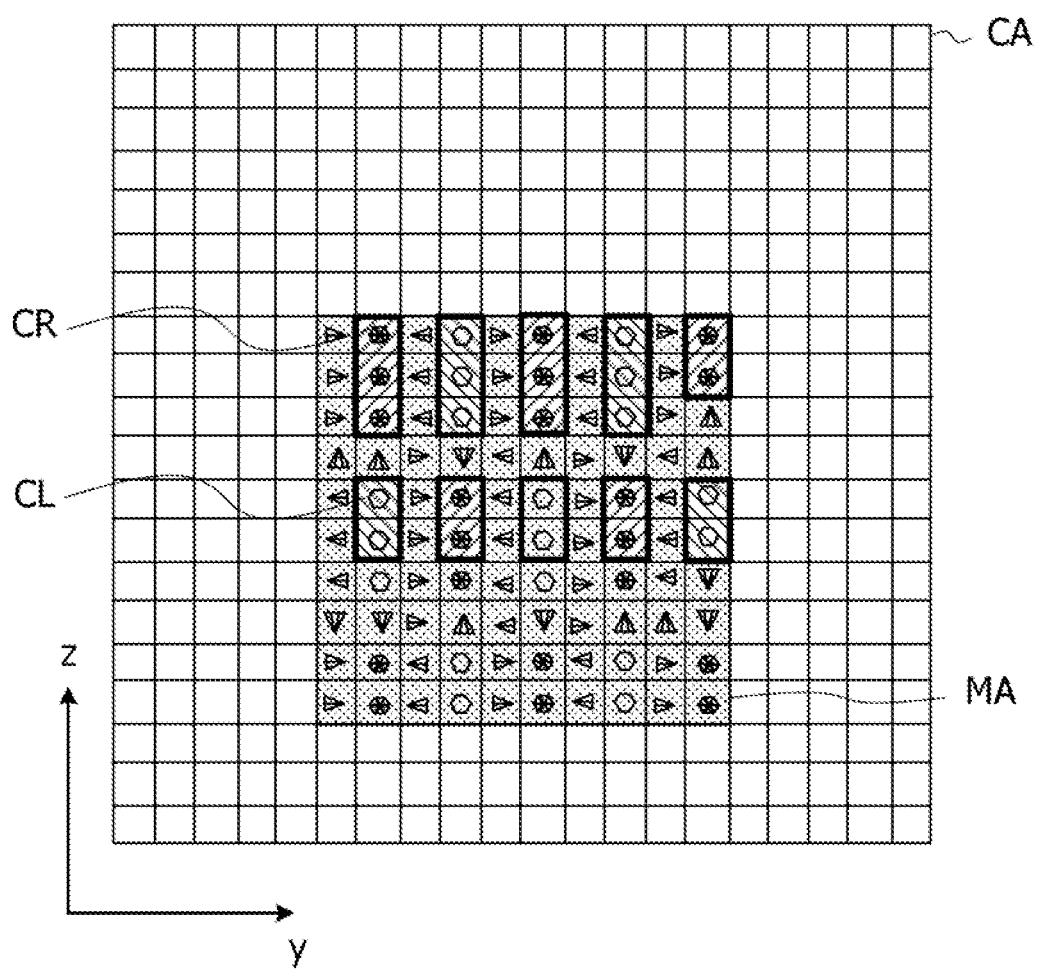
FIG. 26 is a diagram illustrating an example of arrangement of coils and magnets or the like when a change amount of an interlinkage magnetic flux of the coil is optimized before moving a coil region, in the first embodiment.
Figure 27:
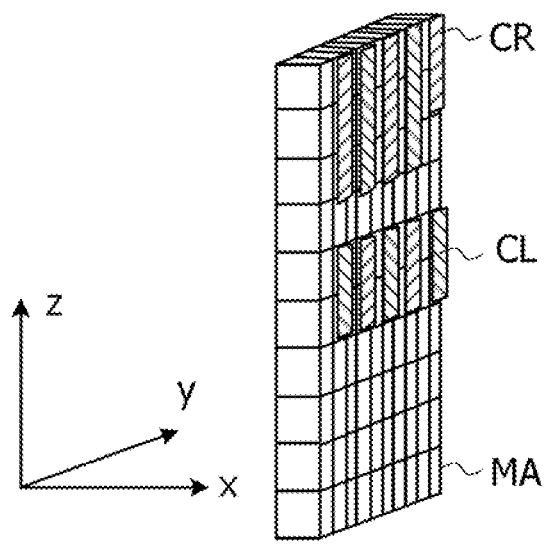
FIG. 27 is a diagram illustrating an example of the arrangement of the coils and the magnets or the like when the change amount of the interlinkage magnetic flux of the coil is optimized before moving the coil region, in the first embodiment.

FIGS. 26 and 27 are diagrams illustrating an example of the arrangement of the coils and the magnets or the like when the change amount of the interlinkage magnetic flux of the coil is optimized before moving the coil region, in the first embodiment.

Figure 28:
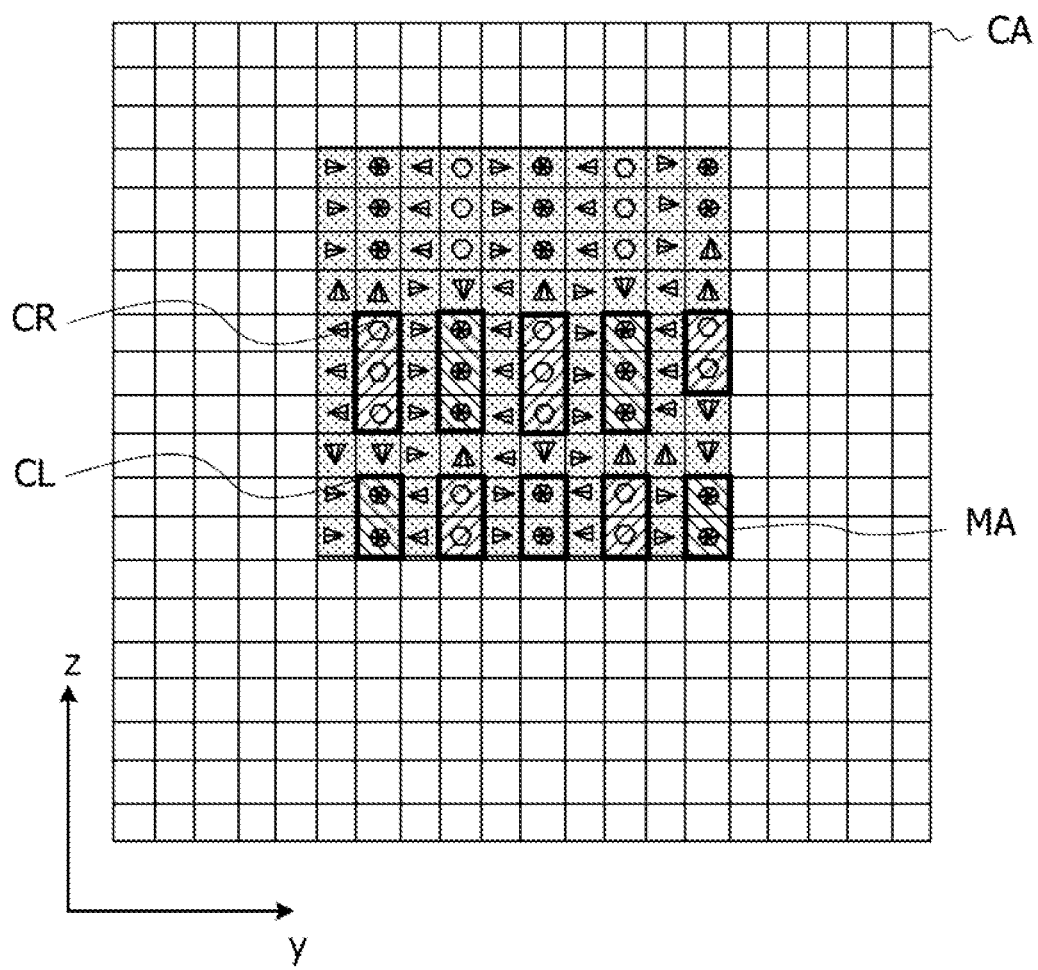
FIG. 28 is a diagram illustrating an example of the arrangement of the coils and the magnets or the like when the change amount of the interlinkage magnetic flux of the coil is optimized after the coil region has been moved, in the first embodiment.
Figure 29:
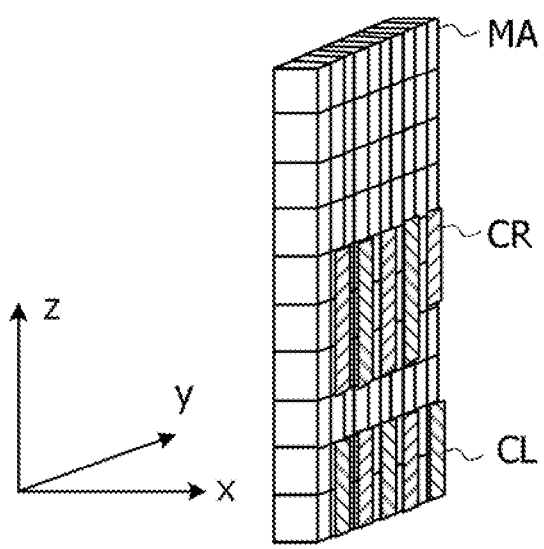
FIG. 29 is a diagram illustrating an example of the arrangement of the coils and the magnets or the like when the change amount of the interlinkage magnetic flux of the coil is optimized after the coil region has been moved, in the first embodiment.

FIGS. 28 and 29 are diagrams illustrating an example of the arrangement of the coils and the magnets or the like when the change amount of the interlinkage magnetic flux of the coil is optimized after the coil region has been moved, in the first embodiment.

In FIGS. 26 to 29, an arrow in the coil arrangement region MA means that the direction of the magnetization in the coil region is a direction indicated by the arrow. Furthermore, in FIGS. 26 to 29, a circle in the coil arrangement region MA means that the direction of the magnetization in the coil region is a front direction of the paper (plus direction in x-axis). Moreover, in FIGS. 26 to 29, a hexagonal symbol in the coil arrangement region MA means that the direction of the magnetization in the coil region is a depth direction of the paper (minus direction in x-axis).

In the first embodiment in which the distance (gap width) between the coil arrangement region CA and the magnet arrangement region MA is set to be 1 mm, as illustrated in FIGS. 26 to 29, when five clockwise coils CR and five counterclockwise coils CL are arranged, the change amount of the interlinkage magnetic flux in the coil is optimized.

Second Embodiment

In a second embodiment, a change amount of an interlinkage magnetic flux in a coil is optimized as in the first embodiment other than that a distance (gap width) between a coil arrangement region CA and a magnet arrangement region MA is set to 5 mm in the first embodiment.

Figure 30:
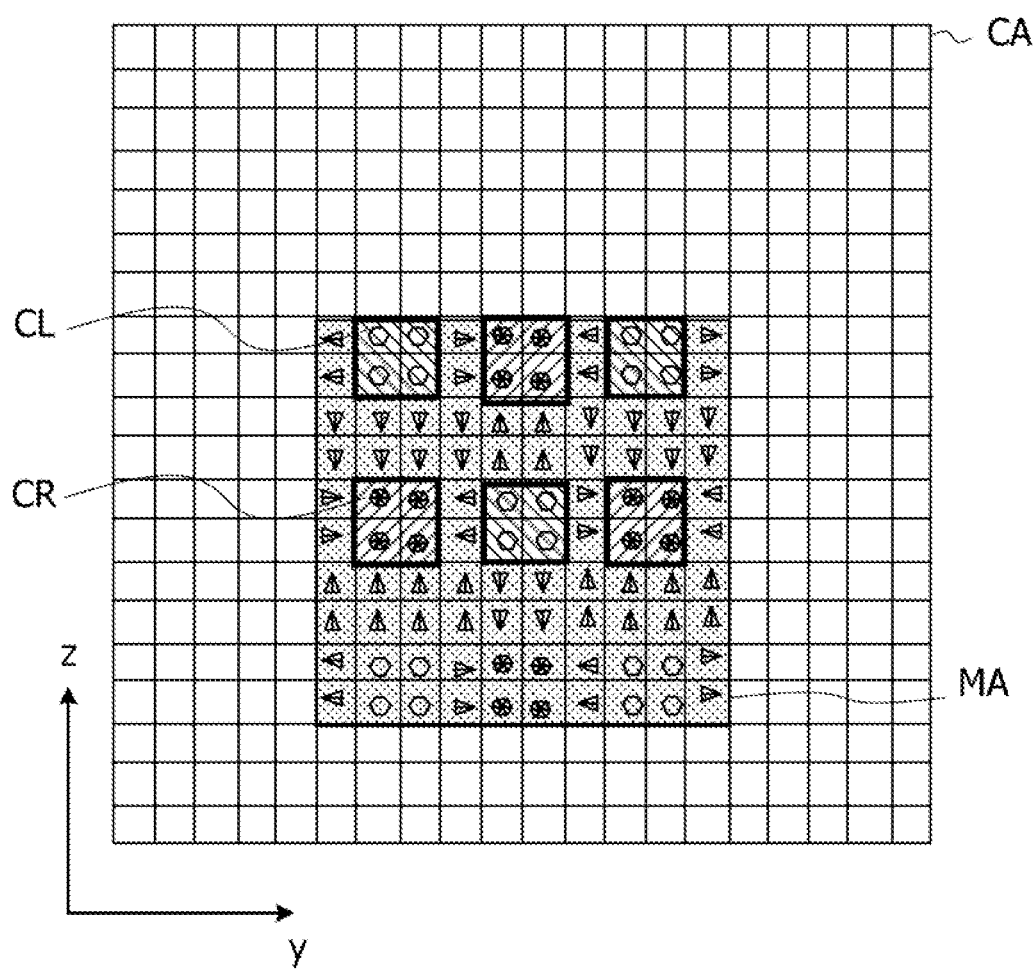
FIG. 30 is a diagram illustrating an example of arrangement of coils and magnets or the like when a change amount of an interlinkage magnetic flux of the coil is optimized before moving a coil region, in a second embodiment.
Figure 31:
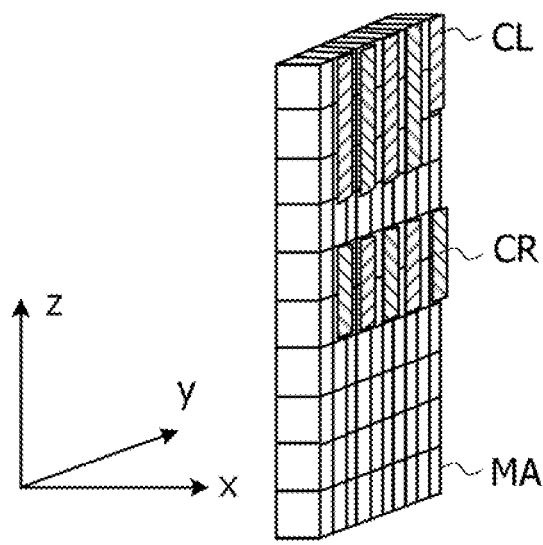
FIG. 31 is a diagram illustrating an example of the arrangement of the coils and the magnets or the like when the change amount of the interlinkage magnetic flux of the coil is optimized before moving the coil region, in the second embodiment.

FIGS. 30 and 31 are diagrams illustrating an example of arrangement or the like of coils and magnets before a coil region is moved when the change amount of the interlinkage magnetic flux in the coil is optimized in the second embodiment.

Figure 32:
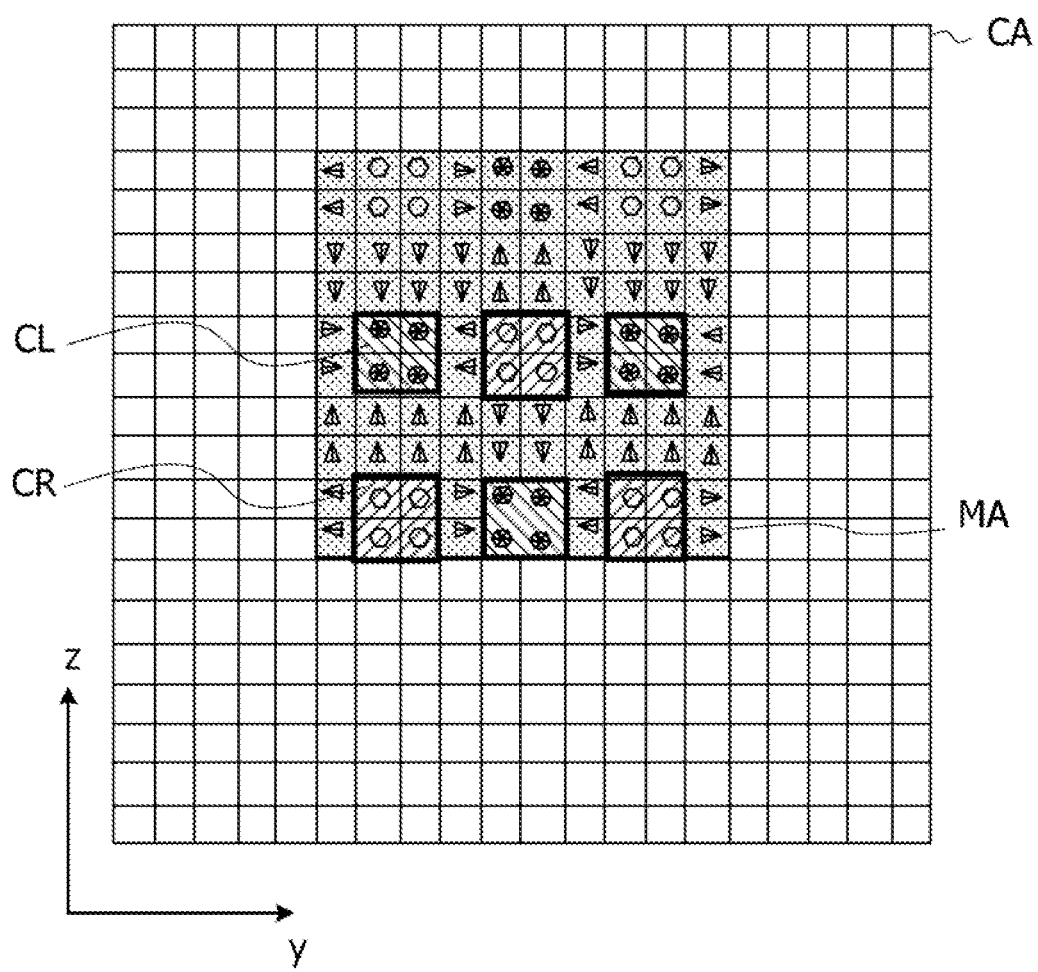
FIG. 32 is a diagram illustrating an example of the arrangement of the coils and the magnets or the like when the change amount of the interlinkage magnetic flux of the coil is optimized after the coil region has been moved, in the second embodiment.
Figure 33:
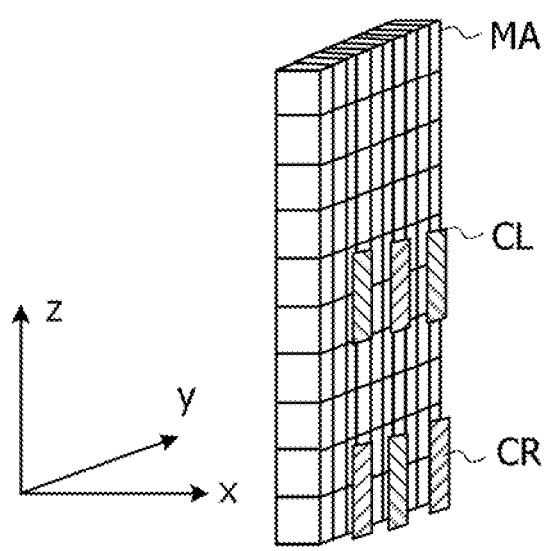
FIG. 33 is a diagram illustrating an example of the arrangement of the coils and the magnets or the like when the change amount of the interlinkage magnetic flux of the coil is optimized after the coil region has been moved, in the second embodiment.

FIGS. 32 and 33 are diagrams illustrating an example of the arrangement or the like of coils and magnets before the coil region is moved when the change amount of the interlinkage magnetic flux in the coil is optimized after the coil region has been moved in the second embodiment.

In the third embodiment in which the distance (gap width) between the coil arrangement region CA and the magnet arrangement region MA is set to be 5 mm, as illustrated in FIGS. 30 to 33, when three clockwise coils CR and three counterclockwise coils CL are arranged, the change amount of the interlinkage magnetic flux in the coil is optimized.

Third Embodiment

In a third embodiment, a change amount of an interlinkage magnetic flux in a coil is optimized as in the first embodiment other than that a distance (gap width) between a coil arrangement region CA and a magnet arrangement region MA is set to 10 mm in the first embodiment.

Figure 34:
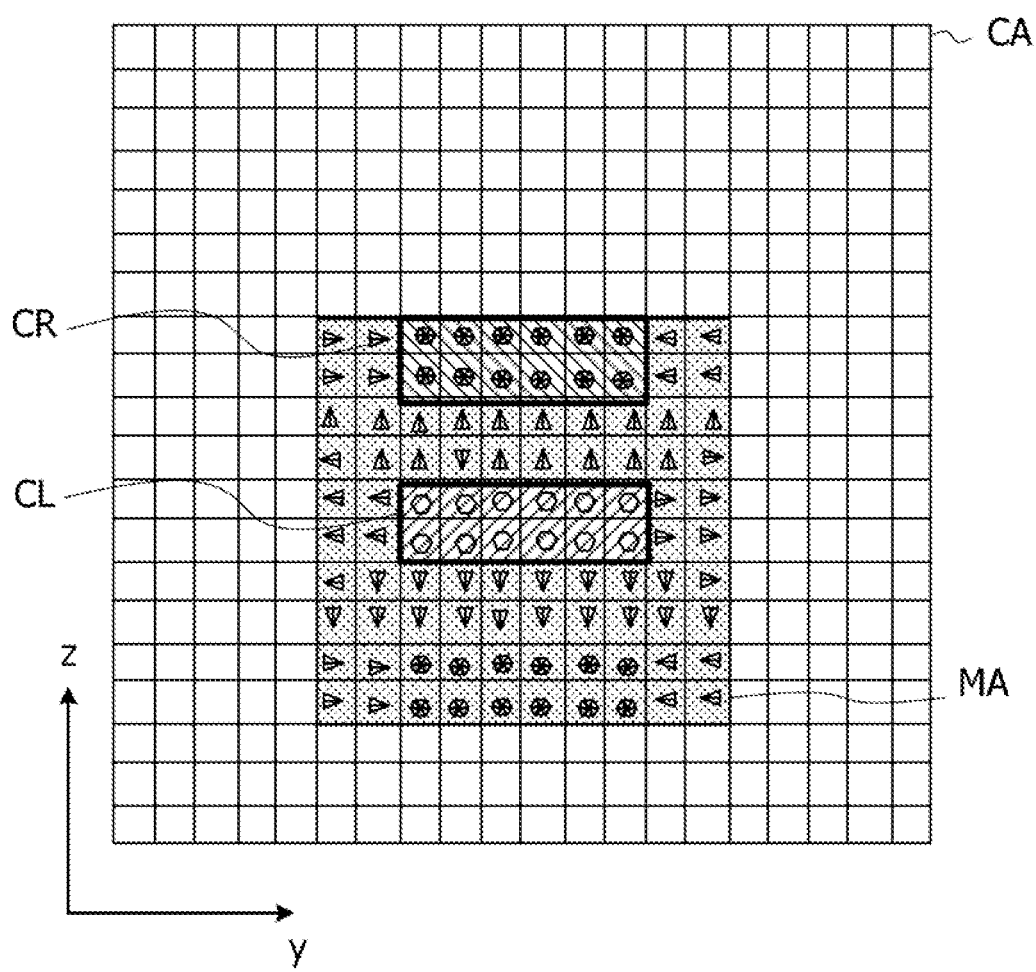
FIG. 34 is a diagram illustrating an example of arrangement of coils and magnets or the like when a change amount of an interlinkage magnetic flux of the coil is optimized before moving a coil region, in a third embodiment.
Figure 35:
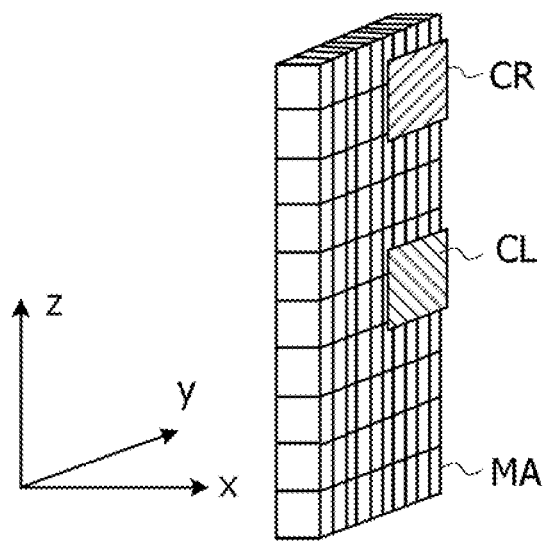
FIG. 35 is a diagram illustrating an example of the arrangement of the coils and the magnets or the like when the change amount of the interlinkage magnetic flux of the coil is optimized before moving the coil region, in the third embodiment.

FIGS. 34 and 35 are diagrams illustrating an example of arrangement or the like of coils and magnets before a coil region is moved when the change amount of the interlinkage magnetic flux in the coil is optimized before the coil region is moved in the third embodiment.

Figure 36:
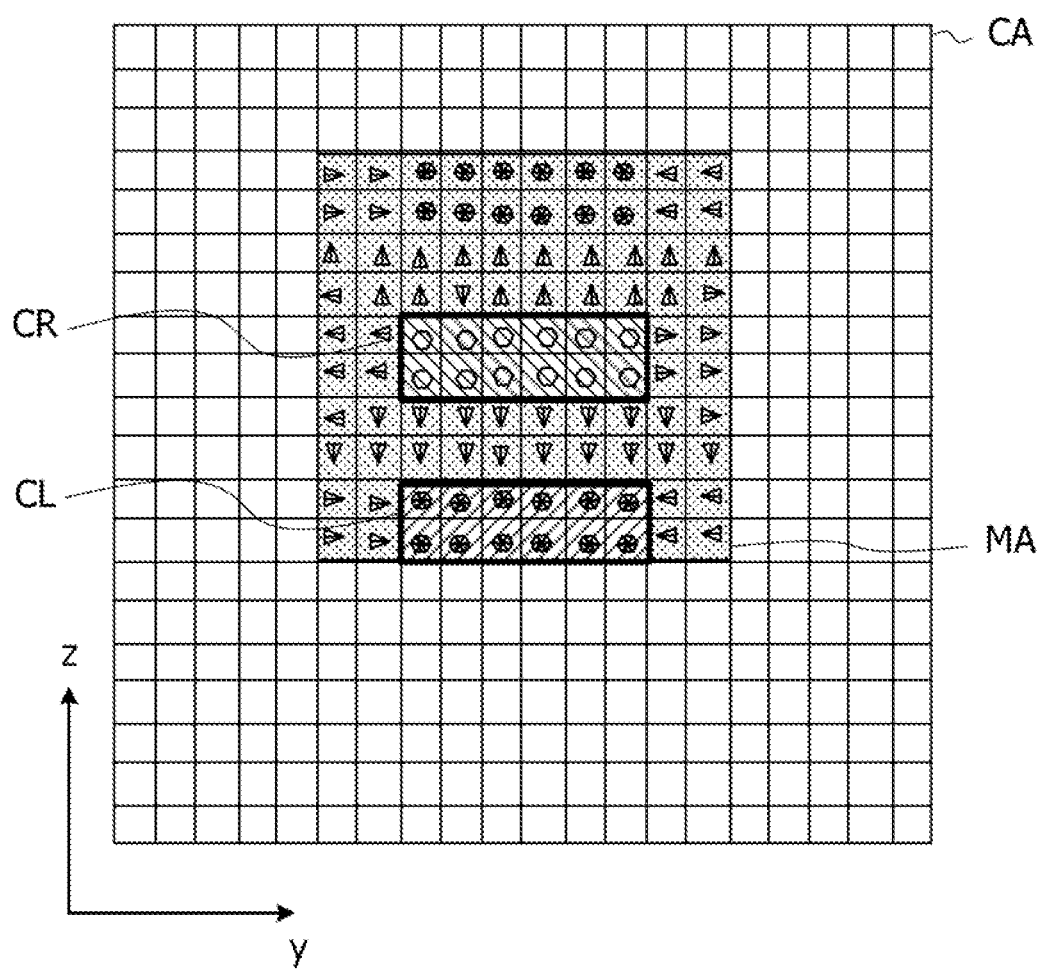
FIG. 36 is a diagram illustrating an example of the arrangement of the coils and the magnets or the like when the change amount of the interlinkage magnetic flux of the coil is optimized after the coil region has been moved, in the third embodiment.
Figure 37:
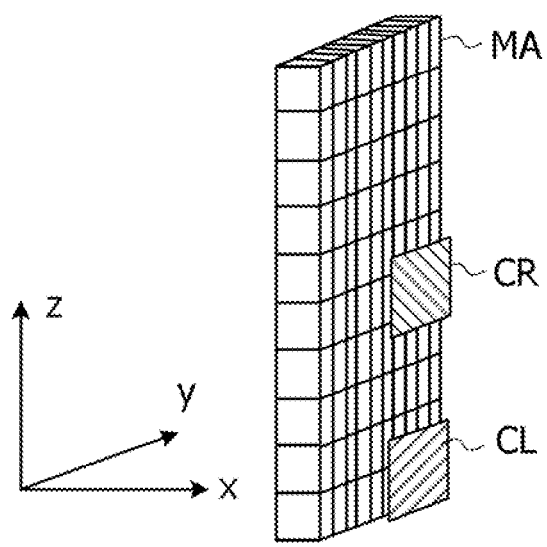
FIG. 37 is a diagram illustrating an example of the arrangement of the coils and the magnets or the like when the change amount of the interlinkage magnetic flux of the coil is optimized after the coil region has been moved, in the third embodiment.

FIGS. 36 and 37 are diagrams illustrating an example of the arrangement or the like of the coils and the magnets before the coil region is moved when the change amount of the interlinkage magnetic flux in the coil is optimized after the coil region has been moved in the third embodiment.

In the third embodiment in which the distance (gap width) between the coil arrangement region CA and the magnet arrangement region MA is set to be 10 mm, as illustrated in FIGS. 34 to 37, when one clockwise coil CR and one counterclockwise coils CL are arranged, the change amount of the interlinkage magnetic flux in the coil is optimized.

In the first to third embodiments, as described above, the change amount of the interlinkage magnetic flux in the coil can be optimized according to the distance between the coil arrangement region CA and the magnet arrangement region MA, and different arrangement of the coils and the magnets can be obtained for each embodiment.

Furthermore, from the results of the first to third embodiments, it is found that, as the distance between the coil and the magnet is shorter, the direction of the magnet is finely changed, and that a state where the clockwise coil and the counterclockwise coil are smaller and are alternately arranged is an optimal state.

FIG. 38 is a diagram illustrating an example of a relationship when a change amount of an interlinkage magnetic flux in a coil of a magnetic device is optimized in one embodiment of the technology disclosed in this case and the related art.

As illustrated in the example in FIG. 38, in the related art, when the change amount of the interlinkage magnetic flux in the coil of the magnetic device including the magnet 2 and the coil 3 is optimized, for example, a continuous parameter that uniquely represents the shape of the coil is used. In this case, in the related art, for example, when a radius (A3) of a circle is specified as a parameter, the shape of the coil to be optimized is limited to a circle, and there is a case where it is not possible to sufficiently perform optimization.

Moreover, as illustrated in FIG. 38, in the related art, the continuous value that may take a wide range of values is used as a parameter. Therefore, it is not possible to express an objective function in a format suitable for the annealing method (format of combination optimization problem), and it is not possible to efficiently perform the optimization by the annealing method.

On the other hand, in an embodiment of the technology disclosed in this case, as illustrated in FIG. 38, when the change amount of the interlinkage magnetic flux in the coil of the magnetic device including the magnet 2 and the coil 3 is optimized, the surface where the coil is arranged (coil arrangement region CA) is divided and is used as a set of the coil regions. Moreover, in an embodiment of the technology disclosed in this case, the clockwise coil and the counterclockwise coil that may exist in each coil region are expressed by binary auxiliary variables. Then, in an embodiment of the technology disclosed in this case, the objective function formula is defined by using these auxiliary variables, and the change amount of the interlinkage magnetic flux in the coil is optimized by optimizing the objective function formula.

In an embodiment of the technology disclosed in this case, as described above, because the clockwise coil and the counterclockwise coil that may exist in each coil region are expressed by the auxiliary variables, the shape or the like of the coil is not limited by the parameter of the objective function formula, and it is possible to sufficiently perform the optimization.

Moreover, in an embodiment of the technology disclosed in this case, as described above, because the objective function formula using the discretized binary auxiliary variable as a parameter is used, the objective function formula can be expressed in the QUBO format suitable for the annealing method, and accordingly, it is possible to efficiently perform the optimization.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimizer comprising:
a memory; and
a processor coupled to the memory and configured to:
optimize a change amount of an interlinkage magnetic flux in a coil of a magnetic device; and
optimize the change amount of the interlinkage magnetic flux in the coil by using an objective function formula that maximizes a sum of $\Delta\varphi_i^{right} x_i$ (i=1 to $N_c$) and $\Delta\varphi_i^{left} y_i$ (i=1 to $N_c$),
when it is assumed that
a surface of the magnetic device where the coil is arranged be divided into $N_c$ ($N_c$ is integer) coil regions,
in an i-th coil region $N_i$,
an auxiliary variable of a clockwise coil that may exist in the coil region $N_i$ be $x_i$, and an auxiliary variable of a counterclockwise coil that may exist in the coil region $N_i$ be $y_i$,
a case where the clockwise coil exists be $x_i=1$,
a case where the clockwise coil does not exist be $x_i=0$,
a case where the counterclockwise coil exists be $y_i=1$,
a case where the counterclockwise coil does not exist be $y_i=0$,
both of the clockwise coil and the counterclockwise coil do not exist when $x_i=1$ and $y_i=1$ are satisfied, and
a change amount of an interlinkage magnetic flux of the clockwise coil in the coil region $N_i$ be $\Delta\varphi_i^{right}$ and a change amount of an interlinkage magnetic flux of the counterclockwise coil in the coil region $N_i$ be $\Delta\varphi_i^{left}$.

2. The optimizer according to claim 1, wherein the processor performs optimization on a basis of the objective function formula represented by the following formula (1):

$$E = -\sum_{i=1}^{N_c}\Delta\phi_i^{right} x_i - \sum_{i=1}^{N_c}\Delta\phi_i^{left} y_i \qquad \text{Formula (1)}$$

in the formula (1),
the E is the objective function formula,
the $N_c$ is an integer that represents the number of the coil regions,
the $\Delta\varphi_i^{right}$ is a numerical value that represents the change amount of the interlinkage magnetic flux of the clockwise coil in the i-th coil region $N_i$,
the $\Delta\varphi_i^{left}$ is a numerical value that represents the change amount of the interlinkage magnetic flux of the counterclockwise coil in the i-th coil region $N_i$,
the $x_i$ is an auxiliary variable of the clockwise coil that may exist in the coil region $N_i$, and
the $y_i$ is an auxiliary variable of the counterclockwise coil that may exist in the coil region $N_i$.

3. The optimizer according to claim 1, wherein, in a case where a coil that exists in the i-th coil region $N_i$ is a same kind as a coil that exists in a coil region adjacent to the coil region $N_i$, these coil regions are combined into a single coil region.

4. The optimizer according to claim 1, wherein, when it is assumed that
a region of the magnetic device where a magnet is arranged be divided into $N_m$ ($N_m$ is integer) magnet regions, and
in a j-th magnet region $N_j$,
a case where a direction of magnetization in the magnet region $N_j$ is a positive direction in an x-axis be $s_{j,1}$,
a case where the direction is a negative direction in the x-axis be $s_{j,2}$,
a case where the direction is a positive direction in a y-axis be $s_{j,3}$,
a case where the direction is a negative direction in the y-axis be $s_{j,4}$,
a case where the direction is a positive direction in a z-axis be $s_{j,5}$, and a case where the direction is a negative direction in the z-axis be $s_{j,6}$, under a constraint that any one of $s_{j,k}$ (k=1, 2, 3, 4, 5, 6) is "one" or all of $s_{j,k}$ (k=1, 2, 3, 4, 5, 6) are "zero", when it is assumed that the change amount of the interlinkage magnetic flux of the clockwise coil in the coil region $N_i$ generated from the magnet region $N_j$ in the coil region facing the magnet region be $\Delta\varphi'^{right}_i$ and the change amount of the interlinkage magnetic flux of the counterclockwise coil in the coil region $N_j$ be $\Delta\varphi'^{left}_i$, the processor optimizes the change amount of the interlinkage magnetic flux in the coil by using the objective function formula that maximizes the sum of $\Delta\varphi'^{right}_i x_i$ (i=1 to N) and $\Delta\varphi'^{left}_i y_i$ (i=1 to $N_c$).

5. The optimizer according to claim 4, wherein the processor performs optimization on a basis of the objective function formula represented by the following formula (2):

$$E' = -\sum_{i=1}^{N_c} \Delta\phi'^{right}_i x_i - \sum_{i=1}^{N_c} \Delta\phi'^{left}_i y_i = \alpha \sum_{j=1}^{N_m} \sum_{n=1}^{6} \sum_{u=1(u\neq n)}^{6} s_{j,n} s_{j,u} \quad \text{Formula (2)}$$

in the formula (2), the E' is the objective function formula, the $N_c$ is an integer that represents the number of the coil regions, the $N_m$ is an integer that represents the number of the magnet regions, the $\Delta\varphi\phi'^{right}_i$ is a numerical value that represents the change amount of the interlinkage magnetic flux of the clockwise coil in the i-th coil region $N_i$ generated from the magnet region $N_j$, the $\Delta\varphi'^{left}_i$ is a numerical value that represents the change amount of the interlinkage magnetic flux of the counterclockwise coil in the i-th coil region $N_i$ generated from the magnet region $N_j$, the $x_i$ is the auxiliary variable of the clockwise coil that may exist in the i-th coil region $N_i$, the $y_i$ is the auxiliary variable of the counterclockwise coil that may exist in the i-th, coil region $N_i$, the $\alpha$ is a positive number, the $s_{j,n}$ is a binary variable of zero or one that represents a direction of magnetization at the time of a state number n (n=1, 2, 3, 4, 5, 6) in the j-th magnet region $N_j$, and the $s_{j,u}$ is a binary variable of zero or one that represents a direction of magnetization at the time of a state number u (u=1, 2, 3, 4, 5, 6) in the j-th magnet region $N_j$.

6. The optimizer according to claim 1, wherein the processor performs optimization on a basis of the objective function formula converted into an Ising model formula represented by the following formula (3):

$$E = -\sum_{i,j=0} w_{ij} s_i s_j - \sum_{i=0} b_i s_i \quad \text{Formula (3)}$$

in the formula (3), the E is an objective function formula converted into the Ising model formula, the $w_{ij}$ is a numerical value that represents an interaction between an i-th bit and a j-th bit, the $b_i$ is a numerical value that represents a bias with respect to the i-th bit, the $x_i$ is a binary variable that represents that the i-th bit zero or one, and the $x_j$ is a binary variable that represents that the j-th bit is zero or one.

7. The optimizer according to claim 6, wherein the processor performs optimization by minimizing the objective function formula converted into the Ising model formula by an annealing method.

8. An optimization method that optimizes a change amount of an interlinkage magnetic flux in a coil of a magnetic device, the optimization method comprising:

optimizing the change amount of the interlinkage magnetic flux in the coil by using an objective function formula that maximizes a sum of $\Delta\varphi_i^{right} x_i$ (i=1 to $N_c$) and $\Delta\varphi_i^{left} y_i$ (i=1 to $N_c$), when it is assumed that a surface of the magnetic device where the coil is arranged be divided into $N_c$ ($N_c$ is integer) coil regions, in an i-th coil region $N_i$, an auxiliary variable of a clockwise coil that may exist in the coil region N be $x_i$, and an auxiliary variable of a counterclockwise coil that may exist in the coil region $N_i$ be $y_i$, a case where the clockwise coil exists be $x_i$=1, a case where the clockwise coil does not exist be $x_i$=0, a case where the counterclockwise coil exists be $y_i$=1, a case where the counterclockwise coil does not exist be $y_i$=0, both of the clockwise coil and the counterclockwise coil do not exist when $x_i$=1 and $y_i$=1 are satisfied, and a change amount of an interlinkage magnetic flux of the clockwise coil in the coil region $N_i$ be $\Delta\varphi_i^{right}$ and a change amount of an interlinkage magnetic flux of the counterclockwise coil in the coil region $N_i$ be $\Delta\varphi_i^{left}$.

9. The optimization method according to claim 8, wherein, in the optimizing, optimization is performed on a basis of the objective function formula represented by the following formula (1):

$$E = -\sum_{i=1}^{N_c} \Delta\phi_i^{right} x_i - \sum_{i=1}^{N_c} \Delta\phi_i^{left} y_i \quad \text{Formula (1)}$$

in the formula (1), the E is the objective function formula, the $N_c$ is an integer that represents the number of the coil regions, the $\Delta\varphi_i^{right}$ is a numerical value that represents the change amount of the interlinkage magnetic flux of the clockwise coil in the i-th coil region $N_i$, the $\Delta\varphi_i^{left}$ is a numerical value that represents the change amount of the interlinkage magnetic flux of the counterclockwise coil in the i-th coil region $N_i$, the $x_i$ is an auxiliary variable of the clockwise coil that may exist in the coil region $N_i$, and the $y_i$ is an auxiliary variable of the counterclockwise coil that may exist in the coil region $N_i$.

10. The optimization method according to claim 8, wherein, in a case where a coil that exists in the i-th coil region $N_i$ is a same kind as a coil that exists in a coil region adjacent to the coil region $N_i$, these coil regions are combined into a single coil region.

11. The optimization method according to claim 8, wherein, when it is assumed that a region of the magnetic device where a magnet is arranged be divided into $N_m$ ($N_m$ is integer) magnet regions, and in a j-th magnet region $N_j$, a case where a direction of magnetization in the magnet region $N_j$ is a positive direction in an x-axis be $s_{j,1}$, a case where the direction is a negative direction in the x-axis be $s_{j,2}$, a case where the direction is a positive direction in a y-axis be $s_{j,3}$, a case where the direction is a negative direction in the y-axis be $s_{j,4}$, a case where the direction is a positive direction in a z-axis be $s_{j,5}$, and a case where the direction is a negative direction in the z-axis be $s_{j,6}$, under a constraint that any one of $s_{j,k}$ (k=1, 2, 3, 4, 5, 6) is "one" or all of $s_{j,k}$ (k=1, 2, 3, 4, 5, 6) are "zero", when it is assumed that the change amount of the interlinkage magnetic flux of the clockwise coil in the coil region $N_i$ generated from the magnet region $N_j$ in the coil region that faces the magnet region be $\Delta\varphi'^{right}_i$ and the change amount of the interlinkage magnetic flux of the counterclockwise coil in the coil region $N_i$ be $\Delta\varphi'^{left}_i$, in the optimizing, the change amount of the interlinkage magnetic flux in the coil is optimized by using the objective function formula that maximizes the sum of $\Delta\varphi'^{right}_i x_i$ (i=1 to $N_c$) and $\Delta\varphi'^{left}_i y_i$ (i=1 to $N_c$).

12. The optimization method according to claim 11, wherein, in the optimizing, optimization is performed on a basis of the objective function formula represented by the following formula (2):

$$E' = -\sum_{i=1}^{N_c}\Delta\phi'^{right}_i x_i - \sum_{i=1}^{N_c}\Delta\phi'^{left}_i y_i + \alpha\sum_{j=1}^{N_m}\sum_{n=1}^{6}\sum_{u=1(u\neq n)}^{6} s_{j,n}s_{j,u} \qquad \text{Formula (2)}$$

in the formula (2), the E' is the objective function formula, the $N_c$ is an integer that represents the number of the coil regions, the $N_m$ is an integer that represents the number of the magnet regions, the $\Delta\varphi'^{right}_i$ is a numerical value that represents the change amount of the interlinkage magnetic flux of the clockwise coil in the i-th coil region $N_i$ generated from the magnet region $N_j$, the $\Delta\varphi'^{left}_i$ is a numerical value that represents the change amount of the interlinkage magnetic flux of the counterclockwise coil in the i-th coil region $N_i$ generated from the magnet region $N_j$, the $x_i$ is the auxiliary variable of the clockwise coil that may exist in the i-th coil region $N_i$, the $y_i$ is the auxiliary variable of the counterclockwise coil that may exist in the i-th coil region $N_i$, the $\alpha$ is a positive number, the $s_{j,n}$ is a binary variable of zero or one that represents a direction of magnetization at the time of a state number n (n=1, 2, 3, 4, 5, 6) in the j-th magnet region $N_j$, and the $s_{j,u}$ is a binary variable of zero or one that represents a direction of magnetization at the time of a state number u (u=1, 2, 3, 4, 5, 6) in the j-th magnet region $N_j$.

13. The optimization method according to claim 8, wherein, in the optimizing, optimization is performed on a basis of the objective function formula converted into an Ising model formula represented by the following formula (3):

$$E = -\sum_{i,j=0} w_{ij}s_is_j - \sum_{i=0} b_i s_i \qquad \text{Formula (3)}$$

in the formula (3), the E is an objective function formula converted into the Ising model formula, the $w_{ij}$ is a numerical value that represents an interaction between an i-th bit and a j-th bit, the $b_i$ is a numerical value that represents a bias with respect to the i-th bit, the $x_i$ is a binary variable that represents that the bit zero or one, and the $x_j$ is a binary variable that represents at the j-th bit is zero or one.

14. The optimization method according to claim 13, wherein, in the optimizing, optimization is performed by minimizing the objective function formula converted into the Ising model formula by an annealing method.

15. A non-transitory computer-readable recording medium having stored therein an optimization program that optimizes a change amount of an interlinkage magnetic flux in a coil of a magnetic device, the optimization program causing a computer to execute processing comprising:

optimizing the change amount of the interlinkage magnetic flux in the coil by using an objective function formula that maximizes a sum of $\Delta\varphi^{right}_i x_i$ (i=1 to $N_c$) and $\Delta\varphi^{left}_i y_i$ (i=1 to $N_c$), when it is assumed that a surface of the magnetic device where the coil is arranged be divided into $N_c$ ($N_c$ is integer) coil regions, in an i-th coil region $N_i$, an auxiliary variable of a clockwise coil that may exist in the coil region $N_i$ be $x_i$, and an auxiliary variable of a counterclockwise coil that may exist in the coil region $N_i$ be $y_i$, a case where the clockwise coil exists be $x_i=1$, a case where the clockwise coil does not exist be $x_i=0$ a case where the counterclockwise coil exists be $y_i=1$, a case where the counterclockwise coil does not exist be $y_i=0$, both of the clockwise coil and the counterclockwise coil do not exist when $x_i=1$ and $y_i=1$ are satisfied, and a change amount of an interlinkage magnetic flux of the clockwise coil in the coil region $N_i$ be $\Delta\varphi^{right}_i$ and a change amount of an interlinkage magnetic flux of the counterclockwise coil in the coil region $N_i$ be $\Delta\varphi^{left}_i$.

16. The non-transitory computer-readable recording medium having stared therein the optimization program according to claim 15, wherein, in the processing, optimization is performed on a basis of the objective function formula represented by the following formula (1):

$$E = -\sum_{i=1}^{N_c}\Delta\phi^{right}_i x_i - \sum_{i=1}^{N_c}\Delta\phi^{left}_i y_i \qquad \text{Formula (1)}$$

in the formula (1), the E is the objective function formula, the $N_c$ is an integer that represents the number of the coil regions, the $\Delta \varphi_i^{right}$ is a numerical value that represents the change amount of the interlinkage magnetic flux of the clockwise coil in the i-th coil region $N_i$, the $\Delta \varphi_i^{left}$ is a numerical value that represents the change amount of the interlinkage magnetic flux of the counterclockwise coil in the i-th coil region $N_i$, the $x_i$ is an auxiliary variable of the clockwise coil that may exist in the coil region $N_i$, and the $y_i$ is an auxiliary variable of the counterclockwise coil that may exist in the coil region $N_i$.

17. The non-transitory computer-readable recording medium having stored therein the optimization program according to claim 15, wherein, in a case where a coil that exists in the i-th coil region $N_i$ is a same kind as a coil that exists in a coil region adjacent to the coil region $N_i$, these coil regions are combined into a single coil region.

18. The non-transitory computer-readable recording medium having stored therein the optimization program according to claim 15, wherein, when it is assumed that a region of the magnetic device where the magnet is arranged be divided into $N_m$ ($N_m$ is integer) magnet regions, and in a j-th magnet region $N_j$, a case where a direction of magnetization in the magnet region $N_j$ is a positive direction in an x-axis be $s_{j,1}$, a case where the direction is a negative direction in the x-axis be $s_{j,2}$, a case where the direction is a positive direction in a y-axis be set to be $s_{j,3}$, a case where the direction is a negative direction in the y-axis be $s_{j,4}$, a case where the direction is a positive direction in a z-axis be $s_{j,5}$, and a case where the direction is a negative direction in the z-axis be $s_{j,6}$, under a constraint that any one of $s_{j,k}$ (k=1, 2, 3, 4, 5, 6) is "one" or all of $s_{j,k}$ (k=1, 2, 3, 4, 5, 6) are "zero", when it is assumed that the change amount of the interlinkage magnetic flux of the clockwise coil in the coil region $N_i$ be $\Delta \varphi'^{right}_i$ and the change amount of the interlinkage magnetic flux of the counterclockwise coil in the coil region $N_i$ be $\Delta \varphi'^{left}_i$, in the processing, the change amount of the interlinkage magnetic flux in the coil is optimized by using the objective function formula that maximizes the sum of $\Delta \varphi'^{right}_i x_i$ (i=1 to $N_c$) and $\Delta \varphi'^{left}_i y_i$ (i=1 to $N_c$).

19. The non-transitory computer-readable recording medium having stored therein the optimization program according to claim 18, wherein, in the processing, optimization is performed on a basis of the objective function formula represented by the following formula (2):

$$E' = -\sum_{i=1}^{N_c} \Delta \phi'^{right}_i x_i - \sum_{i=1}^{N_c} \Delta \phi'^{left}_i y_i + \alpha \sum_{j=1}^{N_m} \sum_{n=1}^{6} \sum_{u=1(u \neq n)}^{6} s_{j,n} s_{j,u} \quad \text{Formula (2)}$$

in the formula (2), the E is the objective function formula, the $N_c$ is an integer that represents the number of the coil regions, the $N_m$ is an integer that represents the number of the magnet regions, the $\Delta \varphi'^{right}_i$ is a numerical value that represents the change amount of the interlinkage magnetic flux of the clockwise coil in the i-th coil region $N_i$ generated from the magnet region $N_j$, the $\Delta \varphi'^{left}_i$ is a numerical value that represents the change amount of the interlinkage magnetic flux of the counterclockwise coil in the i-th coil region $N_i$ generated from the magnet region $N_j$, the $x_i$ is the auxiliary variable of the clockwise coil that may exist in the i-th coil region $N_i$, the $y_i$ is the auxiliary variable of the counterclockwise coil that may exist in the i-th coil region $N_i$, the $\alpha$ is a positive number, the $s_{j,n}$ is a binary variable of zero or one that represents a direction of magnetization at the time of a state number n (n=1, 2, 3, 4, 5, 6) in the j-th magnet region $N_j$, and the $s_{j,u}$ is a binary variable of zero or one that represents a direction of magnetization at the time of a state number u (u=1, 2, 3, 4, 5, 6) in the j-th magnet region $N_j$.

20. The non-transitory computer-readable recording medium having stored therein the optimization program according to claim 15, wherein, in the processing, optimization is performed on a basis of the objective function formula converted into an Ising model formula represented by the following formula (3):

$$E = -\sum_{i,j=0} w_{ij} s_i s_j - \sum_{i=0} b_i s_i \quad \text{Formula (3)}$$

in the formula (3), the E is an objective function formula converted into the Ising model formula, the $w_{ij}$ is a numerical value that represents an interaction between an i-th bit and a j-th bit, the $b_i$ is a numerical value that represents a bias with respect to the i-th bit, the $x_i$ is a binary variable that represents that the i-th bit is zero or one, and the $x_j$ is a binary variable that represents that the j-th bit is zero or one.

* * * * *